United States Patent
Ootsuki et al.

(10) Patent No.: US 8,455,061 B2
(45) Date of Patent: Jun. 4, 2013

(54) OPTICALLY ACTIVE COMPOUND HAVING POLYMERIZABLE GROUP AND ITS POLYMER

(75) Inventors: Daisuke Ootsuki, Ichihara (JP); Junichi Inagaki, Ichihara (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 109 days.

(21) Appl. No.: 13/072,181

(22) Filed: Mar. 25, 2011

(65) Prior Publication Data

US 2011/0240918 A1     Oct. 6, 2011

(30) Foreign Application Priority Data

Apr. 2, 2010   (JP) .................................. 2010-086169
Jan. 17, 2011  (JP) .................................. 2011-007169

(51) Int. Cl.
| | | |
|---|---|---|
| C09K 19/38 | (2006.01) | |
| C09K 19/54 | (2006.01) | |
| G02B 5/20 | (2006.01) | |
| G02B 5/30 | (2006.01) | |
| C07D 303/23 | (2006.01) | |
| C07D 303/30 | (2006.01) | |
| C07D 305/06 | (2006.01) | |
| C08G 59/02 | (2006.01) | |
| C08G 59/22 | (2006.01) | |
| C08G 59/24 | (2006.01) | |
| C08G 65/18 | (2006.01) | |

(52) U.S. Cl.
USPC ......... 428/1.1; 428/1.2; 428/1.31; 252/299.5; 526/268; 526/273; 549/510; 549/512; 549/534; 549/546; 549/547

(58) Field of Classification Search
USPC ................ 549/334, 338, 435, 510, 512, 546, 549/547; 560/100; 252/299.61, 299.62, 299.63, 252/299.5; 526/268, 273; 528/296, 297; 428/1.1, 1.2, 1.31
See application file for complete search history.

(56) References Cited

U.S. PATENT DOCUMENTS

| | | | |
|---|---|---|---|
| 5,744,057 A | 4/1998 | Meyer et al. | |
| 7,682,522 B2 * | 3/2010 | Tanabe | ..................... 252/299.63 |
| 2003/0178601 A1 | 9/2003 | Kirsch et al. | |
| 2004/0151846 A1 | 8/2004 | Aminaka et al. | |
| 2006/0203150 A1 | 9/2006 | Ohmuro et al. | |

FOREIGN PATENT DOCUMENTS

| | | |
|---|---|---|
| JP | 2007269640 A | 3/2006 |
| JP | 2009084178 A | 9/2007 |

OTHER PUBLICATIONS

Hisatake et al., 2001, A Novel Transflective TFT-LCD using Cholesteric Half Reflector, Asia display/IDW '01 : proceedings of the 21st International Display Research Conference in conjunction with the 8th International Display Workshops, 129-132.

* cited by examiner

Primary Examiner — Shean C Wu
(74) Attorney, Agent, or Firm — Hogan Lovells US LLP

(57) ABSTRACT

An optically active compound having a polymerizable group which is represented by formula (1) or (2).

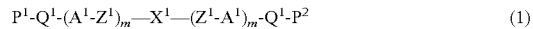

$$P^1\text{-}Q^1\text{-}(A^1\text{-}Z^1)_m\text{—}X^1\text{—}(Z^1\text{-}A^1)_m\text{-}Q^1\text{-}P^2 \quad (1)$$

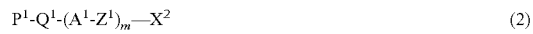

$$P^1\text{-}Q^1\text{-}(A^1\text{-}Z^1)_m\text{—}X^2 \quad (2)$$

For example, $A^1$ is independently divalent group having ring; $Z^1$ is independently bonding group; m is independently an integer from 1 to 5; $Q^1$ is independently alkylene having 1 to 20 carbons; $X^1$ is a divalent group having chirality; $X^2$ is a monovalent group having chirality, and $P^1$ and $P^2$ are polymerizable groups; and concerns a polymerizable liquid crystal composition, a polymer, an optical device and an article.

25 Claims, No Drawings

OPTICALLY ACTIVE COMPOUND HAVING POLYMERIZABLE GROUP AND ITS POLYMER

This nonprovisional application claims priority under 35 U.S.C. §119 (a) on Patent Application No. 2010-086169 filed in Japan on Apr. 2, 2010 and Patent Application No. 2011-007169 filed in Japan on Jan. 17, 2011, the entire contents of which are hereby incorporated by reference.

BACKGROUND OF THE INVENTION

1. Field of the Invention

The invention relates to an optically active compound having a polymerizable group, a polymerizable liquid crystal composition including the optically active compound, a polymer formed by polymerization of the polymerizable liquid crystal composition and an article containing the polymerizable liquid crystal composition or the polymer.

2. Related Art

In recent years, a polymerizable liquid crystal composition has been utilized to an optical device. When light is irradiated to an optical device, the optical device reflects circularly polarized light in a specific wavelength range depending on the rotational direction of the helix and the length of the helical pitch which are formed by liquid crystal molecules (circularly polarized light separating function).

Examples of the utilization of selective reflection of light include an optical compensator, adornment design and a color filter used for a liquid crystal display device. Furthermore, it is possible to apply to anti-counterfeit detection by utilizing characteristics in which reflected light and transmitted light have unique metallic shine, color tone varies depending on a viewing angle, and such optical characteristics are not exhibited in a printed matter obtained by use of copy machine. In an application of such circularly polarized light separating function, a brightness enhancement film has been proposed, which a quarter-wave plate and an optically anisotropic film that exhibits circularly polarized light separating function are laminated. The brightness enhancement film is expected to exhibit circularly polarized light separating function in the region of all visible light (range at wavelengths of approximately 350 nm to approximately 750 nm). In such a case, it is reasonable to laminate a plurality of layers that have different helical pitches, or to change the helical pitch successively in the direction of the film thickness in order to form this film (the non-patent document 1).

An optical compensation film is used, for example, for a STN (super twisted nematic)-type liquid crystal display (the patent document 1). A film in which a cholesteric phase is fixed, where visible light is passed through and ultraviolet light with wavelengths of approximately 350 nm or less is reflected, is called a negative C-plate, which is used as an optical compensator suitable for an improvement of viewing angle characteristics in a display device having a type such as VA (vertically aligned), TN (twisted nematic), OCB (optically compensated birefringence) or HAN (hybrid aligned nematic). A combination of the negative C-plate with an optical compensation layer such as a positive A-plate having positive birefringence makes it possible to use for the viewing angle compensation in a display device having a VA type (the patent document 2).

Development of a polymerizable cholesteric liquid crystal composition has been expected, where in any use described above, the liquid crystal composition has a cholesteric phase at room temperature, exhibits an excellent orientation and has a fast polymerization rate on irradiation with ultraviolet light, and a polymer formed by curing has a suitable optical anisotropy ($\Delta n$), has transparency, and is excellent in thermal resistance and moisture resistance.

The cholesteric liquid crystal composition can be usually prepared by the addition of an optically active compound (a chiral agent) to a nematic liquid crystal composition. The liquid crystal molecules are required to have a helical structure in which the helical pitch is quite short, in order to reflect circularly polarized light in the range of ultraviolet light to visible light. Then, the use of an optically active compound having a large helical twisting power (HTP) is required. In this case, when an optically active compound having a small HTP is used, its additive amount should be increased, and thus it is hard to adjust the other characteristics, especially the temperature range of a cholesteric phase and the wavelength range of selective reflection. The optically active compound has no liquid crystallinity in many cases, and the liquid crystallinity of the composition may be disappeared when additive amount of the optically active compound is increased and the desired cholesteric phase may not be exhibited.

When an optical film is produced, a polymerizable chiral agent is added to a polymerizable liquid crystal compound, forming a polymer, and fixing a helical structure that is formed by the liquid crystal molecules. Such a chiral agent is required to have characteristics such as a large HTP, a low temperature dependence of HTP, an excellent compatibility with a liquid crystal compound and an excellent long term preservation stability (not easily be crystallized). There may be cases where a chiral agent having a large HTP becomes quite expensive and thus unsuitable for an industrial use when the chiral agent has a complex structure and thus it is difficult to be synthesized. Comprehensive characteristics such as a fast polymerization rate, a high mechanical strength, excellent coating properties, an excellent solubility, a high degree of crystallinity, a low shrinkage, a low water permeability, a low water absorptivity, a low gas permeability, a suitable melting point, a high glass transition temperature, a suitable clearing point, a high chemical resistance, a high thermal resistance, a high weather resistance and a small photoelasticity are required for the polymer.

Polymerizable and optically active compounds are disclosed in JP H09-020781 A (1997) (the patent document 3), JP 2004-504285 A (the patent document 4), JP 2007-269640 A (the patent document 5) and JP 2009-084178 A (the patent document 6). Now, the development of an optically active compound, which has an excellent compatibility with a liquid crystal compound, an excellent solubility in an organic solvent or the like, and a high polymerization rate during the polymerization is desired.

Citation List

Patent document 1: JP 2002-006138 A.
Patent document 2: JP H10-153802 A (1998).
Patent document 3: JP H09-020781 A (1997).
Patent document 4: JP 2004-504285 A.
Patent document 5: JP 2007-269640 A.
Patent document 6: JP 2009-084178 A.
Non-patent document 1: Y. Hisatake et al, Asia Display/IDW' 01 LCT8-2.

SUMMARY OF THE INVENTION

The invention concerns an optically active compound having a polymerizable group which is represented by formula (1) or (2).

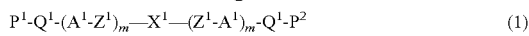

(1)

(2)

For example, $A^1$ is independently divalent group having ring; $Z^1$ is independently bonding group; m is independently an integer from 1 to 5; $Q^1$ is independently alkylene having 1 to 20 carbons; $X^1$ is a divalent group having chirality; $X^2$ is a monovalent group having chirality, and $P^1$ and $P^2$ are polymerizable groups; and concerns a polymerizable liquid crystal composition, a polymer, an optical device and an article.

DETAILED DESCRIPTION OF THE INVENTION

The first advantage of the invention is to provide an optically active compound having a polymerizable group which has a large HTP, exhibits an excellent compatibility with another polymerizable liquid crystal compound, has an excellent solubility in organic solvent or the like, and is polymerizable even in air by heat or light. The second advantage is to provide a polymerizable liquid crystal composition which includes the optically active compound and exhibits a cholesteric phase at around room temperature. The third advantage is to provide a polymer which exhibits the optical anisotropy and has a plurality of excellent characteristics among characteristics such as transparency, mechanical strength, shrinkage, a melting point, glass transition temperature, a clearing point, chemical resistance and thermal resistance. The forth advantage is to provide a polarizing plate, an optical compensator, an alignment film, a color filter, a holographic optical device, a liquid crystal display device, synthetic polymers having mechanical anisotropy, a cosmetic, an ornament, an anti-counterfeit detection system, a non-linear optical device, an optical storage device and so forth, each of which contains the polymer.

The inventors had been earnestly studied and found a new compound that solves the subject described above. Specific examples are as follows.

Item 1. An optically active compound having a polymerizable group represented by formula (1) or (2).

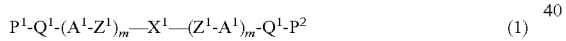

(1)

(2)

In formulas (1) and (2), the ring $A^1$ is independently 1,4-cyclohexylene, 1,4-phenylene, pyridine-2,5-diyl, pyrimidine-2,5-diyl, naphthalene-2,6-diyl, tetrahydronaphthalene-2,6-diyl or fluorene-2,7-diyl, and in these rings, one or nonadjacent two —$CH_2$— may be replaced by —O—, and in the 1,4-phenylene and fluorene-2,7-diyl, arbitrary hydrogen may be replaced by fluorine, chlorine, cyano, methyl, ethyl, methoxy, hydroxy, formyl, acetoxy, acetyl, trifluoroacetyl, difluoromethyl or trifluoromethyl;

$Z^1$ is independently a single bond, —O—, —COO—, —OCO—, —CH=CH—COO—, —OCO—CH=CH—, —OCO—$(CH_2)_2$—, —$(CH_2)_2$—COO—, —O$(CH_2)_2$O—, —C≡C—COO—, —OCO—C≡C—, —$CH_2$O—, —O$CH_2$—, —$CF_2$O—, —O$CF_2$—, —$(CH_2)_4$—, —$(CH_2)_2$—, —$(CF_2)_2$—, —CH=CH—, —CF=CF— or —C≡C—;

m is independently an integer from 1 to 5, and when m is 2 or more, each of a plurality of $Z^1$ may be different groups or at least two of a plurality of $Z^1$ may be the same group, and each of a plurality of the ring $A^1$ may be different rings or at least two of a plurality of the ring $A^1$ may be the same ring;

$Q^2$ is independently alkylene having 1 to 20 carbons, and in the alkylene, arbitrary hydrogen may be replaced by fluorine or chlorine and arbitrary —$CH_2$— may be replaced by —O—, —COO—, —OCO—, —CH=CH— or —C≡C—;

$X^1$ is a divalent group having chirality represented by any one of formulas (3-1) to (3-7), and when $X^2$ is formula (3-5) and m is 2 to 4, $Z^2$ is not —OCO—$(CH_2)_2$—, —$(CH_2)_2$—COO— or —O$(CH_2)_2$O— and when $X^1$ is formula (3-5) and m is 1, $Q^2$ is alkylene having 1 to 20 carbons where the group next to the ring $A^1$ in the alkylene is not —$(CH_2)_2$—COO—, —OCO—$(CH_2)_2$—, —O$(CH_2)_2$O—, —O$(CH_2)_3$- or —O$(CH_2)_3$O—;

$X^2$ is a monovalent group having chirality represented by any one of formulas (3-8) to (3-10);

$P^1$ is independently a polymerizable group represented by formula (4-1) or (4-2);

$P^2$ is a polymerizable group represented by any one of formulas (4-1) to (4-5).

(3-1)

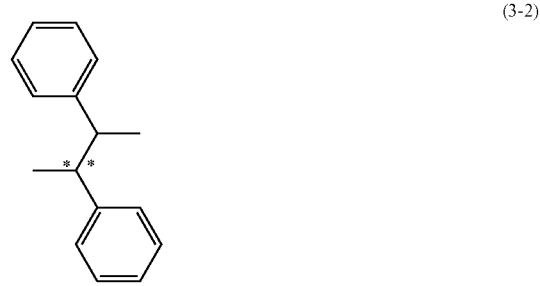
(3-2)

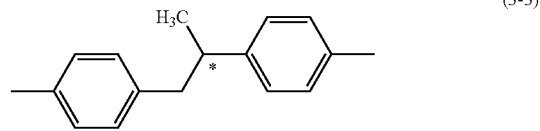
(3-3)

(3-4)

(3-5)

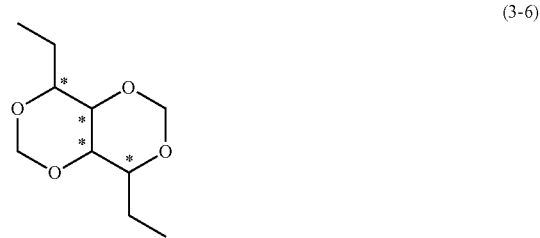
(3-6)

-continued (3-7) 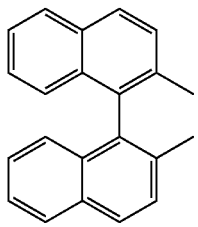

(3-8) 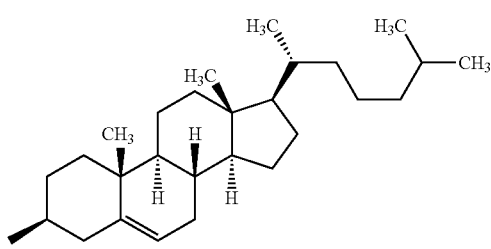

(3-9) 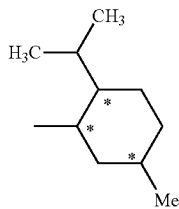

(3-10) 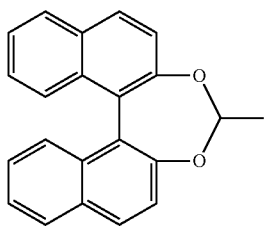

(4-1) 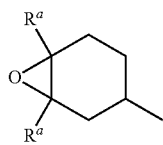

(4-2) 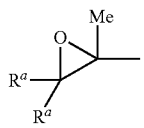

(4-3) 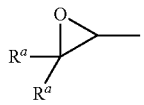

(4-4) 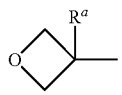

(4-5) 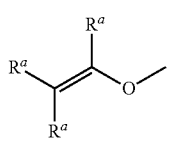

In formulas (4-1) to (4-5), $R^a$ is independently hydrogen, halogen or alkyl having 1 to 5 carbons.

Item 2. The optically active compound having a polymerizable group according to item 1, wherein in formula (1) according to item 1, $X^1$ is a divalent group having chirality represented by any one of formulas (3-1) to (3-4).

Item 3. The optically active compound having a polymerizable group according to item 1, wherein in formula (1) according to item 1, $X^1$ is a divalent group having chirality represented by formula (3-5) or (3-6).

Item 4. The optically active compound having a polymerizable group according to item 1, wherein in formula (1) according to item 1, $X^1$ is a divalent group having chirality represented by formula (3-7).

Item 5. The optically active compound having a polymerizable group according to any one of items 1 to 4, wherein in formulas (1) and (2) according to item 1, the ring $A^1$ is independently 1,4-cyclohexylene, 1,4-phenylene or naphthalene-2,6-diyl, and in the 1,4-phenylene, arbitrary one or two hydrogens may be replaced by fluorine, methyl, methoxy or trifluoromethyl.

Item 6. The optically active compound having a polymerizable group according to any one of items 1 to 5, wherein in formulas (1) and (2) according to item 1, $Z^1$ is independently a single bond, —COO—, —OCO—, —CH=CH—COO—, —(CH$_2$)$_2$—COO—, —OCO—CH=CH—, —OCO—(CH$_2$)$_2$—, —(CH$_2$)$_2$— or —C≡C—, and m is independently an integer from 1 to 3.

Item 7. The optically active compound having a polymerizable group according to any one of items 1 to 6, wherein in formulas (1) and (2) according to item 1, $Z^1$ is independently a single bond, —COO— or —OCO—.

Item 8. The optically active compound having a polymerizable group according to any one of items 1 to 7, wherein in formulas (1) and (2) according to item 1, $Q^1$ is independently alkylene having 1 to 12 carbons, and in the alkylene, arbitrary —CH$_2$— may be replaced by —O—, —COO— or —OCO—.

Item 9. The optically active compound having a polymerizable group according to any one of items 1 to 8, wherein in formulas (4-1) to (4-5) according to item 1, $R^a$ is independently hydrogen, methyl or ethyl.

Item 10. The optically active compound having a polymerizable group according to any one of items 1 to 4, wherein in formula (1) according to item 1,
the ring $A^1$ is independently 1,4-cyclohexylene or 1,4-phenylene, and in the 1,4-phenylene, arbitrary one or two hydrogens may be replaced by fluorine or methyl;
$Z^1$ is independently a single bond, —COO— or —OCO—;
m is an integer from 1 to 3;
$Q^1$ is independently alkylene having 1 to 12 carbons, and in the alkylene, arbitrary —CH$_2$— may be replaced by —O—, —COO— or —OCO—;
$P^1$ and $P^2$ are a polymerizable group represented by formula (4-1); and
$R^a$ in formula (4-1) is hydrogen.

Item 11. The optically active compound having a polymerizable group according to any one of items 1 to 4, wherein in formula (1) according to item 1,
the ring $A^1$ is independently 1,4-cyclohexylene or 1,4-phenylene, and in the 1,4-phenylene, arbitrary one or two hydrogens may be replaced by fluorine or methyl;
$Z^1$ is independently a single bond, —COO— or —OCO—;
m is an integer from 1 to 3;
$Q^1$ is independently alkylene having 1 to 12 carbons, and in the alkylene, arbitrary —CH$_2$— may be replaced by —O—, —COO— or —OCO—;

P¹ and P² are a polymerizable group represented by formula (4-2); and

R^a in formula (4-2) is hydrogen.

Item 12. A polymerizable liquid crystal composition, including at least one of the optically active compound having a polymerizable group according to any one of items 1 to 11 and a polymerizable liquid crystal compound.

Item 13. The polymerizable liquid crystal composition according to item 12, comprising at least one compound selected from the optically active compounds having a polymerizable group according to any one of items 1 to 11 and at least one compound selected from the polymerizable liquid crystal compounds represented by formulas (M1) and (M2).

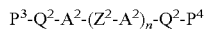  (M1)

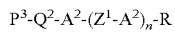  (M2)

In formulas (M1) and (M2), the ring A² is independently 1,4-cyclohexylene, 1,4-phenylene, naphthalene-2,6-diyl, fluorene-2,7-diyl or 1,3-dioxane-2,5-diyl, and in the 1,4-phenylene and fluorene-2,7-diyl, arbitrary hydrogen may be replaced by fluorine, chlorine, cyano, methyl, ethyl, methoxy, hydroxy, formyl, acetoxy, acetyl, trifluoroacetyl, difluoromethyl or trifluoromethyl;

$Z^2$ is independently a single bond, —O—, —COO—, —OCO—, —CH=CH—COO—, —OCO—CH=CH—, —OCO—(CH$_2$)$_2$—, —(CH$_2$)$_2$—COO—, —C≡C—COO—, —OCO—C≡C—, —CH$_2$O—, —OCH$_2$—, —CF$_2$O—, —OCF$_2$—, —CONH—, —NHCO—, —(CH$_2$)$_4$—, —(CH$_2$)$_2$—, —(CF$_2$)$_2$—, —CH=CH—, —CF=CF— or —C≡C—;

n is independently an integer from 1 to 5, and when n is 2 or more, each of a plurality of $Z^2$ may be different groups or at least two of a plurality of $Z^2$ may be the same group, and each of a plurality of the ring A² may be different rings or at least two of a plurality of the ring A² may be the same ring;

$Q^2$ is independently alkylene having 1 to 20 carbons, and in the alkylene, arbitrary hydrogen may be replaced by fluorine and arbitrary —CH$_2$— may be replaced by —O—, —COO—, —OCO—, —CH=CH— or —C≡C—;

R is fluorine, cyano, trifluoromethyl, trifluoromethoxy, alkyl having 1 to 20 carbons or alkoxy having 1 to 20 carbons; and P³ and P⁴ are each independently a polymerizable group represented by any one of formulas (4-1) to (4-5).

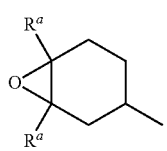  (4-1)

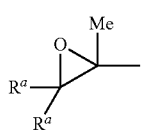  (4-2)

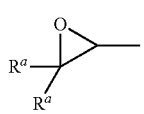  (4-3)

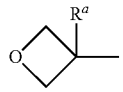  (4-4)

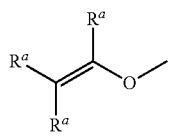  (4-5)

In formulas (4-1) to (4-5), R^a is independently hydrogen, halogen or alkyl having 1 to 5 carbons.

Item 14. The polymerizable liquid crystal composition according to item 12 or 13, wherein in formula (1) and formula (2) according to item 1, the ring A¹ is independently 1,4-cyclohexylene, 1,4-phenylene or naphthalene-2,6-diyl, and in the 1,4-phenylene, arbitrary hydrogen may be replaced by fluorine, methyl, methoxy or trifluoromethyl;

$Z^1$ is independently a single bond, —COO—, —OCO—, —CH=CH—COO—, —(CH$_2$)$_2$—COO—, —OCO—CH=CH—, —OCO—(CH$_2$)$_2$—, —(CH$_2$)$_2$— or —C≡C—;

m is independently an integer from 1 to 3;

$Q^1$ is independently alkylene having 1 to 12 carbons, and in the alkylene, arbitrary —CH$_2$— may be replaced by —O—, —COO— or —OCO—; and R^a in formulas (4-1) to (4-5) is independently hydrogen, methyl or ethyl; and in formulas (M1) and (M2) according to item 13, the ring A² is independently 1,4-cyclohexylene or 1,4-phenylene, and in the 1,4-phenylene, arbitrary one or two hydrogens may be replaced by fluorine, methyl or trifluoromethyl;

$Z^2$ is independently a single bond, —O—, —COO— or —OCO—;

n is independently an integer from 1 to 3;

$Q^2$ is independently alkylene having 1 to 14 carbons, and in the alkylene, arbitrary hydrogen may be replaced by fluorine, and arbitrary —CH$_2$— may be replaced by —O—, —COO— or —OCO—; and R^a in formulas (4-1) to (4-5) is independently hydrogen, methyl or ethyl.

Item 15. The polymerizable liquid crystal composition according to item 12 or 13, wherein in formula (1) and formula (2) according to item 1, the ring A¹ is independently 1,4-cyclohexylene or 1,4-phenylene, and in the 1,4-phenylene, arbitrary one or two hydrogens may be replaced by fluorine or methyl;

$Z^1$ is independently a single bond, —COO— or —OCO—;

m is independently an integer from 1 to 3;

$Q^1$ is independently alkylene having 1 to 12 carbons, and in the alkylene, arbitrary —CH$_2$— may be replaced by —O—, —COO— or —OCO—;

P¹ is independently a polymerizable group represented by formula (4-1) or (4-2);

P² is a polymerizable group represented by formula (4-1) when P¹ is a polymerizable group represented by formula (4-1), and P¹ is a polymerizable group represented by formula (4-2) when P¹ is a polymerizable group represented by formula (4-2); and R$^a$ in formula (4-1) or formula (4-2) is hydrogen; and
in formula (M1) according to item 13,
the ring A$^2$ is independently 1,4-cyclohexylene or 1,4-phenylene, and in the 1,4-phenylene, one or two hydrogens may be replaced by fluorine, methyl or trifluoromethyl;
Z$^2$ is independently a single bond, —O—, —COO— or —OCO—;
n is 1 or 2;
Q$^2$ is independently alkylene having 1 to 14 carbons, and in the alkylene, arbitrary hydrogen may be replaced by fluorine and arbitrary —CH$_2$— may be replaced by —O—, —COO— or —OCO—; and
P$^3$ and P$^4$ are the same polymerizable group.

Item 16. The polymerizable liquid crystal composition according to any one of items 12 to 15, further including a liquid crystal compound other than the compound represented by formulas (M1) and (M2) according to item 13.

Item 17. The polymerizable liquid crystal composition according to any one of items 12 to 16, further including an optically active compound other than the compound represented by formulas (1) and (2) according to item 1.

Item 18. The polymerizable liquid crystal composition according to any one of items 12 to 17, further including a non-optically active and non-liquid crystalline polymerizable compound.

Item 19. A polymer formed by polymerization of the polymerizable liquid crystal composition according to any one of items 12 to 18.

Item 20. The polymer according to item 19, wherein the polymer has the optical anisotropy.

Item 21. The polymer according to item 19 or 20, wherein the polymer has optical characteristics of a negative C-plate.

Item 22. The polymer according to any one of items 19 to 21, wherein the polymer exhibits circular dichroism in the light region at a part or all of wavelengths of approximately 350 nm to approximately 750 nm.

Item 23. The polymer according to any one of items 19 to 21, wherein the polymer exhibits circular dichroism in the ultraviolet region at wavelengths of approximately 100 nm to approximately 350 nm.

Item 24. The polymer according to any one of items 19 to 21, wherein the polymer exhibits circular dichroism in the near-infrared region at wavelengths of approximately 750 nm to approximately 2,500 nm.

Item 25. An optical device containing the polymerizable liquid crystal composition according to any one of items 12 to 18, wherein the helical pitch is approximately 1 nm or more and approximately 200 nm or less.

Item 26. An optical device containing the polymer according to any one of items 19 to 23, wherein the helical pitch is approximately 1 nm or more and approximately 200 nm or less.

Item 27. An article selected from the group of a polarizing plate, an optical compensator, an alignment film, a color filter, a holographic optical device, a liquid crystal display device, a cosmetic, an ornament, an anti-counterfeit detection system, a non-linear optical device and an optical storage device, each of which contains the polymerizable liquid crystal composition according to any one of items 12 to 18.

Item 28. An article selected from the group of a polarizing plate, an optical compensator, an alignment film, a color filter, a holographic optical device, a liquid crystal display device, a cosmetic, an ornament, an anti-counterfeit detection system, a non-linear optical device and an optical storage device, each of which contains the polymer according to any one of items 19 to 24

The optically active compound having a polymerizable group of the invention has a large HTP, shows an excellent compatibility with another polymerizable liquid crystal compound, and has an excellent solubility in an organic solvent or the like. The polymerizable liquid crystal composition containing the optically active compound having a polymerizable group of the invention satisfies a plurality of characteristics such as a fast polymerization rate, an excellent adhesion to a substrate, a facile polymerization in air, an excellent chemical stability and colorlessness.

The polymer formed from the polymerizable liquid crystal composition satisfies a plurality of characteristics such as a suitable optical anisotropy, a sufficient hardness, a sufficient transparency, a high thermal resistance, an excellent weather resistance and a small photoelasticity.

Accordingly, the polymer of the invention can be utilized, for example, for a polarizing plate, an optical compensator, an alignment film, a color filter, a holographic optical device, a liquid crystal display device, a cosmetic, an ornament, an anti-counterfeit detection system, a non-linear optical device and an optical storage device.

The compound of the invention and its use will be explained below in detail. The compound represented by formula (1) may be expressed as "the compound (1)" and the same may apply to a compound represented by another formula. When one compound has a plurality of functional groups expressed by the same symbol in a chemical formula, these functional groups may be the same or different. In the phrase "arbitrary —CH$_2$-" in the invention, it is undesirable that a plurality of successive —CH$_2$— are replaced by the same group. When carbon in the ring, which is bonded to a substituent, is not clearly shown, the substituent can be bonded to any carbon without restraint as long as the bonding position is reasonable chemically. The optically active compound having a polymerizable group of the invention may be expressed as the polymerizable optically active compound, the optically active compound or simply the compound. The polymerizable liquid crystal composition may also be expressed as the liquid crystal composition or simply the composition. When a compound has one polymerizable group, it may be said to be mono-functional compound. When a compound has a plurality of polymerizable groups, it may be said to be polyfunctional compound, or it may be expressed as a name corresponding to the number of a polymerizable group.

Optically Active Compound Having Polymerizable Group

The optically active compound having a polymerizable group of the invention is characterized by the compound represented by formula (1) or (2) described above.

The compounds (1) and (2) of the invention is characterized by an extremely high chemical and physical stability under the conditions usually used and a high solubility in an organic solvent. A large or small optical anisotropy, a high or low viscosity or the like can be adjusted by a suitable selection of the ring, the bonding group and the side chain of the compound. Even when an atom constituting the compound of the invention is its isotope, the compound can be used desirably because its characteristics are equivalent to those of the original compound.

The compounds (1) and (2) are a polymerizable optically active compound characterized by having an oxiranyl group as a polymerizable group, where at least one of the oxiranyl groups is fused to a cyclohexane ring or at least one of the oxiranyl groups has a methyl group at the a position. Because of this, they can carry out cationic polymerization and polymerize easily in air at room temperature. A liquid crystal composition including the compounds (1) and/or (2) has an excellent adhesion to a supporting substrate, which will be described below in detail.

The monofunctional compound (2) has a high degree of freedom for selecting the substituent, and thus optical characteristics of a liquid crystal composition including the compound and the solubility in a solvent can be adjusted. A polymer formed by polymerization of the liquid crystal composition including the bifunctional compound (1) has a rigid cross-linked structure in comparison with a polymer formed by polymerization of the liquid crystal composition that does not include the compound (1), and thus the thermal resistance is higher, the water absorptivity, the water permeability and the gas permeability are lower, and the mechanical strength (especially, hardness) is higher. Furthermore, these compounds (1) and (2) have a group in which the oxiranyl group is fused to the cyclohexane ring, and/or an oxiranyl group having a methyl group at the a position as a polymerizable group, and thus the polymerization rate is high and the solubility in a safety solvent is high, in comparison with a compound that has an unsubstituted oxiranyl group. The safety solvent means a solvent such as PGMEA (polyethylene glycol monomethyl ether acetate) and has less environmental load.

In formulas (1) and (2) described above, the ring $A^1$ is independently 1,4-cyclohexylene, 1,4-phenylene, pyridine-2,5-diyl, pyrimidine-2,5-diyl, naphthalene-2,6-diyl, tetrahydronaphthalene-2,6-diyl or fluorene-2,7-diyl. In these rings, one or nonadjacent two —$CH_2$— may be replaced by —O—, and in the 1,4-phenylene and the fluorene-2,7-diyl, arbitrary hydrogen may be replaced by fluorine, chlorine, cyano, methyl, ethyl, methoxy, hydroxy, formyl, acetoxy, acetyl, trifluoroacetyl, difluoromethyl or trifluoromethyl. Among these, 1,4-cyclohexylene, 1,4-phenylene or naphthalene-2,6-diyl is desirable, and in the 1,4-phenylene, arbitrary one or two hydrogens may be replaced by fluorine, methyl, methoxy or trifluoromethyl. In the ring $A^1$, 1,4-cyclohexylene or 1,4-phenylene is especially desirable, and in the 1,4-phenylene, arbitrary one or two hydrogens may be replaced by fluorine or methyl. These compounds show a tendency to increase the solubility in a solvent, when the ring $A^1$ is 1,4-cyclohexylene, and these compounds show a tendency to increase the helical twisting power, when the ring $A^1$ is 1,4-phenylene or naphthalene-2,6-diyl. These compounds show a tendency to be excellent for the solubility in a solvent, when the ring $A^1$ is 1,4-phenylene in which arbitrary one or two hydrogens are replaced by fluorine, methyl, methoxy or trifluoromethyl.

That is, desirable examples of the ring $A^1$ include 1,4-cyclohexylene, 1,4-phenylene, 2-fluoro-1,4-phenylene, 3-fluoro-1,4-phenylene, 2,3-difluoro-1,4-phenylene, 2,5-difluoro-1,4-phenylene, 2,6-difluoro-1,4-phenylene, 2-methyl-1,4-phenylene, 3-methyl-1,4-phenylene, 2,3-dimethyl-1,4-phenylene, 2,5-dimethyl-1,4-phenylene, 2,6-dimethyl-1,4-phenylene, 2-methoxy-1,4-phenylene, 3-methoxy-1,4-phenylene, 2-trifluoromethyl-1,4-phenylene and 3-trifluoromethyl-1,4-phenylene.

In formulas (1) and (2) described above, bonding group $Z^1$ is independently a single bond, —O—, —COO—, —OCO—, —CH=CH—COO—, —OCO—CH=CH—, —OCO—$(CH_2)_2$—, —$(CH_2)_2$—COO—, —O$(CH_2)_2$O—, —C≡C—COO—, —OCO—C≡C—, —$CH_2$O—, —O$CH_2$—, —$CF_2$O—, —O$CF_2$—, —$(CH_2)_4$—, —$(CH_2)_2$—, —$(CF_2)_2$—, —CH=CH—, —CF=CF— or —C≡C—.

Among these, $Z^1$ is more preferably a single bond, —COO—, —COO—, —CH=CH—COO—, —OCO—CH=CH—, —OCO—$(CH_2)_2$—, —$(CH_2)_2$—COO—, —$(CH_2)_2$— or —C≡C—, and further preferably a single bond, —COO— or —OCO—. The compounds show a tendency to be excellent for the solubility in a solvent, when $Z^1$ is a single bond, —$(CH_2)_2$—, —$CH_2$O—, —O$CH_2$—, —$CF_2$O—, —O$CF_2$—, —CH=CH—, —CF=CF— or —$(CH_2)_4$—. These compounds show a tendency to induce the optical anisotropy of the liquid crystal composition and the polymer, when $Z^1$ is —C≡C—. These compounds show a tendency to be excellent for the compatibility with a component other than the compounds (1) and (2) in the liquid crystal composition, when $Z^1$ is a single bond, —COO— or —OCO—.

In formulas (1) and (2) described above, m is independently an integer from 1 to 5, and preferably an integer from 1 to 3. Each of a plurality of $Z^1$ may be different groups or at least two of a plurality of $Z^1$ may be the same group, when m is independently 2 or more. At this time, each of a plurality of the ring $A^1$ may also be different rings or at least two of a plurality of the ring $A^1$ may also be the same ring.

In formulas (1) and (2) described above, $Q^1$ is independently alkylene having 1 to 20 carbons, and in the alkylene, arbitrary hydrogen may be replaced by fluorine or chlorine and arbitrary —$CH_2$— may be replaced by —O—, —COO—, —OCO—, —CH=CH— or —C≡C—. A desirable example of the alkylene is alkylene having 1 to 12 carbons, and in the alkylene, arbitrary —$CH_2$— may be replaced by —O—, —COO— or —OCO—. An especially desirable example of the alkylene is alkylene having 2 to 10 carbons, and in the alkylene, one or two nonadjacent —$CH_2$— is replaced by —O—. Straight chain alkylene is desirable in the alkylene having 1 to 12 carbons. The compound (1) or (2) shows a tendency to increase the liquid crystallinity, when the chain length of the alkylene is long, and the compound (1) or (2) shows a tendency to increase the solubility in a polar solvent, when one or two nonadjacent —$CH_2$— is replaced by —O— in the alkylene.

In formulas (1) and (2) described above, $P^1$ is independently a polymerizable group represented by formula (4-1) or (4-2) described above. In formula (4-1) or (4-2) described above, $R^a$ is hydrogen, halogen or alkyl having 1 to 5 carbons, and desirable $R^a$ is hydrogen.

In formulas (1) and (2) described above, $P^2$ is a polymerizable group represented by any one of formulas (4-1) to (4-5) described above. In formulas (4-1) to (4-5) described above, $R^a$ is hydrogen, halogen or alkyl having 1 to 5 carbons. Desirable $R^a$ is hydrogen, when $P^2$ is formulas (4-1) to (4-3), or formula (4-5) described above, and desirable $R^a$ is methyl or ethyl, when $P^2$ is formula (4-4) described above. Desirable $P^2$ is formula (4-1) described above, when $P^1$ is formula (4-1) described above, and desirable $P^2$ is formula (4-2) described above, when $P^1$ is formula (4-2) described above.

In formulas (1) and (2) described above, these compounds are desirable in view of a fast polymerization rate, when $P^1$ and $P^2$ are the same polymerizable group, and is the polymerizable group represented by formula (4-1) or (4-2) described above. The compound (1) has two polymerizable groups, and thus a polymer formed from a composition including the compound (1) may have cross-linked structure and shows a tendency to increase the mechanical and thermal stability.

In formula (1) described above, $X^1$ is a divalent group having chirality represented by any one of formulas (3-1) to (3-7) described above. The compound (1) is more desirable when $X^1$ is a divalent group having chirality represented by any one of formulas (3-5) to (3-7) described above, since the compound (1) shows a tendency to have a high HTP.

Incidentally, when $X^1$ is formula (3-5) and m is 2 to 4, $Z^1$ is not —OCO—$(CH_2)_2$—, —$(CH_2)_2$—COO— or —O$(CH_2)_2$O—. When $X^1$ is (3-5) and m is 1, $Q^1$ is alkylene having 1 to 20 carbons where the part next to the ring $A^1$ in the alkylene is not —$(CH_2)_2$—COO—, —OCO—$(CH_2)_2$—, —O$(CH_2)_2$O—, —O$(CH_2)_3$— or —$(CH_2)_3$O—.

In formula (2) described above, $X^2$ is a monovalent group having chirality, represented by any one of formulas (3-8) to (3-10) described above, and the compound (2) is more desirable when $X^2$ is formula (3-9) or (3-10), since the compound (2) shows a tendency to be excellent for the compatibility with a component other than the compound (2) in the polymerizable liquid crystal composition.

The compound having the desired characteristics can be obtained by a suitable selection of the kind of the polymerizable group, the alkylene chain, the ring and the bonding group, the number of the ring and so on. The compounds (1) and (2) can be synthesized by a combination of the technique in synthetic organic chemistry. Methods for an introduction of the desired terminal group, ring and bonding group to starting materials are described in books such as Houben-Weyl, Methods of Organic Chemistry, Georg Thieme Verlag, Stuttgart; Organic Syntheses, John Wily & Sons, Inc.; Organic Reactions, John Wily & Sons Inc.; Comprehensive Organic Synthesis, Pergamon Press; and New Experimental Chemistry Course (Shin Jikken Kagaku Kouza, in Japanese), Maruzen Co., Ltd.

In the schemes below, the symbols have the same definition with those in formulas (1) and (2) described above, unless otherwise noted. One example of the synthetic methods for the compounds (1) and (2) described above will be explained by Schemes 1 to 11. In these schemes, $MSG^1$ and $MSG^2$ are an organic monovalent group having at least one ring. The organic monovalent groups represented by a plurality of $MSG^1$ (or $MSG^2$) may be the same or different. The compounds (1A) to (1K) correspond to the compound (1) or (2) of the invention. In the following schemes, "Hal" stands for a halogen atom and "Ph" stands for a phenyl group.

Scheme 1: Compound where the Bonding Group $Z^1$ is a Single Bond

As shown below, the compound (1A) is synthesized by the reaction of the compound (S1) with the compound (S2) that is synthesized by a known method, in an aqueous solution of carbonate in the presence of a catalyst such as tetrakis(triphenylphosphine) palladium.

The compound (1A) can also be synthesized by the reaction of the compound (S3) that is synthesized by a known method, with n-butyllithium, and then with zinc chloride, and by the reaction of the resulting intermediate with the compound (S2) in the presence of a catalyst such as dichlorobis(triphenylphosphine)palladium.

Scheme 2: Compound where the bonding group $Z^1$ is
——CH=CH——

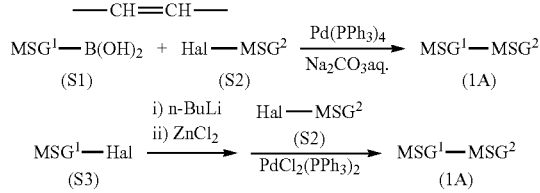

As shown below, a phosphorus ylide is synthesized by the addition of a base such as potassium t-butoxide to the phosphonium salt (S5) that is synthesized by a known method. The compound (1B) is synthesized by the reaction of the aldehyde (S4) with the phosphorus ylide. Since a cis-isomer may be formed depending on the reaction conditions or the kinds of a substrate, the cis-isomer is isomerized to the corresponding trans-isomer by a known method, if necessary.

Scheme 3: Compound where the bonding group $Z^1$ is ——$(CH_2)_2$——

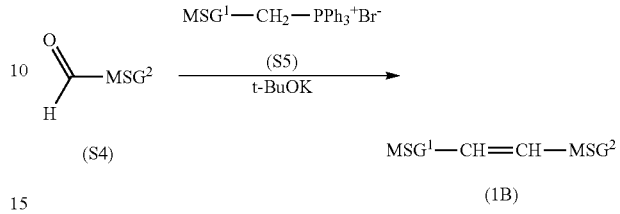

As shown below, the compound (1C) is synthesized by hydrogenation of the compound (1B) in the presence of a catalyst such as palladium on carbon.

Scheme 4: Compound where the bonding group $Z^1$ is ——$(CF_2)_2$——

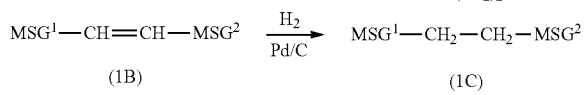

As shown below, the compound (1D) having —$(CF_2)_2$— is synthesized by fluorination of the diketone (S6) in the presence of a fluorinating catalyst such as sulfur tetrafluoride, according to the method described in J. Am. Chem. Soc., 2001, 123, 5414.

Scheme 5: Compound where the bonding group $Z^1$ is ——$(CH_2)_4$——

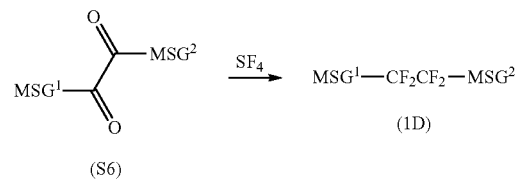

As shown below, the compound where the boding group is —$(CH_2)_2$—CH=CH— is synthesized by use of the phosphonium salt (S7) instead of the phosphonium salt (S5) according to the method in Scheme 2. The compound (1E) is synthesized by catalytic hydrogenation of the product.

Scheme 6: Compound where the bonding group $Z^1$ is ——$CH_2O$—— or ——$OCH_2$——

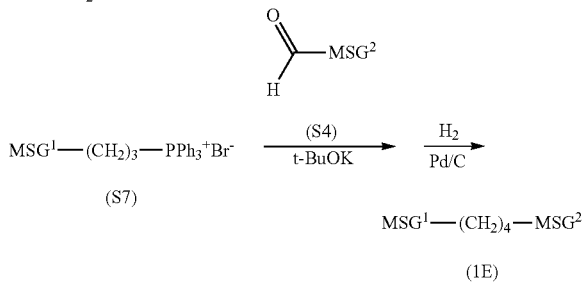

As shown below, the compound (S4) is reduced with a reducing agent such as sodium borohydride, giving the compound (S8). The compound (S8) is then halogenated with a halogenating agent such as hydrobromic acid, giving the compound (S9). The compound (1F) is synthesized by the reaction of the compound (S9) with the compound (S10) in the presence of potassium carbonate or the like. The compound having —CH$_2$O— can also be synthesized in the same manner.

Scheme 7: Compound where the bonding group $Z^1$ is
—COO— or —OCO—

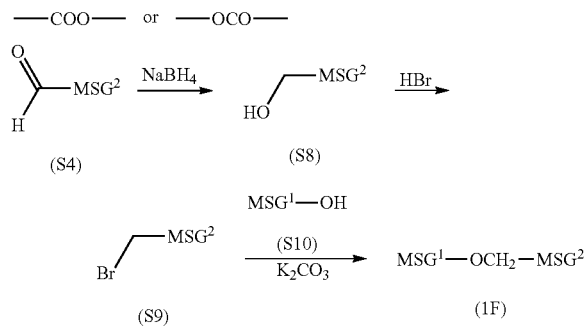

As shown below, the compound (S3) is allowed to react with n-butyllithium and then with carbon dioxide, giving the carboxylic acid (S11). The compound (1G) where the bonding group is —COO— is synthesized by dehydration of the compound (S11) and the compound (S10) in the presence of DCC (1,3-dicyclohexylcarbodiimide) and DMAP (4-dimethylaminopyridine). The compound having —OCO— can also be synthesized in the same manner.

The compound (S11) is allowed to react with thionyl chloride, oxalyl chloride or the like, giving an acid chloride. The compound (1G) is also synthesized by the reaction of the acid chloride with the compound (S10) in the presence of a base such as pyridine or triethylamine.

Scheme 8: Compound where the bonding group $Z^1$ is —CF=CF—

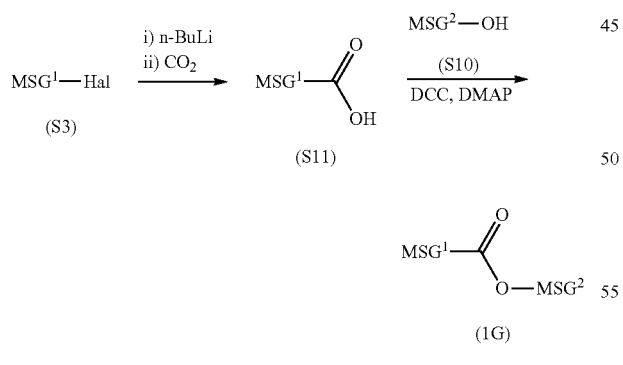

As shown below, the compound (S3) is allowed to react with n-butyllithium and then with tetrafluoroethylene, giving the compound (S12). The compound (1H) is synthesized by the reaction of the compound (S12) with the compound synthesized by the reaction of the compound (S2) with n-butyllithium. A cis-isomer of the compound (1H) is formed by selecting the reaction conditions.

Scheme 9: Compound where the bonding group $Z^1$ is —C≡C—

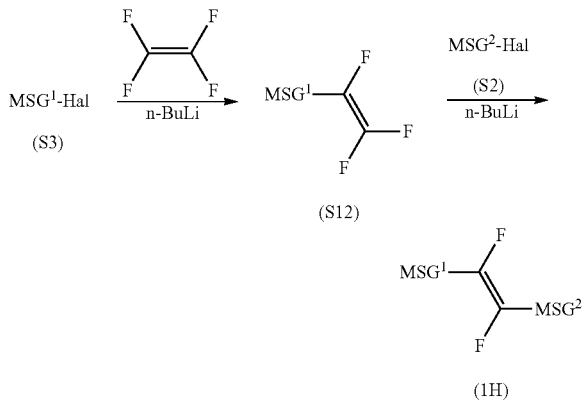

As shown below, the compound (1I) is synthesized by the reaction of the compound (S13) with the compound (S2) in the presence of a catalyst such as dichloropalladium and a copper halide.

Scheme 10: Compound where the bonding group $Z^1$ is
—C≡C—COO—

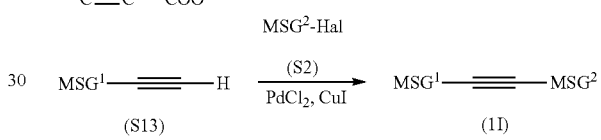

As shown below, the compound (S13) is allowed to react with n-butyllithium and then with carbon dioxide, giving the carboxylic acid (S14). The compound (1J) where the bonding group is —C≡C—COO— is synthesized by dehydration of the compound (S14) and the compound (S10) in the presence of DCC and DMAP. The compound where the bonding group is —OCO—C≡C— can also be synthesized in the same manner.

The compound (S14) is allowed to react with thionyl chloride, oxalyl chloride, or the like, giving an acid chloride. The compound (1J) is also synthesized by the reaction of the acid chloride with the compound (S10) in the presence of a base such as pyridine or triethylamine.

Scheme 11: Compound where the $Z^1$ is —CF$_2$O— or —OCF$_2$—

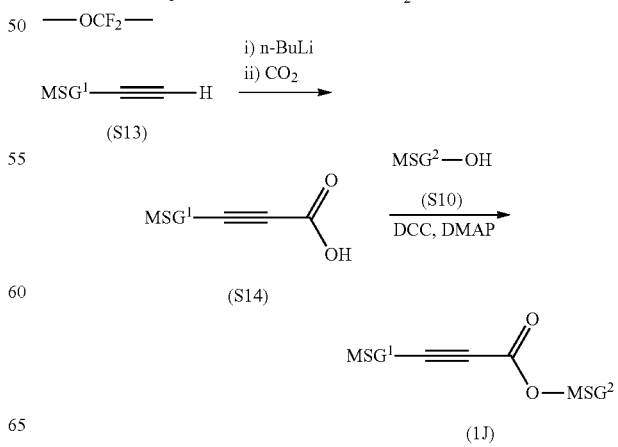

As shown below, the compound (1G) is treated with a thionating agent such as Lawesson's reagent, giving the compound (S15). The compound (1K) where the bonding group is —CF₂O— is synthesized by fluorination of the compound (S15) with a hydrogen fluoride-pyridine complex (HF-Py) and NBS (N-bromosuccinimide). The compound (1K) is also be synthesized by fluorination of the compound (S15) with (diethylamino)sulfur trifluoride (DAST). The compound having —OCF₂— can also be synthesized in the same manner. The compounds having these bonding groups can also be synthesized by the method described in P. Kirsch et al., Angew. Chem. Int. Ed. 2001, 40, 1480.

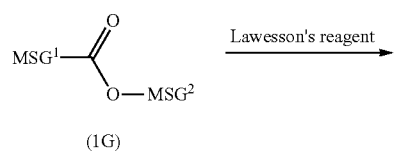

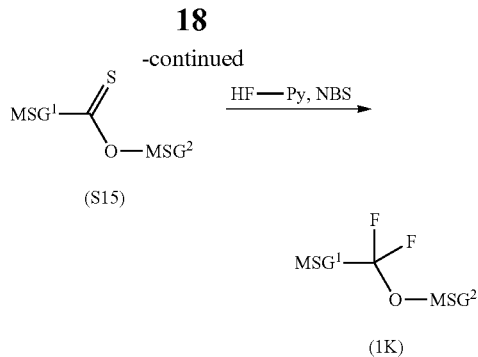

The compounds (1) and (2) of the invention can be synthesized by a combination of the methods described above, but not always limited to the methods described above. Examples of compounds synthesized by the method described above are as follows. The structures of compounds synthesized in the manner described above can be confirmed by, for example, proton NMR spectra.

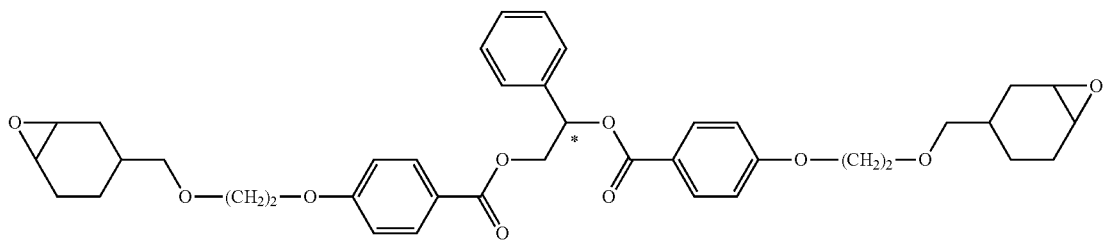
(1-1-1)

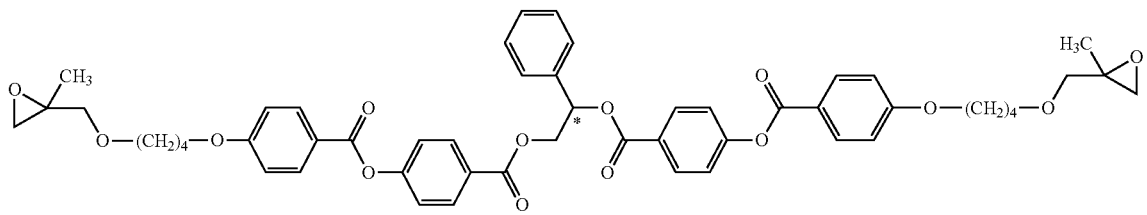
(1-1-2)

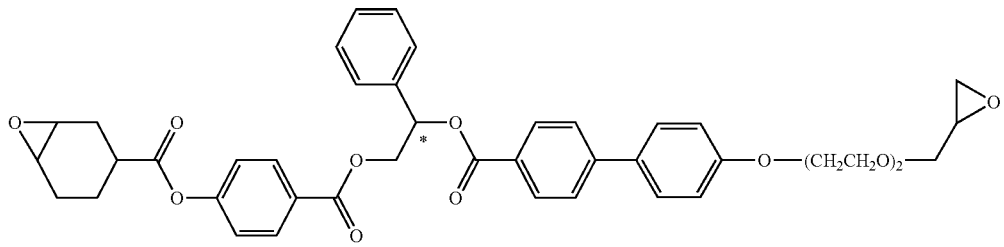
(1-1-3)

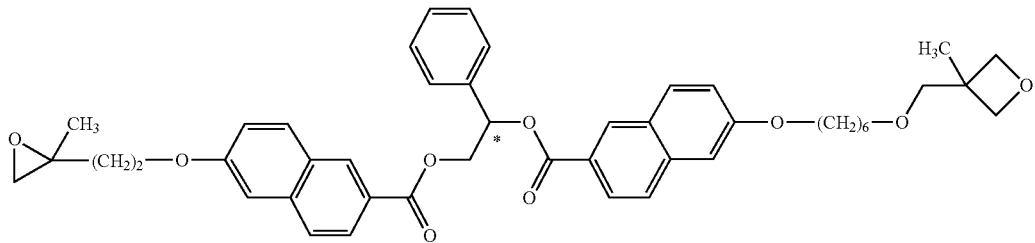
(1-1-4)

-continued
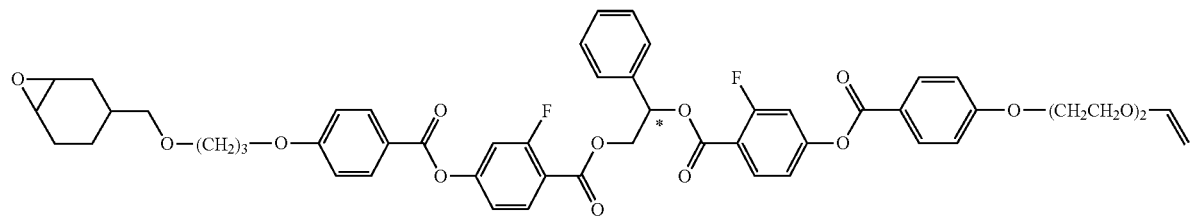
(1-1-5)
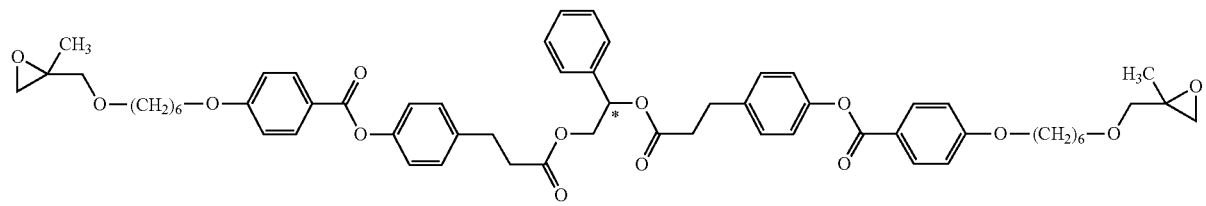
(1-1-6)
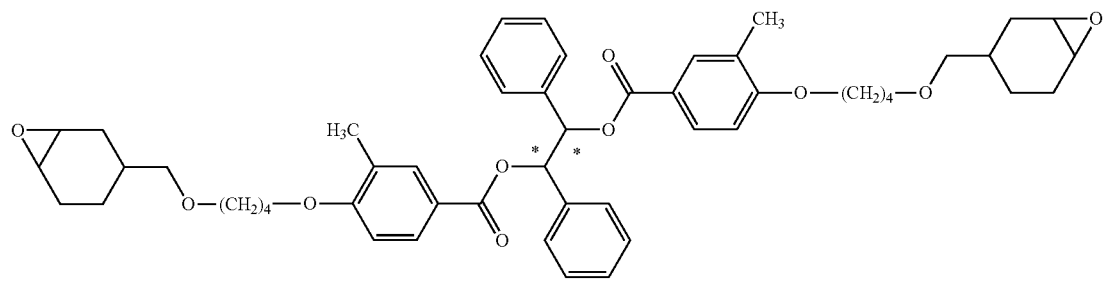
(1-2-1)
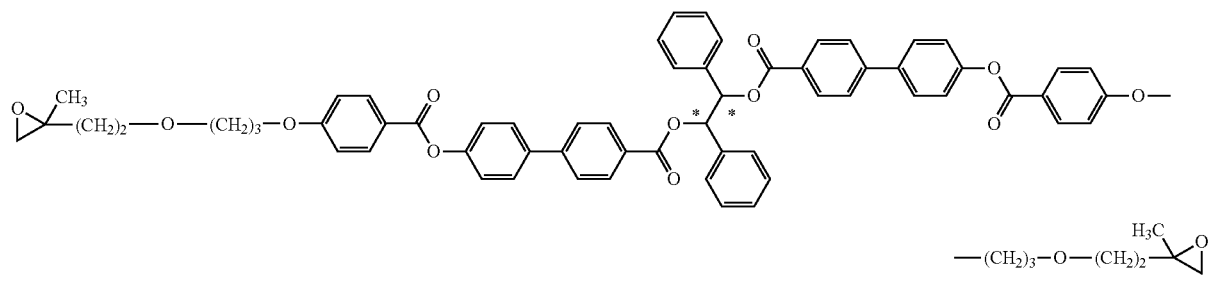
(1-2-2)
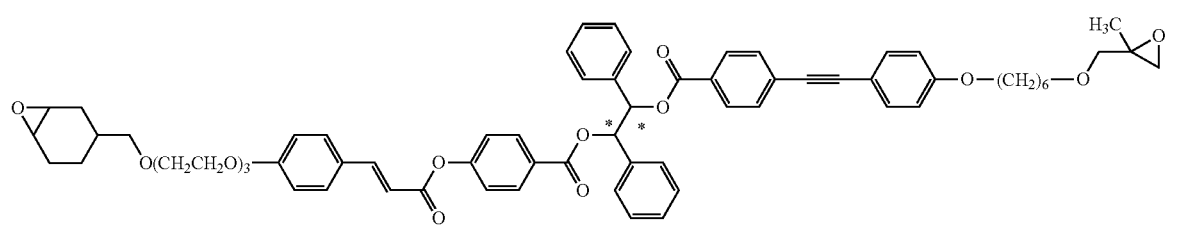
(1-2-3)
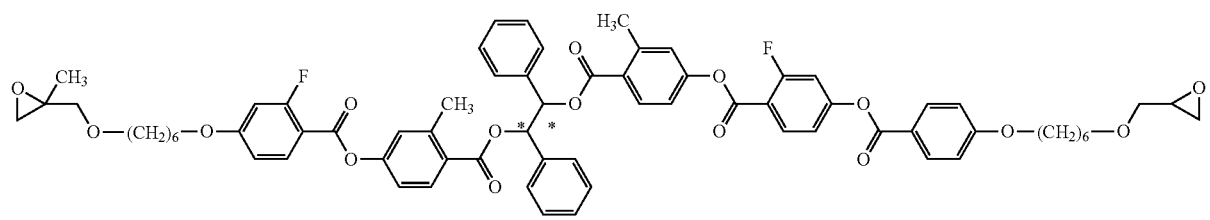
(1-2-4)

-continued
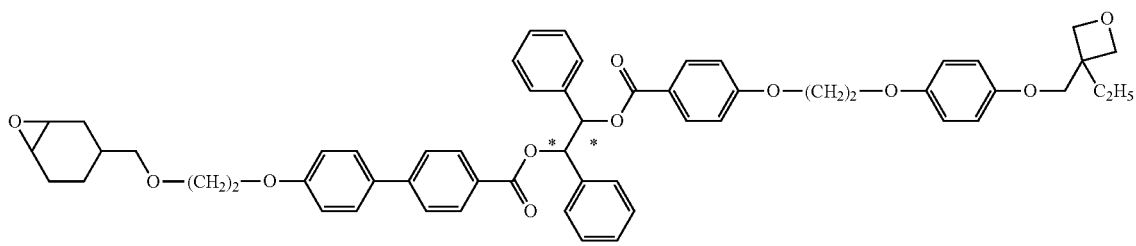
(1-2-5)
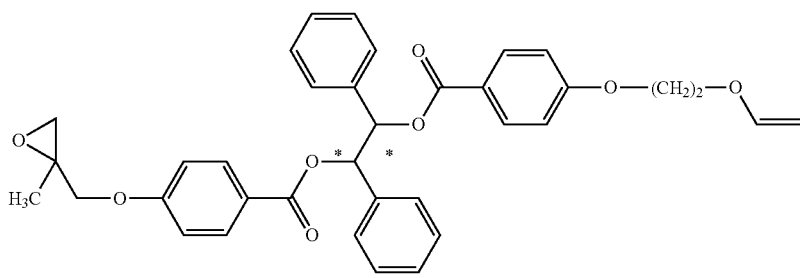
(1-2-6)
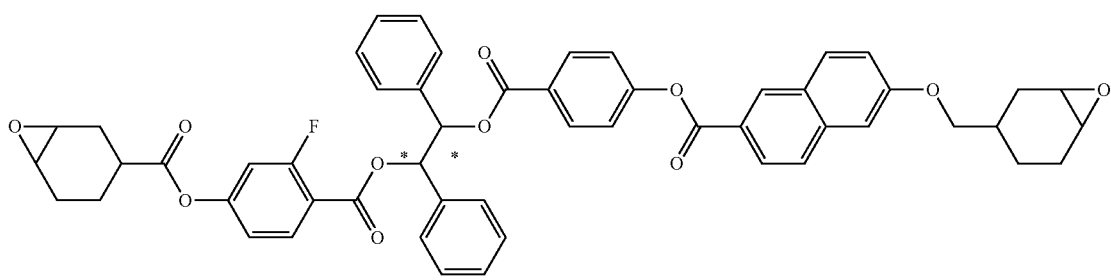
(1-2-7)
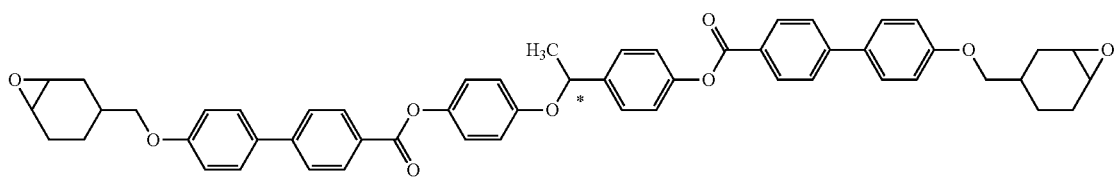
(1-3-1)
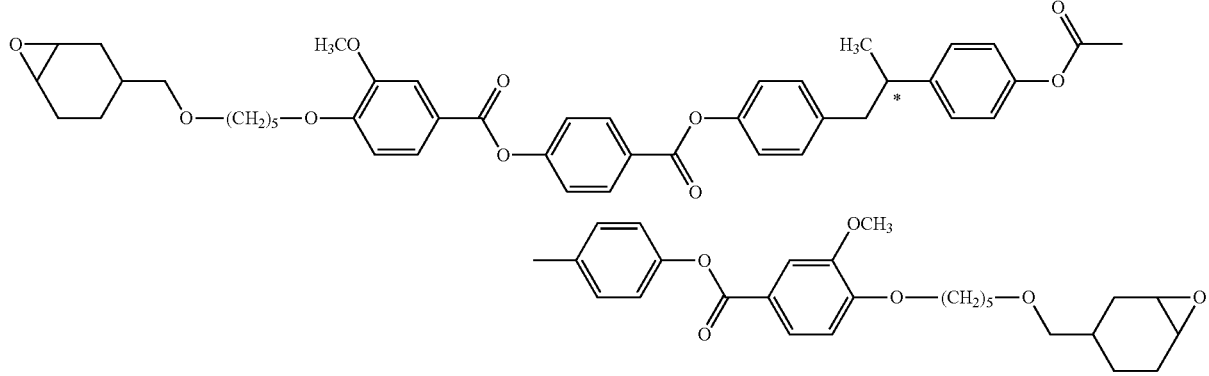
(1-3-2)

(1-3-3)
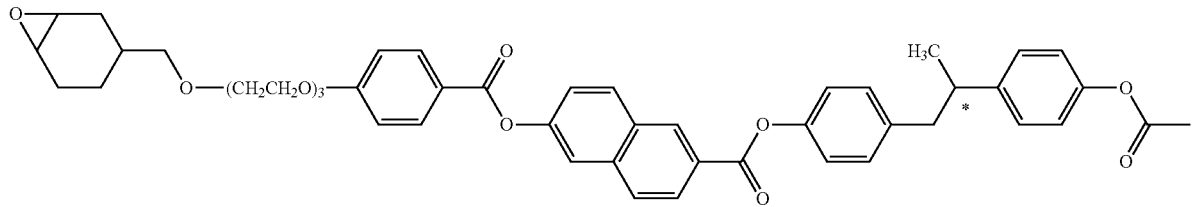
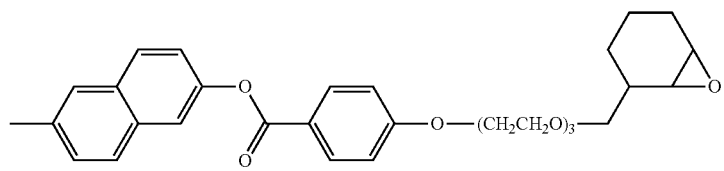
(1-3-4)
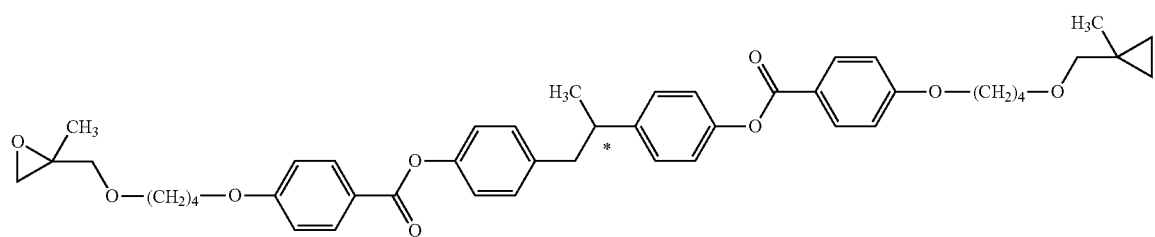
(1-3-5)
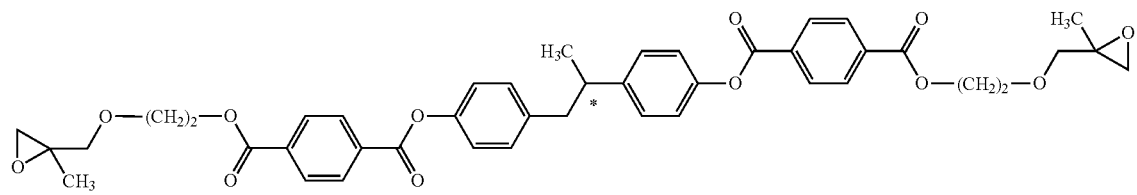
(1-3-6)
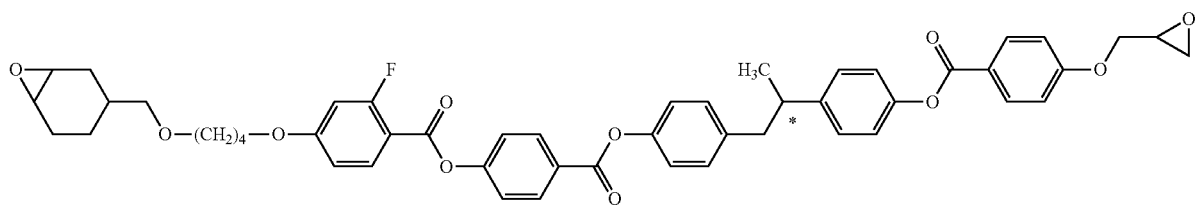
(1-3-7)
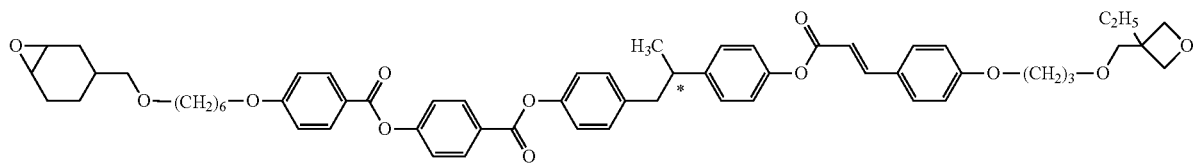
(1-3-8)
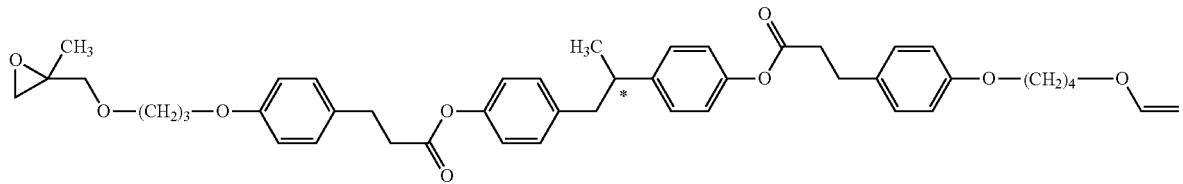

-continued
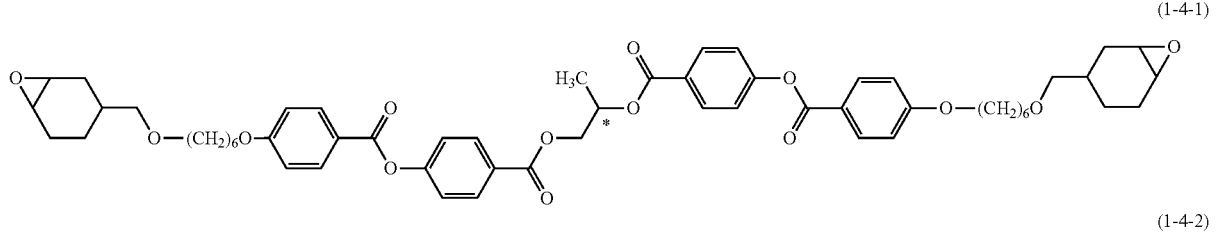
(1-4-1)
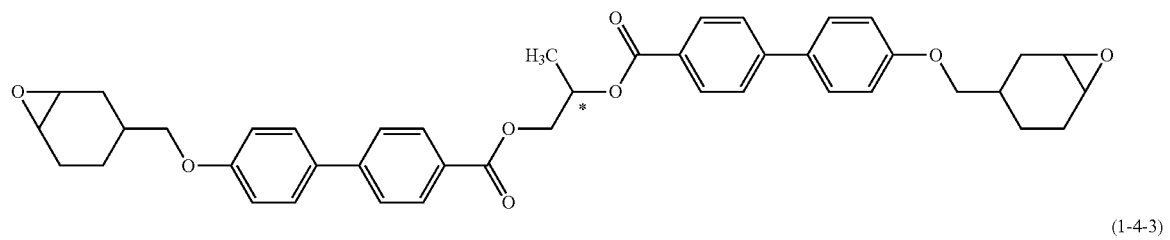
(1-4-2)
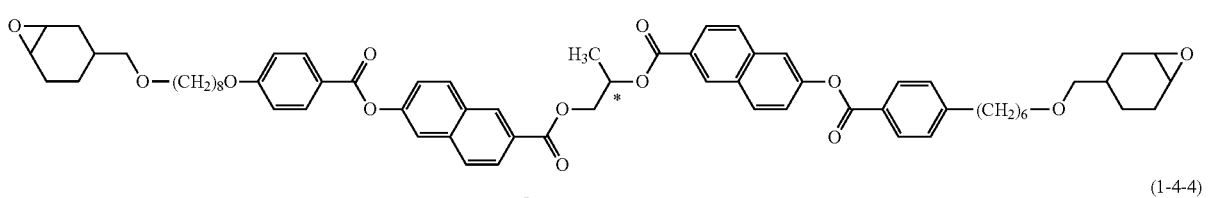
(1-4-3)
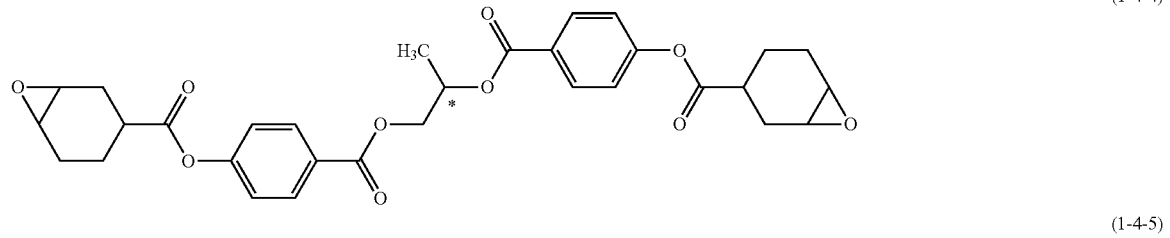
(1-4-4)
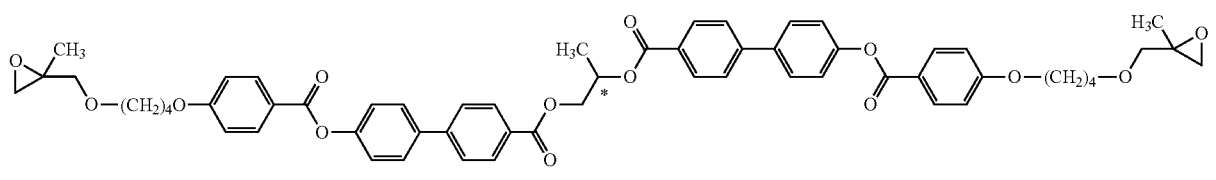
(1-4-5)
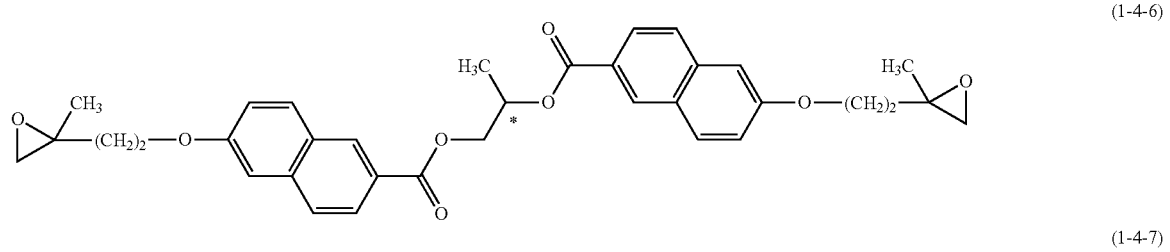
(1-4-6)
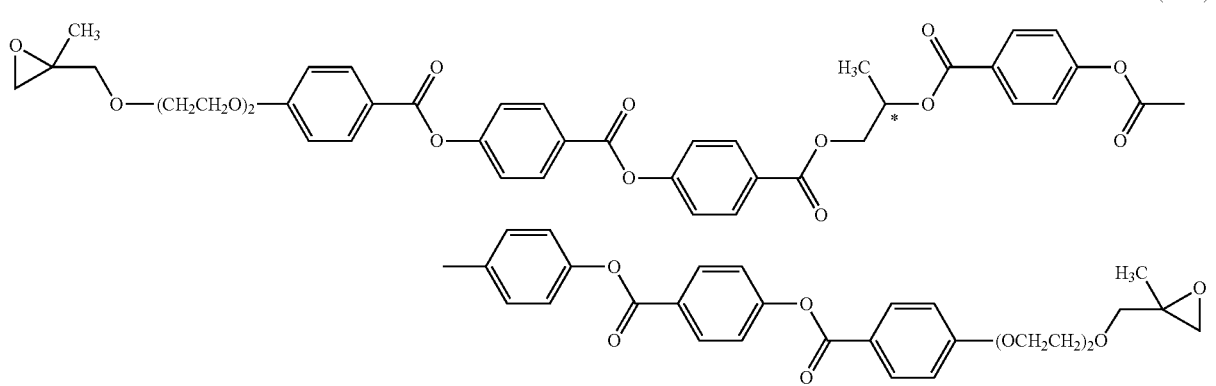
(1-4-7)

(1-4-8)
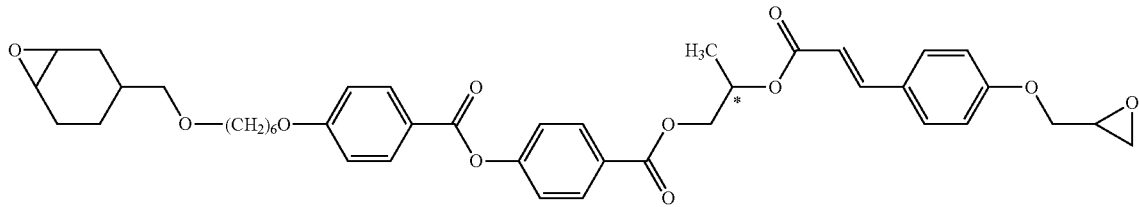
(1-4-9)
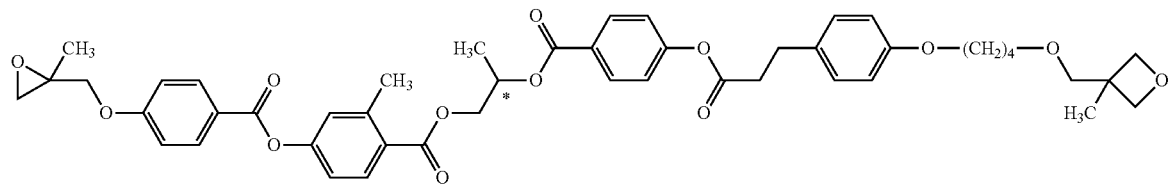
(1-4-10)
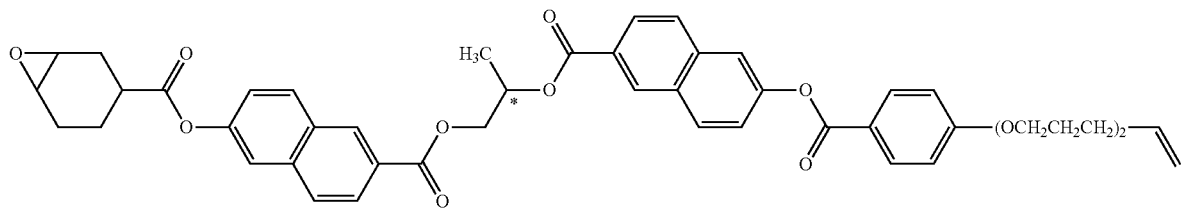
(1-4-11)
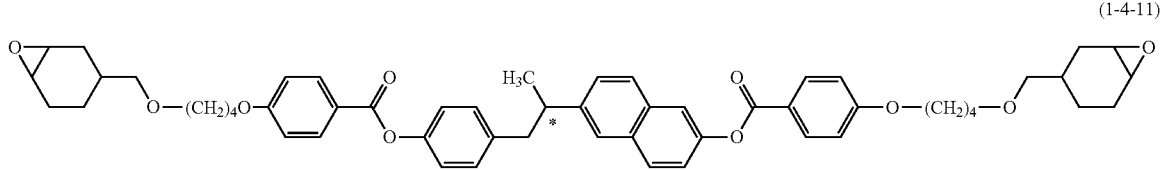
(1-5-1)
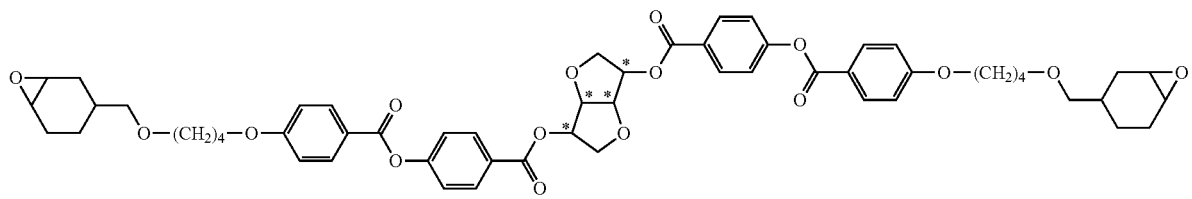
(1-5-2)
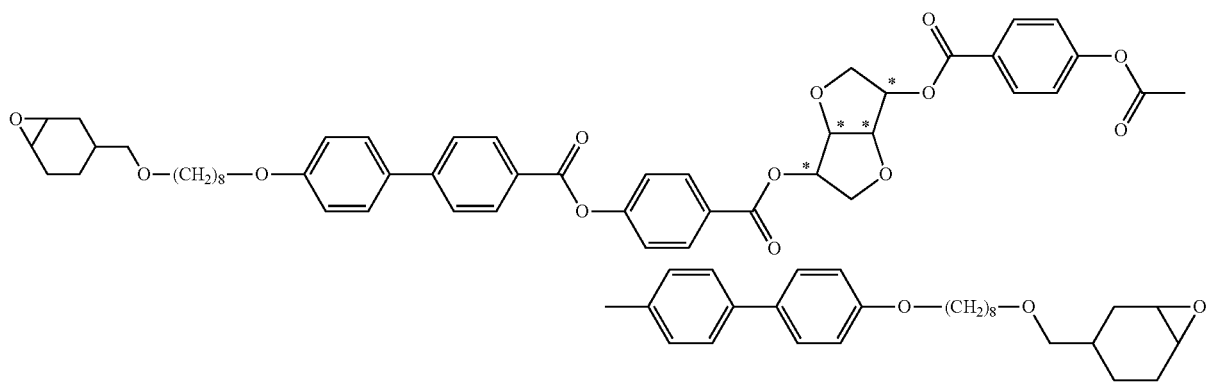

(1-5-3)
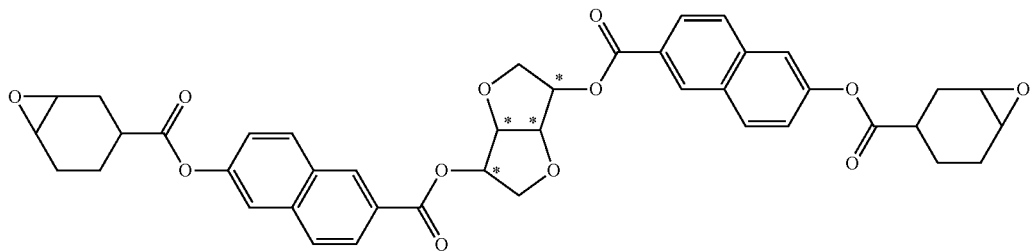
(1-5-4)
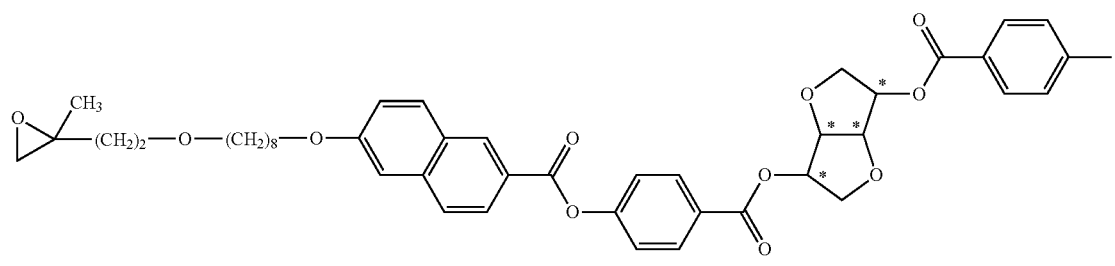
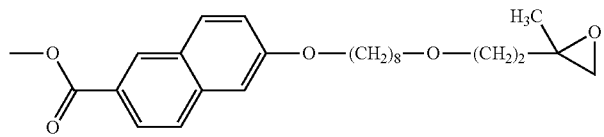
(1-5-5)
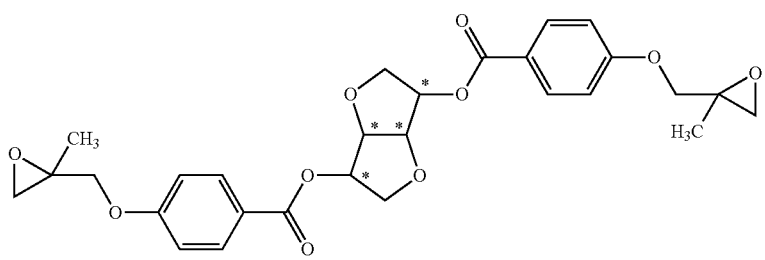
(1-5-6)
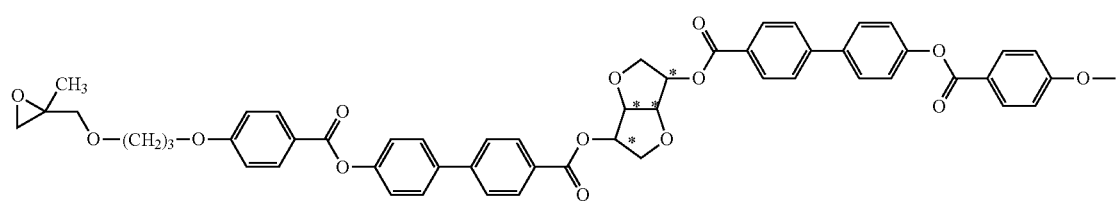
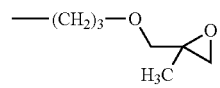
(1-5-7)
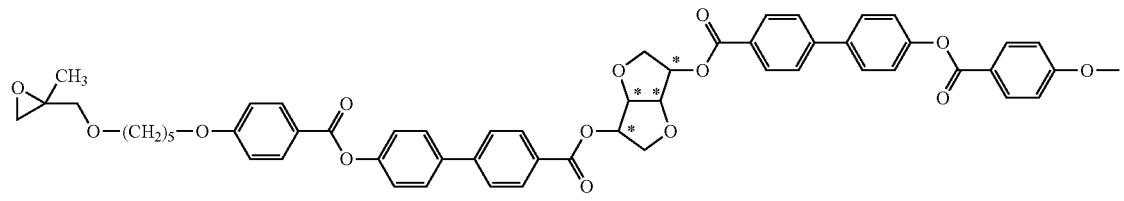
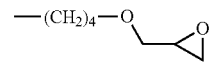

-continued
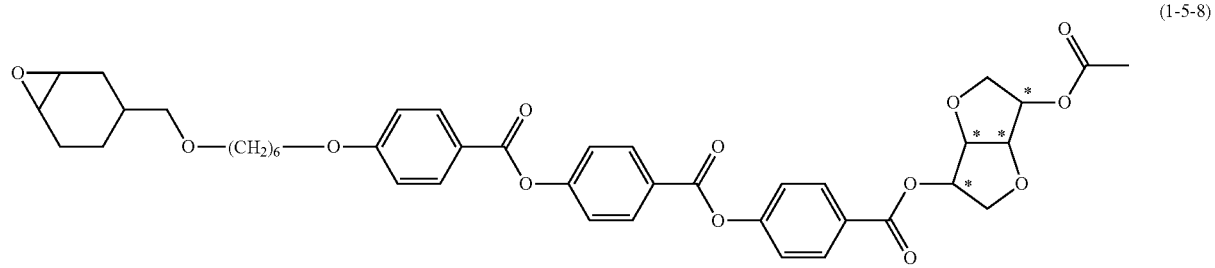
(1-5-8)
(1-5-9)
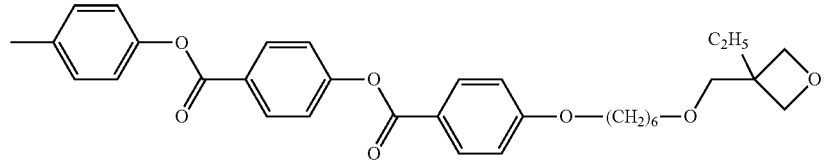
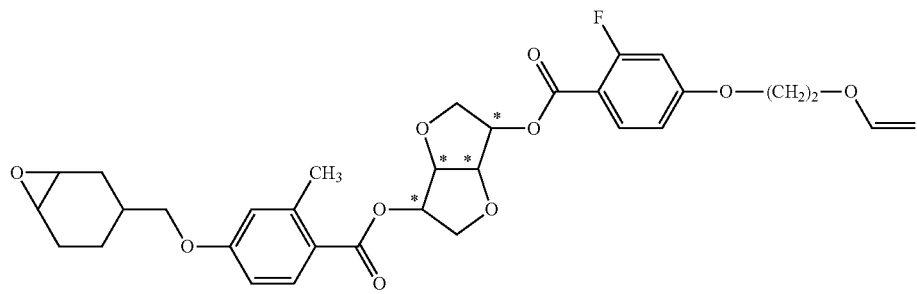
(1-6-1)
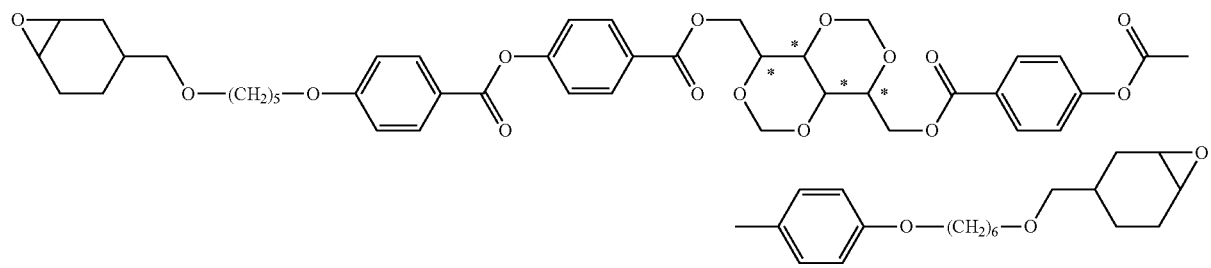
(1-6-2)
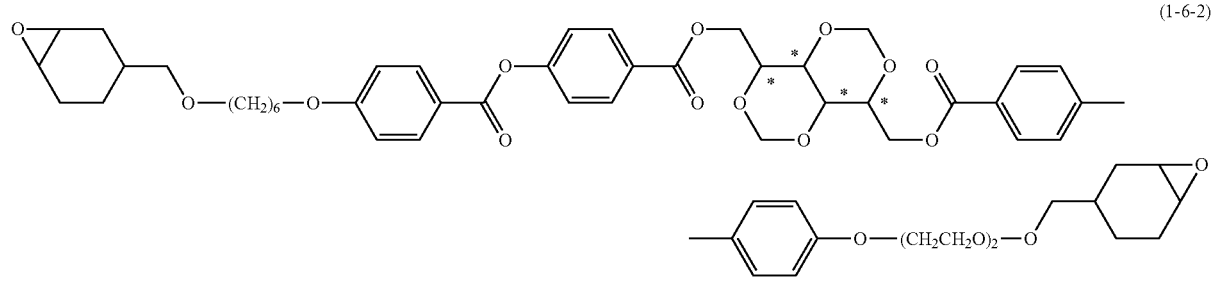
(1-6-3)
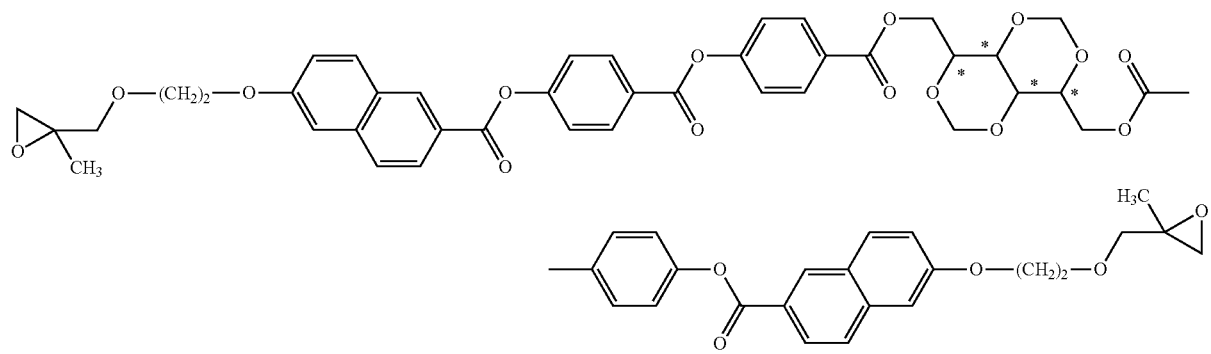

(1-6-4)
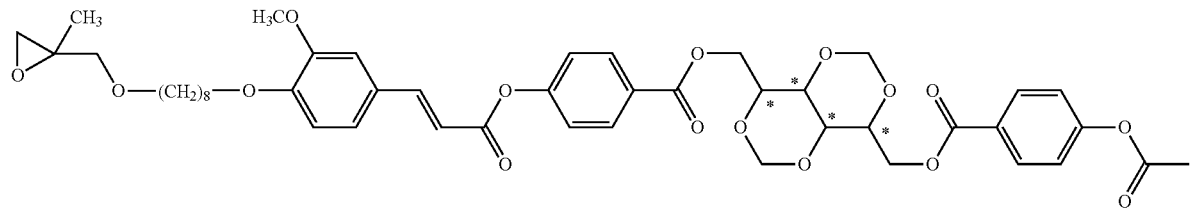
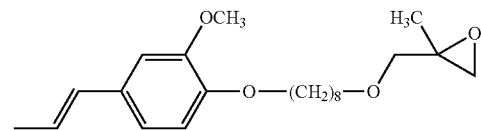
(1-6-5)
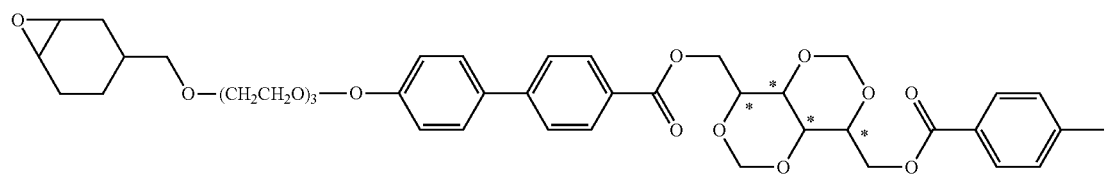
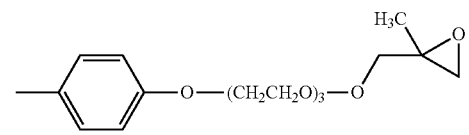
(1-6-6)
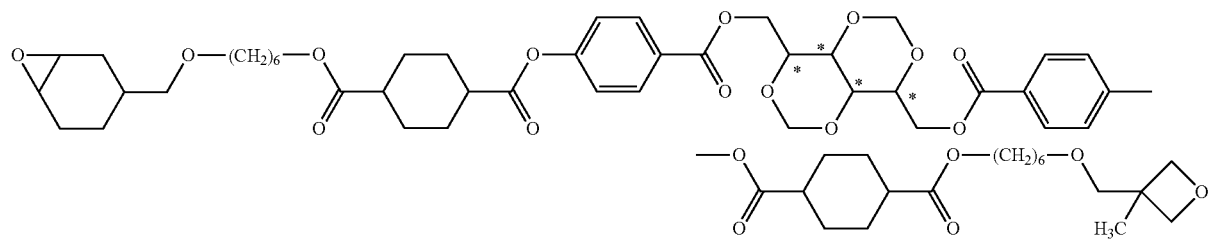
(1-6-7)
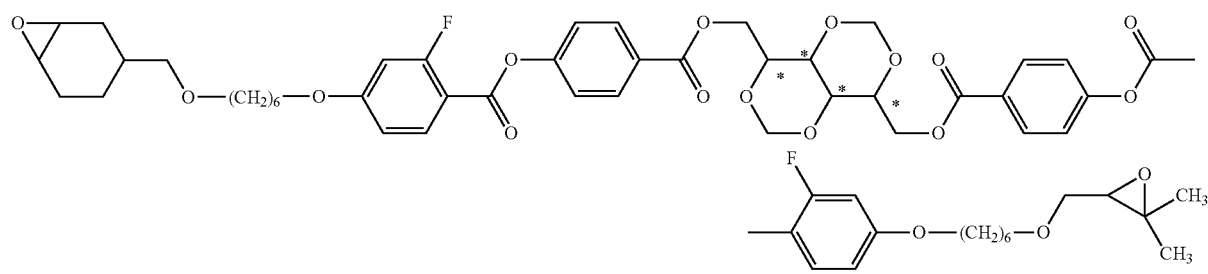
(1-6-8)
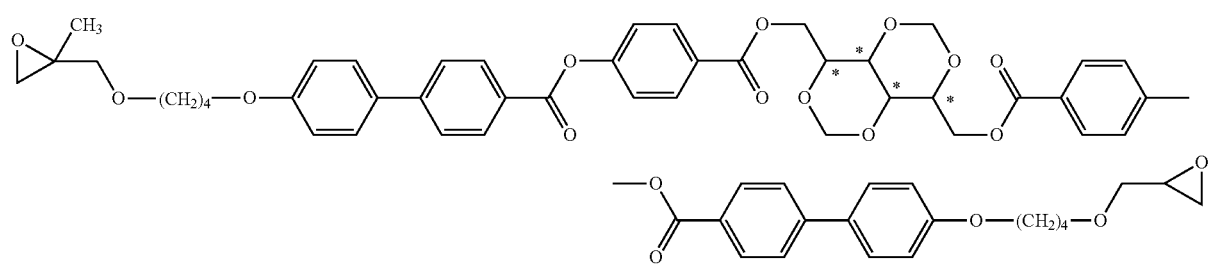

-continued
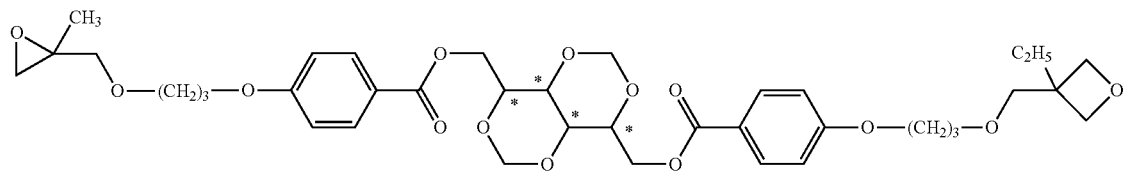
(1-6-9)
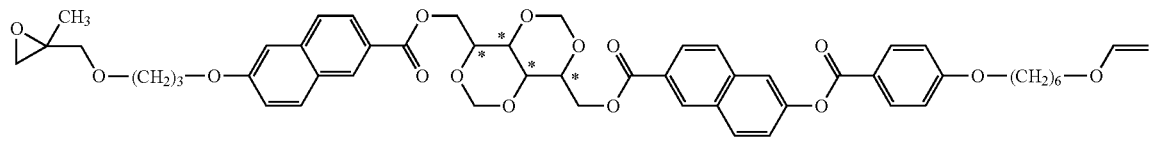
(1-6-10)
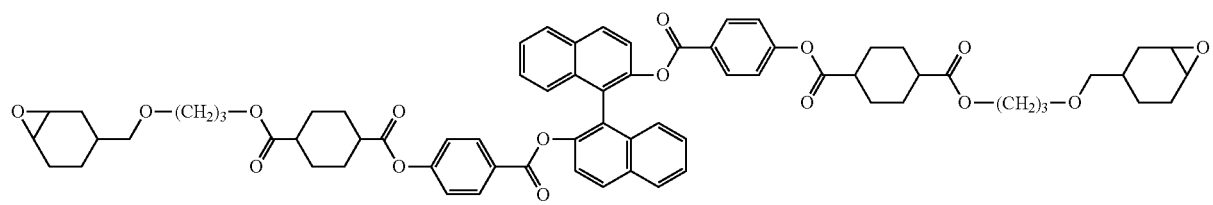
(1-7-1)
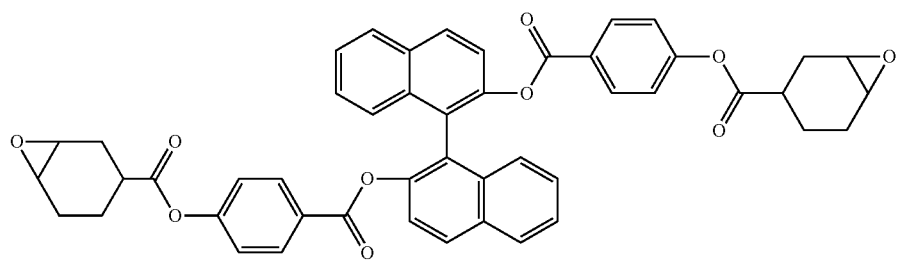
(1-7-2)
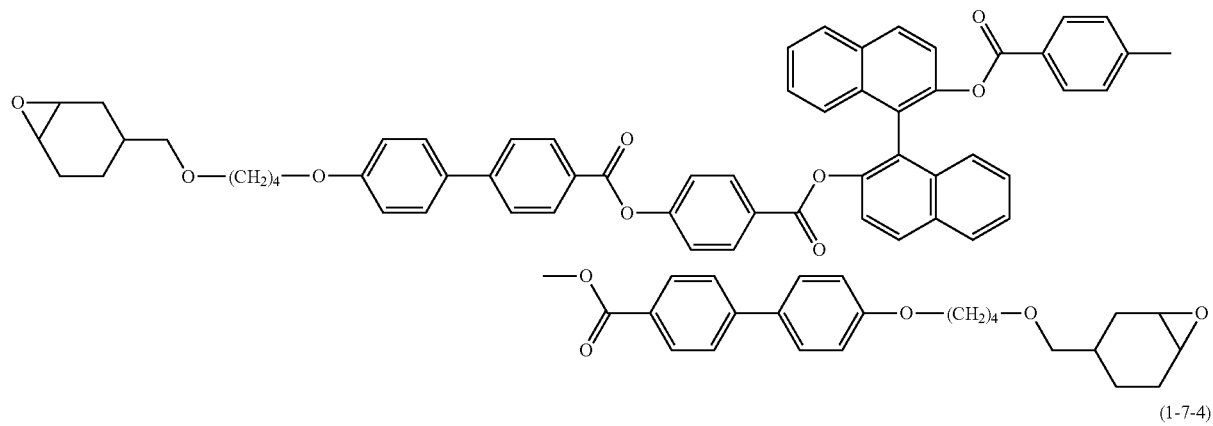
(1-7-3)
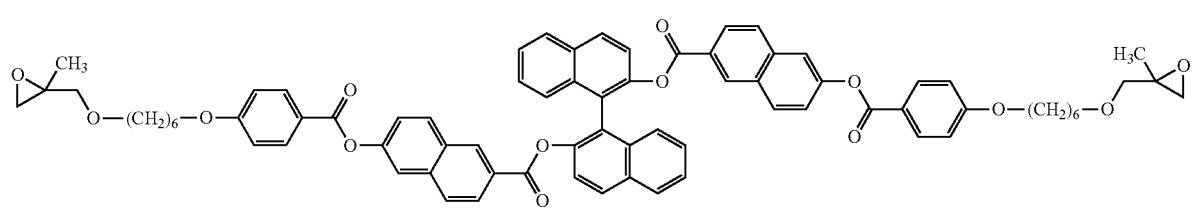
(1-7-4)

(1-7-5)
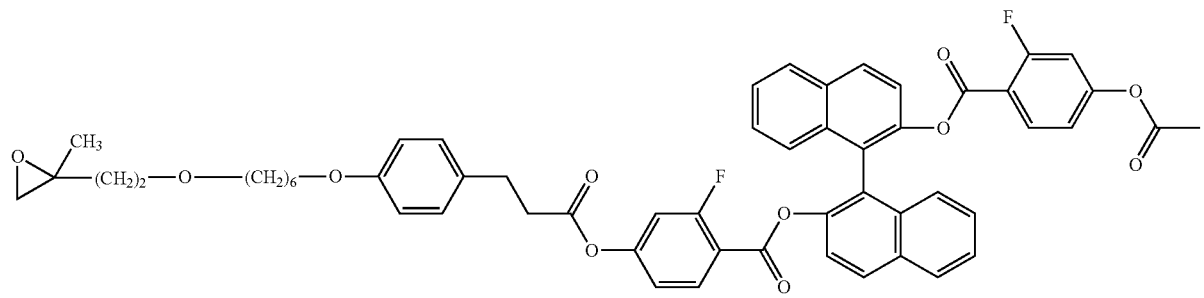
(1-7-6)
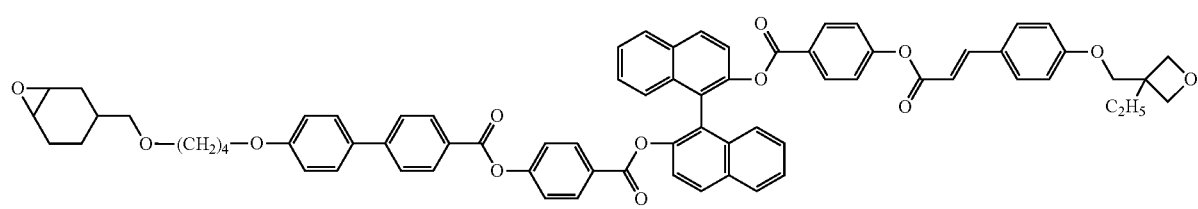
(1-7-7)
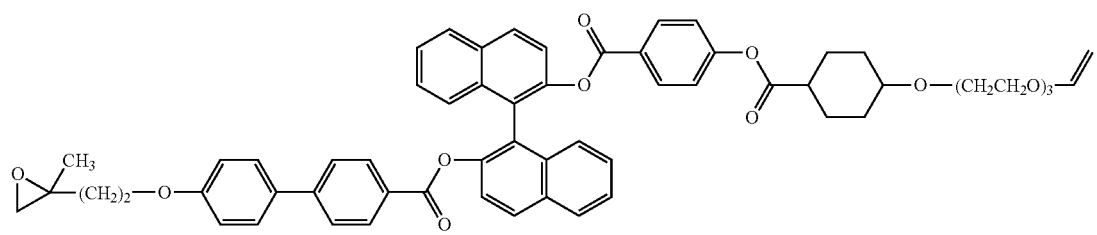
(1-7-8)
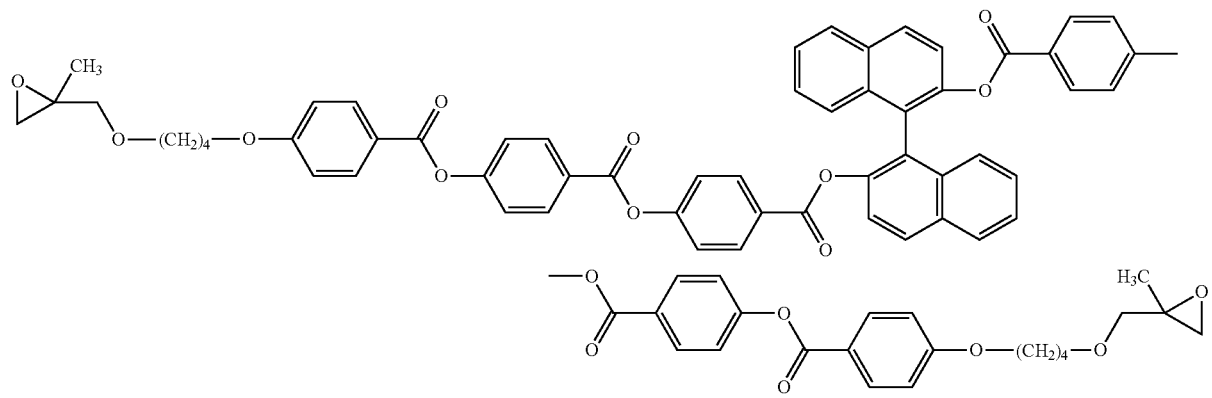
(2-1-1)
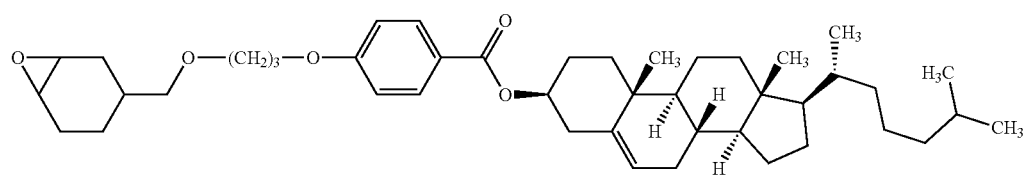

-continued
(2-1-2)
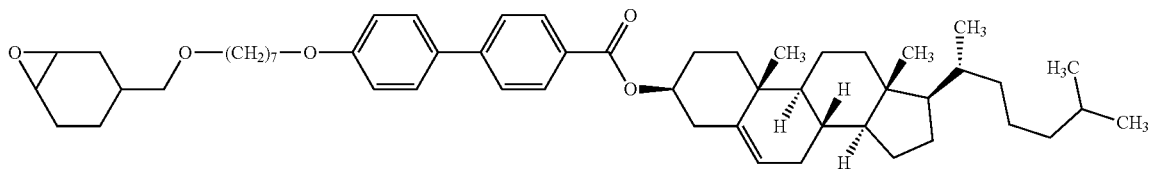
(2-1-3)
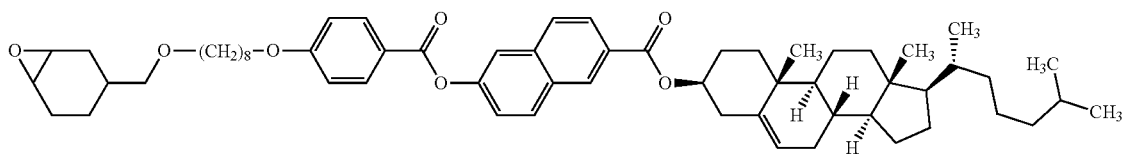
(2-1-4)
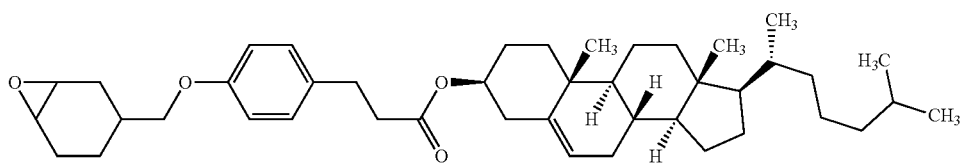
(2-1-5)
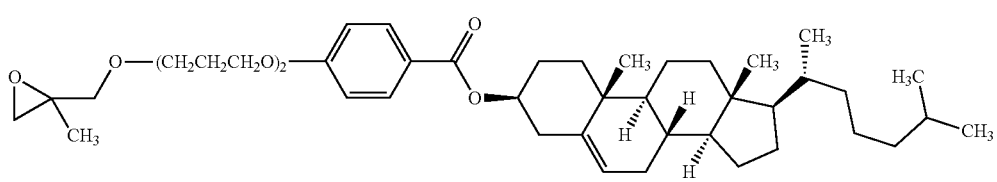
(2-1-6)
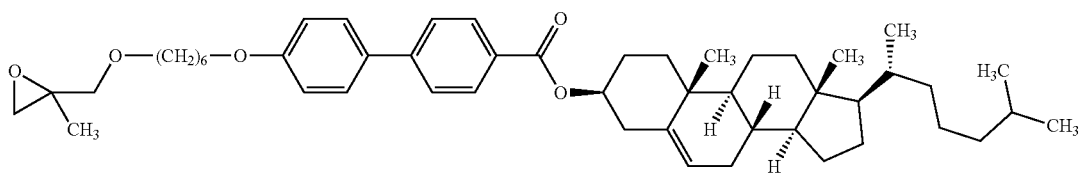
(2-1-7)
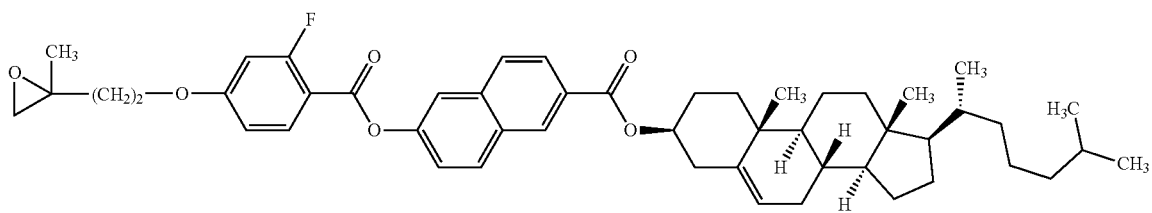
(2-1-8)
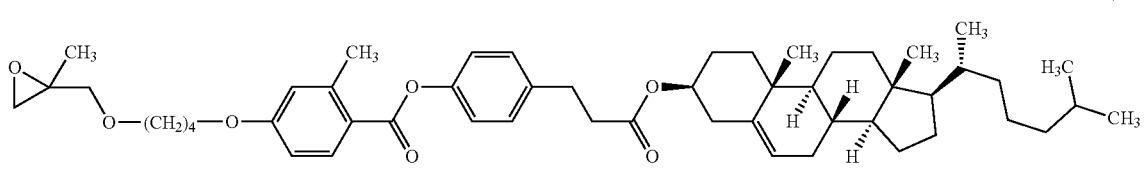
(2-2-1)
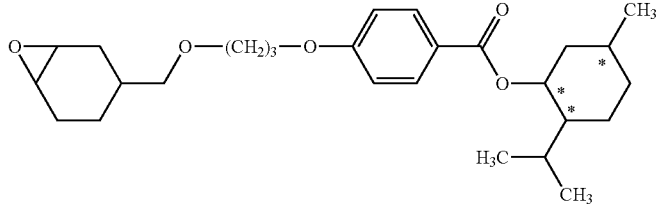

-continued
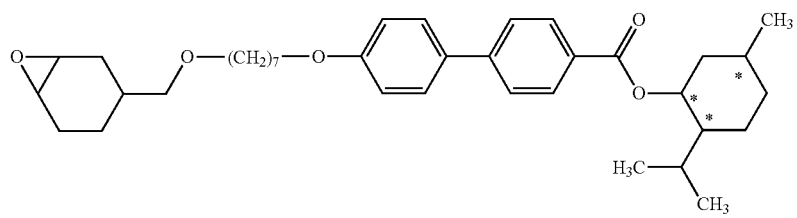
(2-2-2)
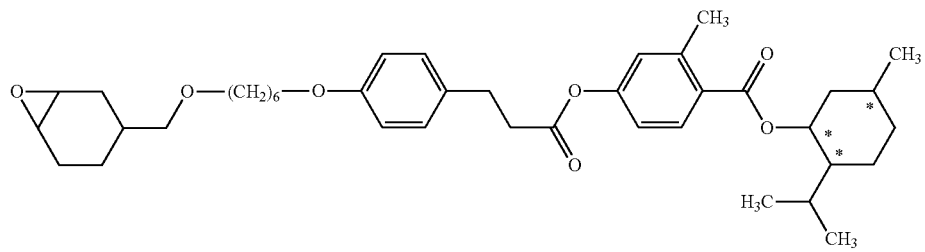
(2-2-3)
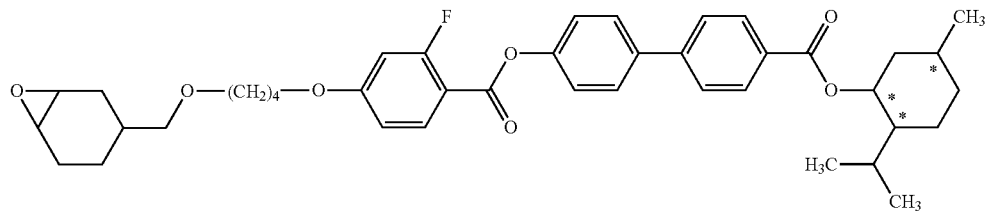
(2-2-4)
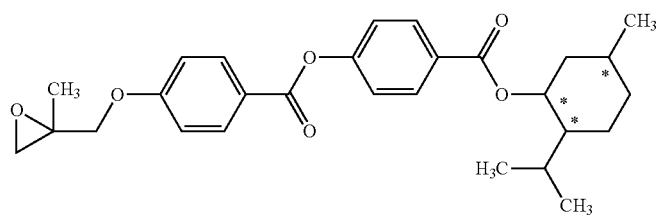
(2-2-5)
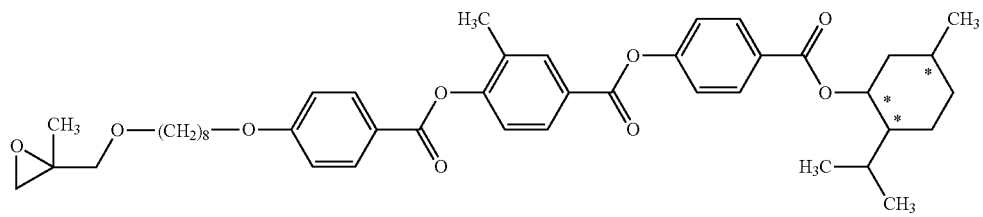
(2-2-6)
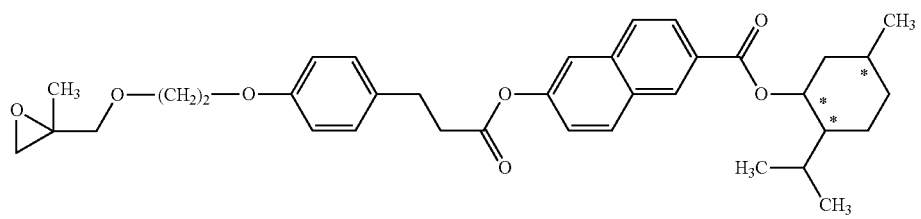
(2-2-7)
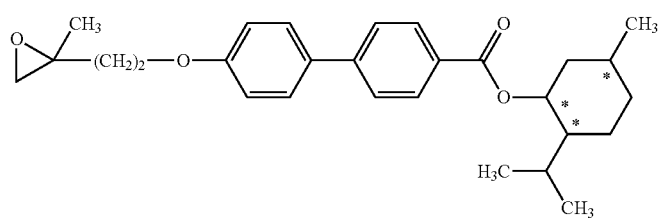
(2-2-8)

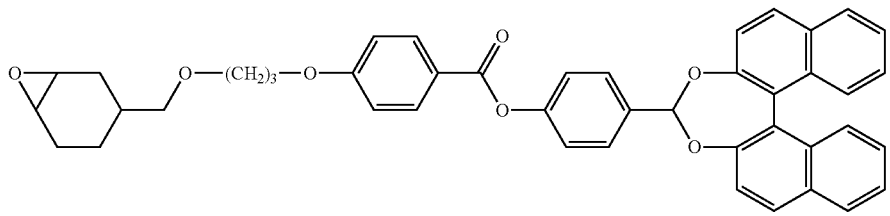

(2-3-1)

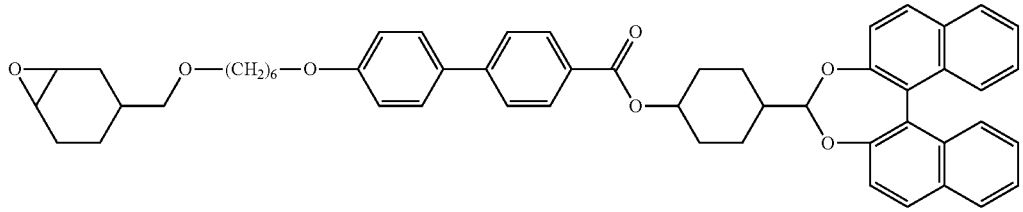

(2-3-2)

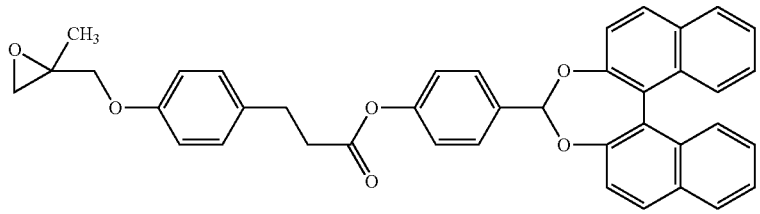

(2-3-3)

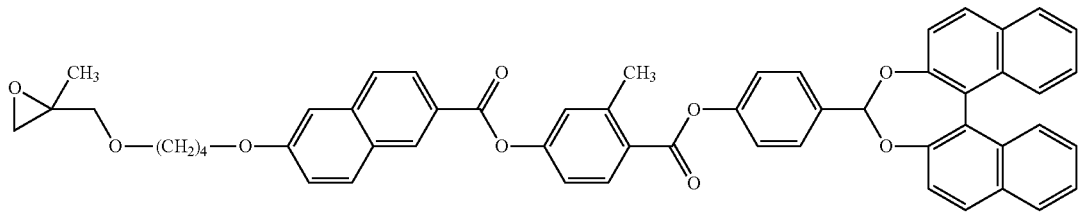

(2-3-4)

Polymerizable Liquid Crystal Composition

Next, the polymerizable liquid crystal composition of the invention will be explained. The polymerizable liquid crystal composition of the invention includes at least one compound selected from the group of the compounds (1) and (2) described above and at least one polymerizable liquid crystal compound. In the polymerizable liquid crystal composition of the invention, one of the compounds may be used or a combination of a plurality of the compounds may be used as a compound selected from the group of the compounds (1) and (2). Similarly, the polymerizable liquid crystal compound may be used one of the compounds or a combination of a plurality of the compounds may be used.

It is desirable that the polymerizable liquid crystal composition of the invention including at least one compound selected from the group of the compounds (1) and (2) described above and at least one compound selected from the group of the polymerizable liquid crystal compound represented by formula (M1) and formula (M2). In the polymerizable liquid crystal composition of the invention, one compound may be used or a combination of a plurality of the compounds may be used as a compound selected from the group of the compounds (1) and (2). Similarly, one compound may be used or a combination of a plurality of the compounds may be used as a polymerizable liquid crystal compound selected from the group of the compounds (M1) and (M2).

The Compounds (M1) and (M2)

In formulas (M1) and (M2) described above, the ring $A^2$ is independently 1,4-cyclohexylene, 1,4-phenylene, naphthalene-2,6-diyl, fluorene-2,7-diyl or 1,3-dioxane-2,5-diyl. In the 1,4-phenylene and fluorene-2,7-diyl, arbitrary hydrogen may be replaced by fluorine, chlorine, cyano, methyl, ethyl, methoxy, hydroxy, formyl, acetoxy, acetyl, trifluoroacetyl, difluoromethyl or trifluoromethyl. Among these, 1,4-cyclohexylene or 1,4-phenylene is desirable and in the 1,4-phenylene, arbitrary one or two hydrogens may be replaced by fluorine, methyl or trifluoromethyl.

In formulas (M1) and (M2) described above, the bonding group $Z^2$ is independently a single bond, —O—, —COO—, —OCO—, —CH=CH—COO—, —OCO—CH=CH—, —OCO—(CH$_2$)$_2$—, —(CH$_2$)$_2$—COO—, —C≡C—COO—, —OCO—C≡C—, —CH$_2$O—, —OCH$_2$—, —CF$_2$O—, —OCF$_2$—, —CONH—, —NHCO—, —(CH$_2$)$_4$—, —(CH$_2$)$_2$—, —(CF$_2$)$_2$—, —CH=CH—, —CF=CF— or —C≡C—. Among these, a single bond, —O—, —COO— or —OCO— is desirable.

In formulas (M1) and (M2) described above, n is independently an integer from 1 to 5, preferably an integer from 1 to 3, and more preferably 1 or 2. Each of a plurality of $Z^2$ may be different groups or at least two of a plurality of $Z^2$ may be the same group, when n is 2 or more. At this time, each of a plurality of the ring $A^2$ may also be different rings or at least two of a plurality of the ring $A^2$ may be the same ring.

In formulas (M1) and (M2) described above, $Q^2$ is independently alkylene having 1 to 20 carbons, and in the alkylene, arbitrary hydrogen may be replaced by fluorine and arbitrary —CH$_2$— may be replaced by —O—, —COO—, —OCO—, —CH=CH— or —C≡C—. A desirable example of the alkylene is alkylene having 1 to 14 carbons, and in the alkylene, arbitrary hydrogen may be replaced by fluorine and arbitrary —CH$_2$— may be replaced by —O—, —COO— or —OCO—.

In formulas (M1) and (M2) described above, P$^3$ and P$^4$ are each independently is a polymerizable group represented by any one of formulas (4-1) to (4-5) described above. It is desirable that P$^3$ and P$^4$ are the same polymerizable group. In formulas (4-1) to (4-5) described above, R$^a$ is independently hydrogen, halogen or alkyl having 1 to 5 carbons, and desirable R$^a$ is hydrogen, methyl or ethyl, and more desirable R$^a$ is hydrogen.

In formulas (M1) and (M2) described above, R is fluorine, cyano, trifluoromethyl, trifluoromethoxy, alkyl having 1 to 20 carbons or alkoxy having 1 to 20 carbons.

The compound (M1) has the ability to exhibit a wide range of a liquid crystal phase and two polymerizable groups in the structure. A polymer formed by polymerization of the polymerizable liquid crystal composition including the compound can form a three-dimensional network structure, and thus has a high mechanical strength. The compound (M2) is mono-functional and thus a substituent such as a polar group can be introduced to the opposite side of the polymerizable group in the major axis direction of the molecules. The adjustment of orientation in the liquid-crystal state can be accomplished in the polymerizable liquid crystal composition including the compound. The polymerizable liquid crystal composition having a high optical anisotropy (Δn) is formed when the ring A$^2$ is 1,4-phenylene in any of the compounds (M1) and (M2). The polymerizable liquid crystal composition having a higher optical anisotropy is formed when the ring A$^2$ is naphthalene-2,6-diyl or fluorene-2,7-diyl. The polymerizable liquid crystal composition having a low optical anisotropy is formed when the ring A$^2$ is 1,4-cyclohexylene.

It is desirable that the polymerizable liquid crystal composition of the invention includes at least one compound selected from compounds represented by formula (M1) and formula (M2) described above, wherein the ring A$^2$ is independently 1,4-cyclohexylene or 1,4-phenylene, and in the 1,4-phenylene, arbitrary one or two hydrogens may be replaced by fluorine, methyl or trifluoromethyl; Z$^2$ is independently a single bond, —O—, —COO— or —OCO—; n is independently an integer from 1 to 3; Q$^2$ is independently alkylene having 1 to 14 carbons, and in the alkylene, arbitrary hydrogen may be replaced by fluorine and arbitrary —CH$_2$— may be replaced by —O—, —COO— or —OCO—; and R$^a$ in formulas (4-1) to (4-5) is independently hydrogen, methyl or ethyl; and at least one compound selected from compounds represented by formula (1) and formula (2) described above, wherein the ring A$^1$ is independently 1,4-cyclohexylene, 1,4-phenylene or naphthalene-2,6-diyl, and in the 1,4-phenylene, arbitrary hydrogen may be replaced by fluorine, methyl, methoxy or trifluoromethyl; Z$^1$ is independently a single bond, —COO—, —OCO—, —CH=CH—COO—, —(CH$_2$)$_2$—COO—, —OCO—CH=CH—, —OCO—(CH$_2$)$_2$—, —(CH$_2$)$_2$— or —C≡C—; m is independently an integer from 1 to 3; Q$^1$ is independently alkylene having 1 to 12 carbons, and in the alkylene, arbitrary —CH$_2$— may be replaced by —O—, —COO— or —OCO—; and R$^a$ in formulas (4-1) to (4-5) is independently hydrogen, methyl or ethyl.

The polymerizable liquid crystal composition has a tendency to polymerize easily in air and to be excellent in characteristics required for the composition (a wide temperature rang of a liquid crystal phase, a sufficient optical anisotropy and so forth).

Moreover, it is desirable that the polymerizable liquid crystal composition of the invention includes the compound (M1) and the compound (1) and/or the compound (2), wherein the compound (M1) is that in formula (M1) described above, the ring A$^2$ is independently 1,4-cyclohexylene or 1,4-phenylene, and the 1,4-phenylene, one or two hydrogens may be replaced by fluorine, methyl or trifluoromethyl; Z$^2$ is independently a single bond, —O—, —COO— or —OCO—; n is 1 or 2; Q$^2$ is independently alkylene having 1 to 14 carbons, and in the alkylene, arbitrary hydrogen may be replaced by fluorine and arbitrary —CH$_2$— may be replaced by —O—, —COO— or —OCO—; and P$^3$ and P$^4$ are the same polymerizable group; and the compound (1) and/or the compound (2) is that in formula (1) and formula (2) described above, the ring A$^1$ is independently 1,4-cyclohexylene or 1,4-phenylene, and in the 1,4-phenylene, arbitrary one or two hydrogens may be replaced by fluorine or methyl; Z$^1$ is independently a single bond, —COO— or —OCO—; m is independently an integer from 1 to 3; Q$^1$ is independently alkylene having 1 to 12 carbons, and in the alkylene, arbitrary —CH$_2$— may be replaced by —O—, —COO— or —OCO—; P$^1$ is independently is a polymerizable group represented by formula (4-1) or (4-2); P$^2$ is a polymerizable group represented by formula (4-1) when P$^1$ is a polymerizable group represented by formula (4-1), and P$^2$ is a polymerizable group represented by formula (4-2) when P$^1$ is a polymerizable group represented by formula (4-2); and R$^a$ in formula (4-1) or formula (4-2) is hydrogen.

The polymerizable liquid crystal composition shows a tendency especially to polymerize easily in air, to be quite excellent in characteristics required for the composition, and to increase the mechanical strength of the polymer.

Desirable examples of the compounds (M1) and (M2) include the following compounds (M1-1) to (M1-22) and the compounds (M2-1) to (M2-15).

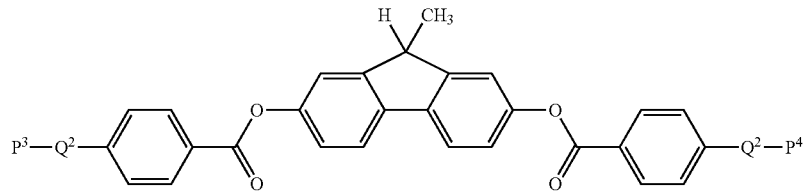

(M1-1)

-continued
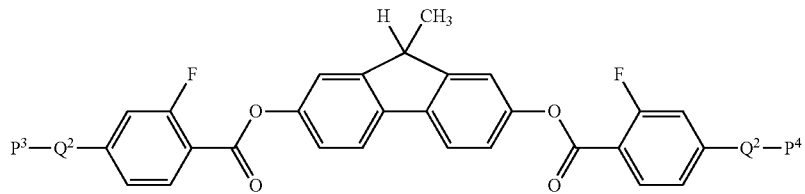
(M1-2)
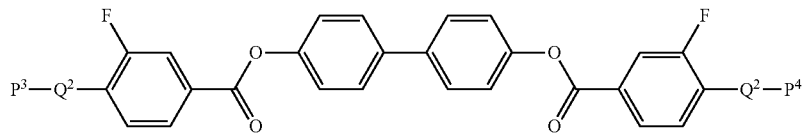
(M1-3)
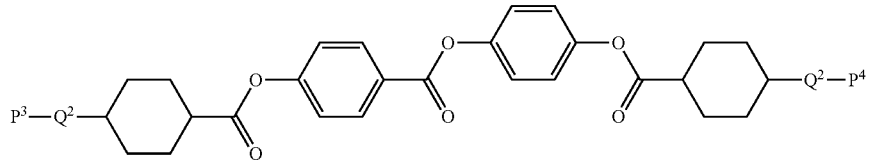
(M1-4)
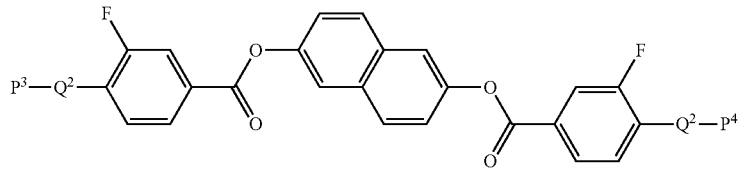
(M1-5)
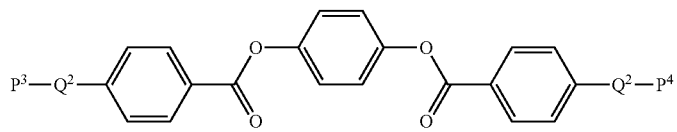
(M1-6)
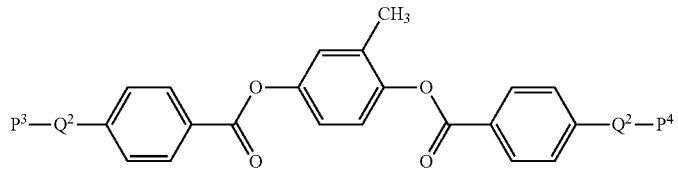
(M1-7)
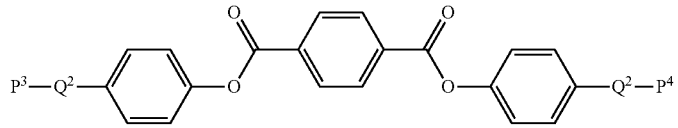
(M1-8)
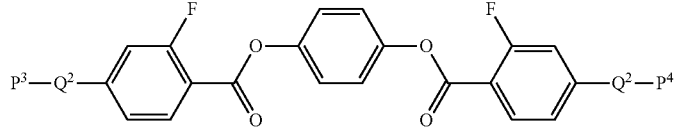
(M1-9)
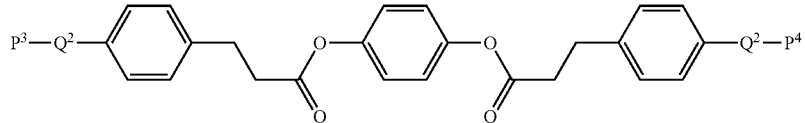
(M1-10)
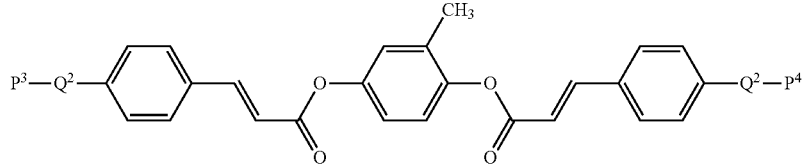
(M1-11)

-continued
(M1-12)
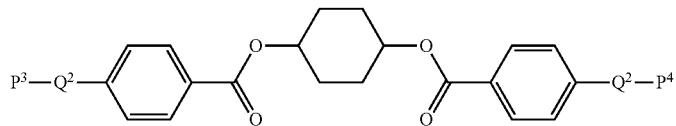
(M1-13)
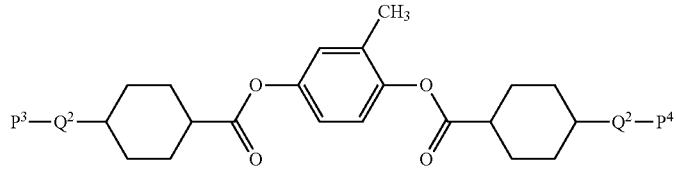
(M1-14)
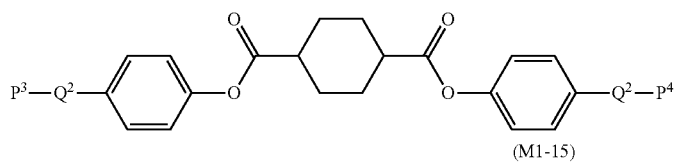
(M1-15)
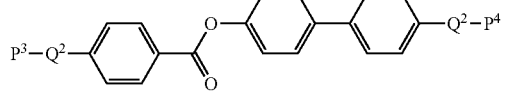
(M1-16)
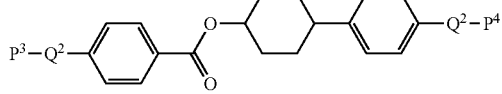
(M1-17)
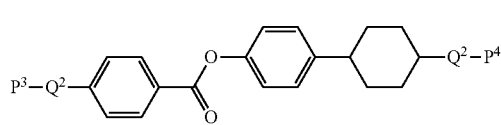
(M1-18)
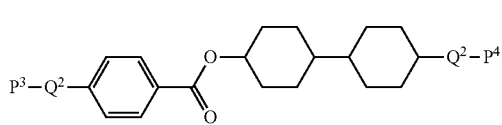
(M1-19)
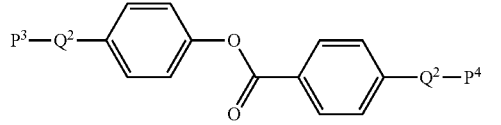
(M1-20)
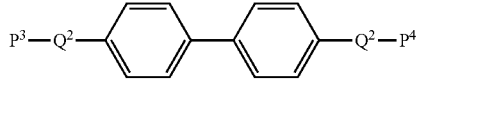
(M1-21)
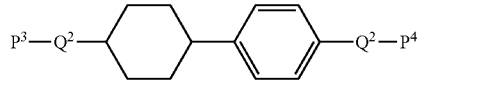
(M1-22)
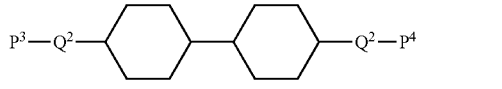
(M2-1)
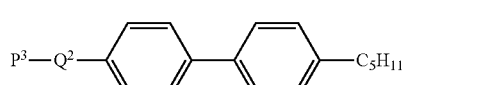
(M2-2)
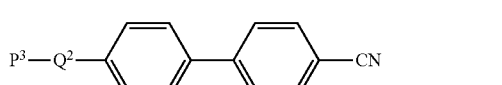
(M2-3)
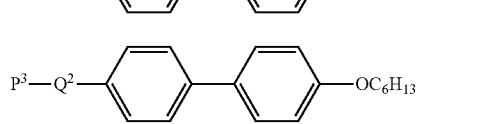
(M2-4)
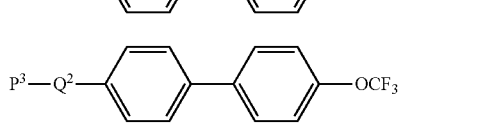
(M2-5)
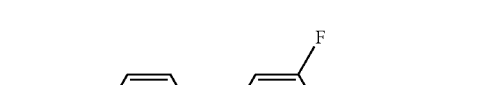
(M2-6)
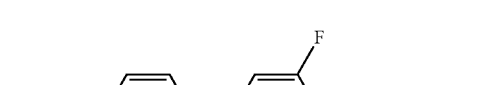
(M2-7)
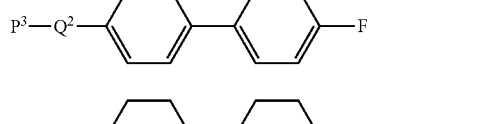
(M2-8)
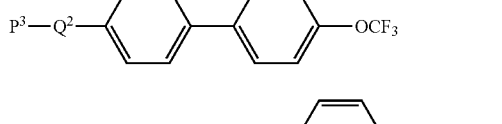
(M2-9)
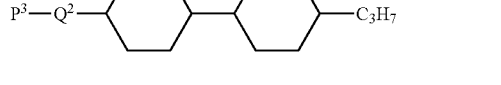
(M2-10)
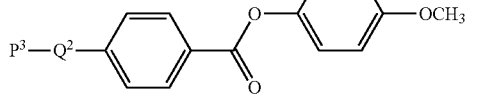
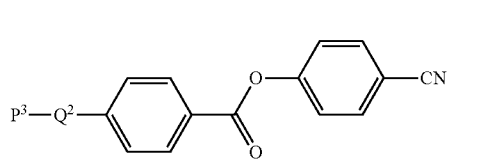

-continued

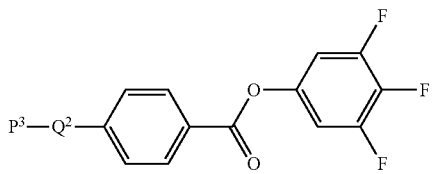
(M2-11)

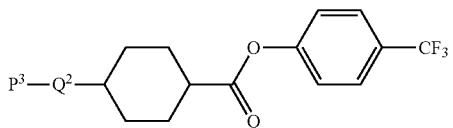
(M2-12)

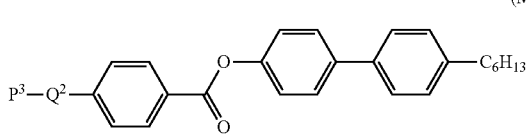
(M2-13)

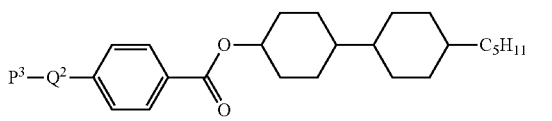
(M2-14)

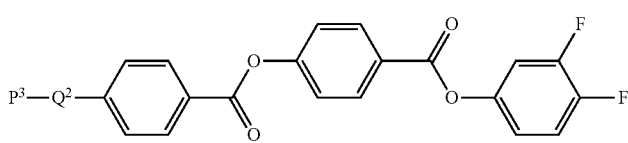
(M2-15)

In these compounds (M1-1) to (M2-15), $Q^2$, $P^3$ and $P^4$ have the same definition with $Q^2$, $P^3$ and $P^4$ in formulas (M1) and (M2) described above.

In the following explanations, the compound (M1) and the compound (M2) may be generically expressed as the compound (M). A desirable aspect of the polymerizable liquid crystal composition of the invention includes at least one compound selected from the group of optically active compounds represented by formulas (1) and (2) and at least one of the compound (M), as described previously. A desirable ratio of the compounds (1) and (2) in the polymerizable liquid crystal composition of the invention is approximately 1% to approximately 50% by weight, more preferably approximately 1% to approximately 40% by weight, and further preferably approximately 1% to approximately 30% by weight based on the polymerizable liquid crystal composition (100% by weight).

A desirable ratio of the compound (M) in the polymerizable liquid crystal composition of the invention is approximately 10% to approximately 99% by weight, and more preferably approximately 30% to approximately 99% by weight based on the polymerizable liquid crystal composition (100% by weight).

Another Component

The polymerizable liquid crystal composition of the invention may include another component other than the compound (1), the compound (2) and the compound (M) described above in an amount that the effect of the invention is not spoiled.

Another component described above includes an optically active compound other than the compounds (1) and (2), a liquid crystal compound other than the compounds (M1) and (M2), a non-optically active and non-liquid crystal polymerizable compound, a surfactant, a polymerization initiator, a photosensitizer, an ultraviolet light absorber, a light stabilizer, an antioxidant and a solvent.

Optically Active Compound Other than the Compounds (1) and (2)

The polymerizable liquid crystal composition described above may include an optically active compound other than the compounds (1) and (2) (hereinafter referred to also as "another optically active compound"). Another optically active compound is not especially limited if a helical structure can be induced and the compound is able to mix suitably with a component other than another optically active compound in the polymerizable liquid crystal composition. Another optically active compound may be a polymerizable optically active compound or a non-polymerizable optically active compound. One of another optically active compound or a mixture of two or more of another optically active compound may be used.

In another optically active compound, a polymerizable optically active compound is desirable in consideration of the thermal resistance and the resistance to solvents of the polymer formed by polymerization of the polymerizable liquid crystal composition. Frameworks that cause optical activity include alkylene or alkenylene having one or a plurality of asymmetric carbons, or the following structures.

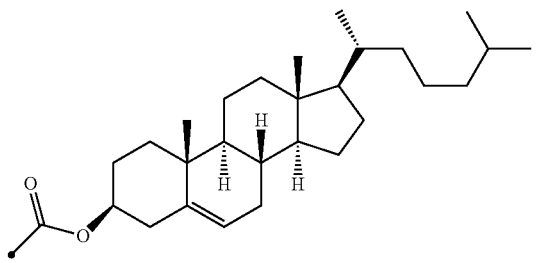

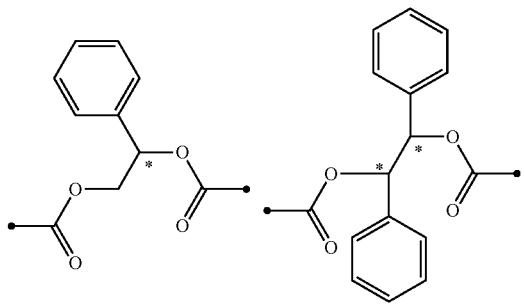

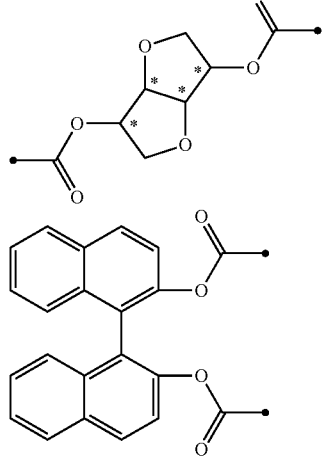

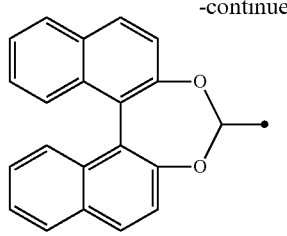

Among the optically active compound described above, a compound having a large helical twisting power (HTP) is suitable for decreasing the helical pitch of the polymerizable liquid crystal composition. Representative examples of the compound having a large helical twisting power are disclosed in GB 2,298,202 A (1996) and DE 10,221,751 A (2002).

Desirable examples of another optically active compound include the following compounds, and are not limited to these.

(6-1)

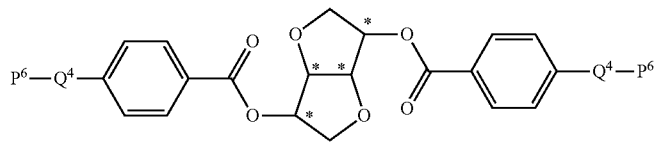

(6-2)

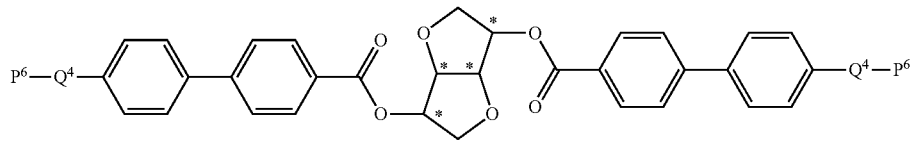

(6-3)

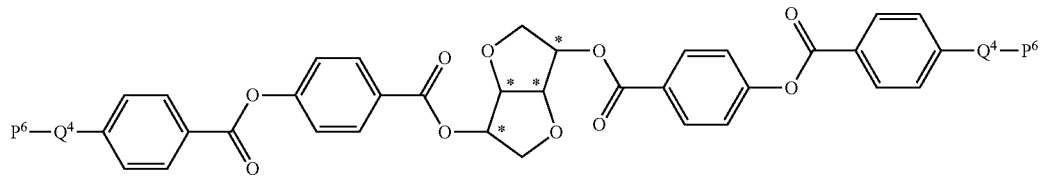

(6-4)

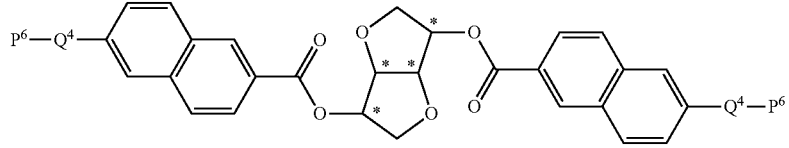

(6-5)

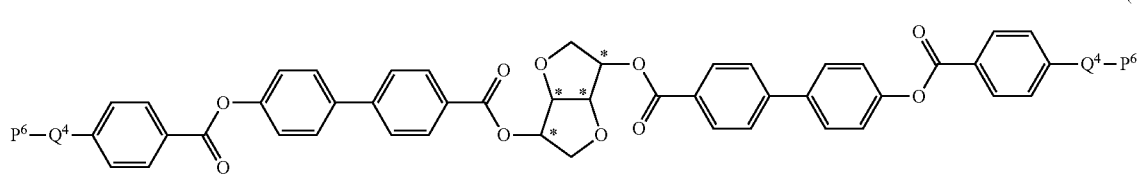

(6-6)

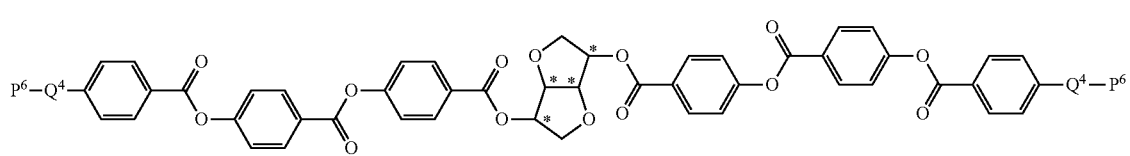

-continued
(6-7)
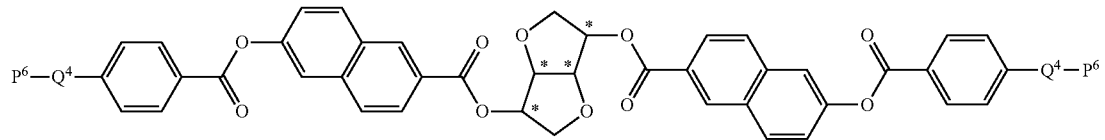
(6-8)
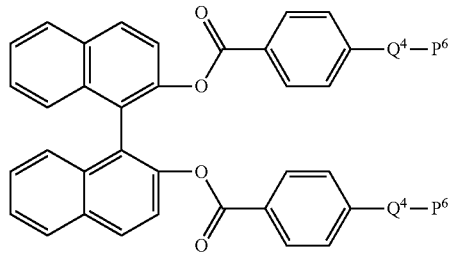
(6-9)
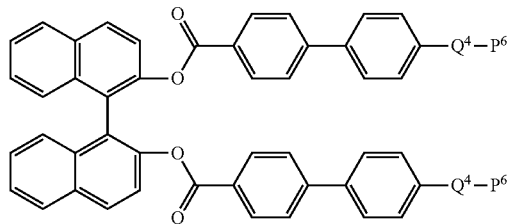
(6-10)
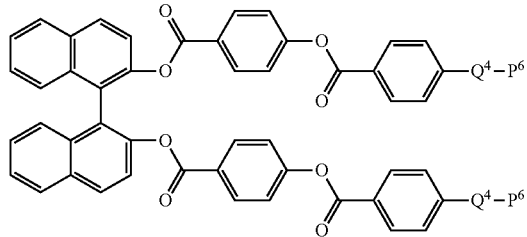
(6-11)
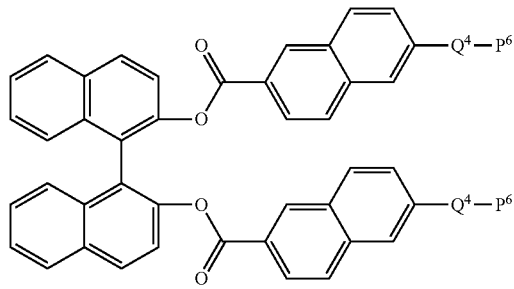
(6-12)
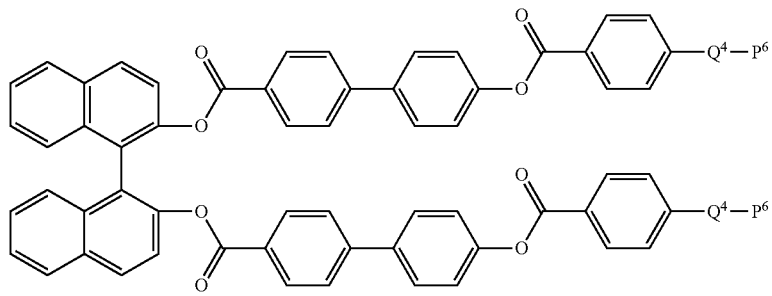

(6-13)

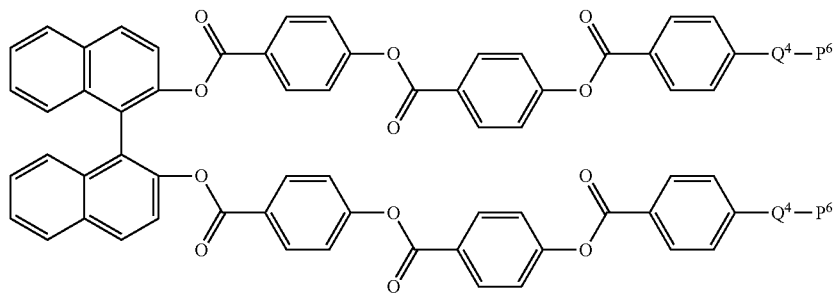

(6-14)

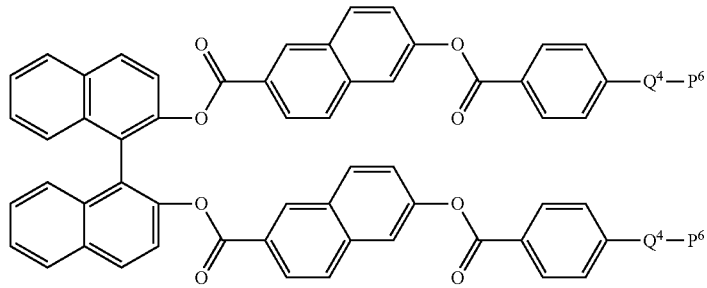

In these compounds (6-1) to (6-14), $Q^4$ is independently alkylene having 1 to 20 carbons or a single bond, and in the alkylene, arbitrary hydrogen may be replaced by fluorine and arbitrary —$CH_2$— may be replaced by —O—, —COO—, —OCO—, —CH=CH— or —C≡C—; and $P^6$ is independently a group represented by any one of the following formulas (4-3) to (4-5).

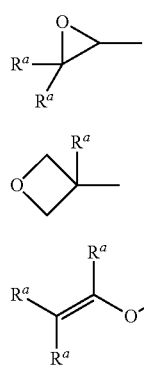

(4-3)

(4-4)

(4-5)

In formulas (4-3) to (4-5), $R^a$ is independently hydrogen, fluorine, methyl or ethyl.

A desirable amount of another optically active compound in the polymerizable liquid crystal composition of the invention is less than approximately 35% by weight, more preferably less than approximately 10% by weight based on the total amount (100% by weight) of the compound (1), the compound (2) and the compound (M).

Liquid Crystal Compound Other than the Compounds (M1) and (M2)

The polymerizable liquid crystal composition of the invention may include a liquid crystal compound other than the compounds (M1) and (M2) (hereinafter referred to as "another liquid crystal compound"). One of another liquid crystal compound may be used, and a mixture of two or more of another liquid crystal compound may be used. Another liquid crystal compound may be a polymerizable liquid crystal compound or a non-polymerizable liquid crystal compound.

Conventionally known liquid crystal compounds can be used as the polymerizable liquid crystal compound. The non-polymerizable liquid crystal compound includes, for example, compounds described LiqCryst (LCI Publisher GmbH, Hamburg, Germany) that is a database of liquid crystal compounds.

A desirable amount of another liquid crystal compound in the polymerizable liquid crystal composition of the invention is approximately 1% to approximately 50% by weight, and more preferably approximately 1% to approximately 30% by weight based on the total amount (100% by weight) of the compound (1), the compound (2) and the compound (M).

Non-Optically Active and Non-Liquid Crystalline Polymerizable Compound

A non-optically active and non-liquid crystalline polymerizable compound (hereinafter referred to also as "another polymerizable compound") can be added to the polymerizable liquid crystal composition of the invention for the purpose of adjusting the formability, the mechanical strength and so forth of the polymer. One of another polymerizable compound or a mixture of two or more of another polymerizable compound may be used. Desirable examples of the non-liquid crystalline polymerizable compound are (meth)acrylate compounds, vinyl compounds, stylene compounds, vinyl ether compounds, allyl ether compounds, epoxy compounds and oxetane compounds.

Another polymerizable compound includes specifically methyl (meth)acrylate, ethyl (meth)acrylate, butyl (meth)acrylate, 2-ethylhexyl (meth)acrylate, phenyl (meth)acrylate, vinyl chloride, vinyl fluoride, vinyl acetate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, N-vinylacetoamide, vinyl p-t-butylbenzoate, vinyl N,N-dimethylaminobenzoate, vinyl benzoate, stylene, o-, m- or p-chloromethylstylene, α-methylstylene, tetrafluoroethylene and hexafluoropropene.

Another polymerizable compound further includes ethyl vinyl ether, hydroxybutyl monovinyl ether, t-amyl vinyl ether and cyclohexanedimethanol methyl vinyl ether. Another polymerizable compound further includes 3-ethyl-3-hydroxymethyloxetane, 3-methyl-3-hydroxymethyloxetane, di(3-ethyl-oxetan-3-ylmethyl) and 3-ethyl-3-(2-ethylhexyloxymethyl)oxetane, these of which are able to adjust the viscosity and/or decrease the shrinkage caused by curing in the polymerizable liquid crystal composition.

A polyfunctional acrylate can be added to the polymerizable liquid crystal composition in order to increase the formability of a polymer formed from the polymerizable liquid crystal composition. Desirable examples of the polyfunctional acrylate are 1,4-butanedioldiacrylate, 1,6-hexanedioldiacrylate, 1,9-nonanedioldiacrylate, neopentyl glycol diacrylate, triethylene glycol diacrylate, dipropylene glycol diacrylate, tripropylene glycol diacrylate, tetraethylene glycol diacrylate, trimethylolpropane triacrylate, ethylene oxide modified-trimethylol triacrylate, pentaerythritol triacrylate, tris(acryloxyethyl)phosphate, ethylene oxide modified-bisphenol A diacrylate, bisphenol A glycidyl diacrylate and polyethylene glycol diacrylate. A commercial product of bisphenol A glycidyl diacrylate includes Viscoat 700 available from Osaka Organic Chemical Industry Ltd.

A compound having a polyfunctional cationically polymerizable group can be added to the polymerizable liquid crystal composition in order to increase the formability of the polymer formed from the composition. Desirable examples include the following compounds represented by formulas (5-1) to (5-11). These compounds may be used in order to adjust the viscosity of the liquid crystal composition, to adjust the orientation and/or to increase the hardness of the polymer formed from the composition, for instance.

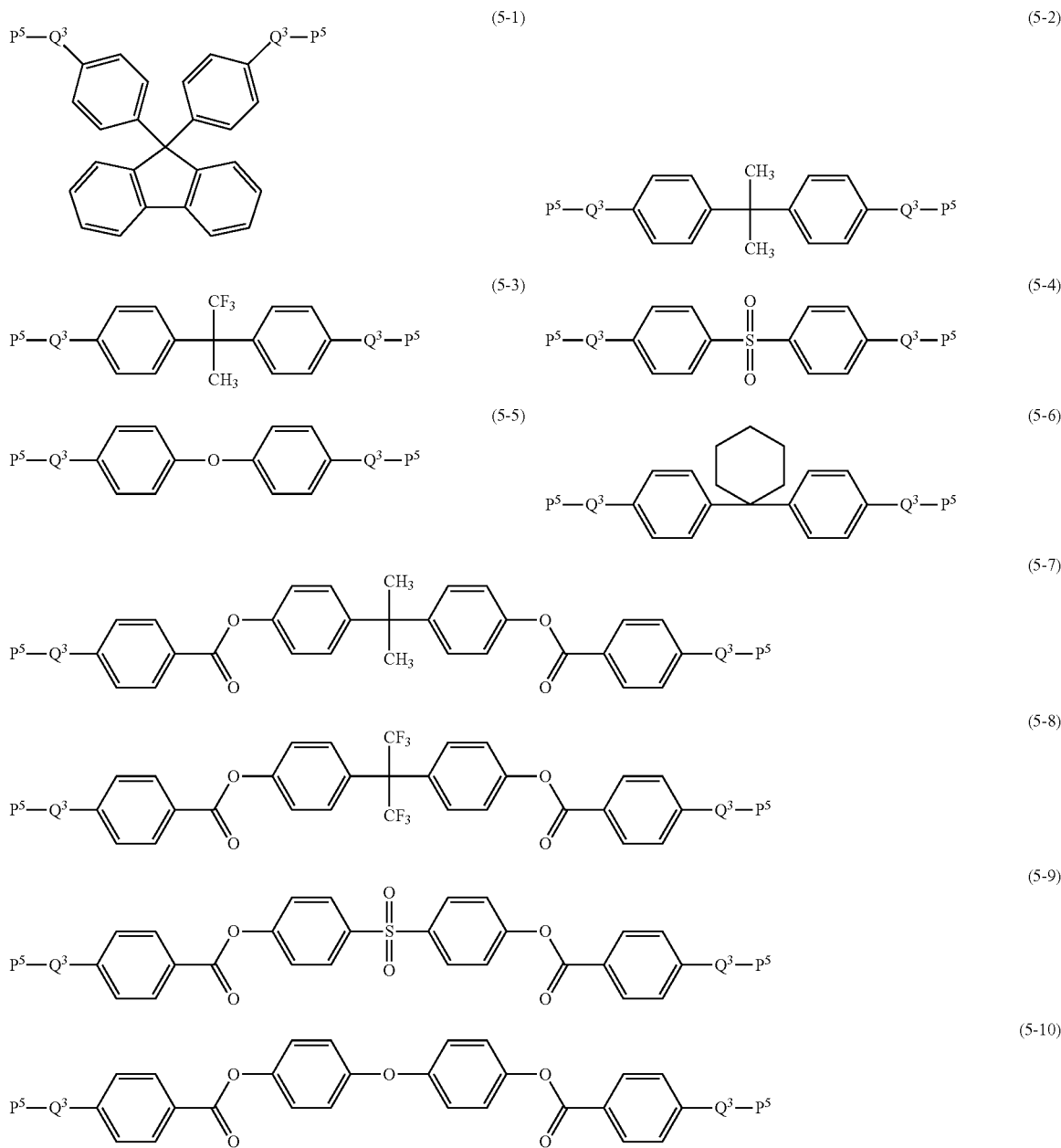

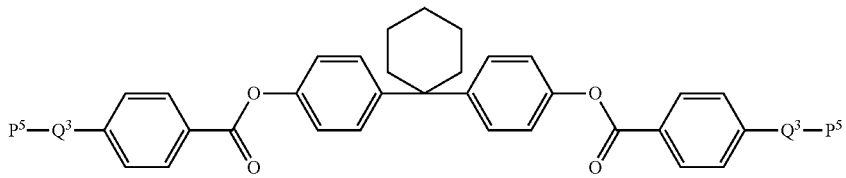

(5-11)

In these compounds, $Q^3$ is independently alkylene having 2 to 20 carbons, and in the alkylene, arbitrary hydrogen may be replaced by fluorine or chlorine and arbitrary —$CH_2$— may be replaced by —O—, —COO—, —OCO—, —CH=CH— or —C≡C—; and $P^5$ is independently a group represented by any one of the following formulas (4-3) to (4-5).

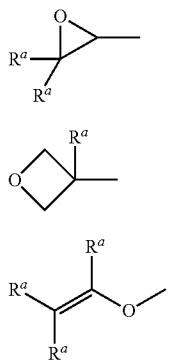

(4-3)

(4-4)

(4-5)

In formulas (4-3) to (4-5), $R^a$ is independently hydrogen, fluorine, methyl or ethyl.

Examples of the epoxy compounds described above include epoxy resins, epoxy compounds having one polymerizable group and epoxy compounds having two or more polymerizable groups.

The epoxy resins described above include, but are not limited to, epoxy resins derived from divalent phenols, such as bisphenol A-type epoxy resins, bisphenol F-type epoxy resins, bisphenol S-type epoxy resins, bisphenol AD-type epoxy resins, resorcinol-type epoxy resins, hydroquinone-type epoxy resins, catechol-type epoxy resins, dihydroxynaphthalene-type epoxy resins, biphenyl-type epoxy resins and tetramethylbiphenyl-type epoxy resins; and epoxy resins derived from trivalent or polyvalent phenols, such as phenol novolac-type epoxy resins, cresol novolac-type epoxy resins, triphenylmethane-type epoxy resins, tetraphenylethane-type epoxy resins, dicyclopentadiene-phenol-modified type epoxy resins, phenolaralkyl-type epoxy resins, biphenylaralkyl-type epoxy resins, naphthol novolac-type epoxy resins, naphthol aralkyl-type epoxy resins, naphthol-phenol cocondensated novolac-type epoxy resins, naphthol-cresol cocondensated novolac-type epoxy resins, aromatic hydrocarbon formaldehyde resin-modified phenol resin-type epoxy resins and biphenyl-modified novolac-type epoxy resins; and tetrabromobisphenol A-type epoxy resins, brominated phenol novolac-type epoxy resins, polycarboxylic acid polyglycidyl ester, polyol polyglycidyl ether, fatty acid-type epoxy resins, alicyclic-type epoxy resins, glycidyl amine-type epoxy resins, triphenolmethane-type epoxy resins and dihydroxybenzene-type epoxy resins. One of the epoxy resins or a mixture of two or more of epoxy resins may be used.

Specific examples of the epoxy compound having at least one polymerizable group include alkyl monoglycidyl ether having 2 to 25 carbons (for example, butyl glycidyl ether, 2-ethylhexyl glycidyl ether, decylglycidyl ether, stearyl glycidyl ether), butanediol diglycidyl ether, 1,6-hexanediol diglycidyl ether, neopentyl glycol diglycidyl ether, dodecanediol diglycidyl ether, pentaethyltriol polyglycidyl ether, trimethylolpropane polyglycidyl ether, glycerol polyglycidyl ether, phenylglycidyl ether, p-sec-butylphenyl glycidyl ether, p-tert-butylphenyl glycidyl ether, resorcinol glycidyl ether, allyl glycidyl ether, tetrafluoropropyl glycidyl ether, octafluoropropyl glycidyl ether, dodecafluoropentyl glycidyl ether, stylene oxide, 1,7-octadienediepoxide, limonene diepoxide, limonene monooxide, α-pinene epoxide, β-pinene epoxide, cyclohexene epoxide, cyclooctene epoxide, vinylcyclohexene oxide, butoxy polyethylene glycol glycidyl ether, polyethylene glycol diglycidyl ether, 3,4-epoxycyclohexenylmethyl-3',4'-epoxycyclohexenecarboxylate, 3,4-epoxycyclohexenylethyl-3',4'-epoxycyclohexenecarboxylate, 1,2-epoxy-4-vinylcyclohexane, vinylcyclohexene dioxide, allylcyclohexene dioxide, 1-epoxyethyl-3,4-epoxycyclohexane, 3,4-epoxy-4-methylcyclohexyl-2-propylene oxide, bis(3,4-epoxycyclohexyl)ether, bis(3,4-epoxycyclohexylmethyl)adipate, phthalic acid diglycidyl ester, terephthalic acid diglycidyl ester, hexahydrophthalic acid diglycidylester, tetrahydrophthalic acid diglycidylester, tris(2,3-epoxypropyl) isocyanurate, 3-ethyl-3-(phenoxymethyl) oxetane and di(1-ethyl(3-oxetanyl))methyl ether.

A desirable amount of another polymerizable compound in the polymerizable liquid crystal composition of the invention is less than approximately 50% by weight, and more preferably less than approximately 30% by weight based on the total amount (100% by weight) of the compound (1), the compound (2) and the compound (M).

Surfactant

A non-ionic surfactant is desirable as the surfactant described above. One of the surfactants or a mixture of two or more of surfactants may be used. Desirable examples of the non-ionic surfactant are a fluorine-based nonionic surfactant, a silicone-based nonionic surfactant and a hydrocarbon-based nonionic surfactant.

Examples of commercial products of the fluorine-based nonionic surfactant include BYK-340 available from BYK Japan K.K.; and Futergent 251, Futergent 221 MH, Futergent 250, FTX-215M, FTX-218M, FTX-233M, FTX-245M, FTX-290M, FTX-209F, FTX-213F, Futergent 222F, FTX-233F, FTX-245F, FTX-208G, FTX-218G, FTX-240G, FTX-206D, Futergent 212D, FTX-218, FTX-220D, FTX-230D, FTX-240D, FTX-720C, FTX-740C, FTX-207S, FTX-211S, FTX-220S, FTX-230S, KB-L82, KB-L85, KB-L97, KB-L109, KB-L110, KB-F2L, KB-F2M, KB-F2S, KB-F3M and KB-FaM, all of which are available from Neos Co., Ltd.

Examples of commercial products of the silicone-based nonionic surfactant include Polyflow ATF-2, Glanol 100, Glanol 115, Glanol 400, Glanol 410, Glanol 435, Glanol 440, Glanol 450, Glanol B-1484, Polyflow KL-250, Polyflow KL-260, Polyflow KL-270 and Polyflow KL-280, all of which are available from Kyoeisha Chemical Co., Ltd.; and BYK-300, BYK-302, BYK-306, BYK-307, BYK-310, BYK-315, BYK-320, BYK-322, BYK-323, BYK-325, BYK-330, BYK-331, BYK-333, BYK-337, BYK-341, BYK-344, BYK-345, BYK-346, BYK-347, BYK-348, BYK-370, BYK-375, BYK-377, BYK-378, BYK-3500, BYK-3510 and BYK-3570, all of which are available from BYK Japan K.K.

Examples of commercial products of the hydrocarbon-based nonionic surfactant include Polyflow No. 3, Polyflow No. 50EHF, Polyflow No. 54N, Polyflow No. 75, Polyflow No. 77, Polyflow No. 85HF, Polyflow No. 90 and Polyflow No. 95, all of which include acryl-type polymer as a main component, and are available from Kyoeisha Chemical Co., Ltd.; and BYK-350, BYK-352, BYK-354, BYK-355, BYK-358N, BYK-361N, BYK-380N, BYK-381, BYK-392 and BYK-Silclean 3700, all of which are available from BYK Japan K.K.

In addition to the non-ionic surfactant, further examples of the surfactant described above include such as polyether-type compounds, acrylic acid copolymer-type compounds, titanate-type compounds, imidazoline, tertiary ammonium salts, alkylamine oxides, polyamine derivatives, polyoxyethylene-polyoxypropylene condensates, polyethylene glycol and its esters, sodium lauryl sulfate, ammonium lauryl sulfate, amine lauryl sulfates, alkyl-substituted aromatic sulfonates, alkyl phosphates, aliphatic or aromatic sulfonate formaldehyde condensates, lauryl amidopropyl betaine, lauryl aminoacetic acid betaine, polyethylene glycol aliphatic acid esters, polyoxyethylene alkylamines, perfluoroalkylsulfonic acid salts and perfluoroalkylcarboxylic acid salts. These surfactants are effective in facilitating the application of the polymerizable liquid crystal composition to the supporting substrate, for instance.

Polymerization Initiators

It is desirable that the polymerizable liquid crystal composition of the invention include a polymerization initiator. One polymerization initiator or a mixture of two or more of polymerization initiators may be used. A cationic photopolymerization initiator is desirable as a polymerization initiator. The cationic photopolymerization initiator includes diaryliodonium salts (hereinafter abbreviated as DAS) and triarylsulfonium salts (hereinafter abbreviated as TAS).

The DAS described above includes diphenyliodonium tetrafluoroborate, diphenyliodonium hexafluorophosphonate, diphenyliodonium hexafluoroarsenate, diphenyliodonium trifluoromethanesulfonate, diphenyliodonium trifluoro acetate, diphenyliodonium p-toluenesulfonate, diphenyliodonium tetra(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, 4-methoxyphenylphenyliodonium trifluoromethanesulfonate, 4-methoxyphenylphenyliodonium trifluoro acetate, 4-methoxyphenylphenyliodonium p-toluenesulfonate, 4-methoxyphenylphenyliodonium diphenyliodonium tetra(pentafluorophenyl)borate, bis(4-tert-butylphenyl)iodonium diphenyliodonium tetrafluoroborate, bis(4-tert-butylphenyl)iodonium diphenyliodonium hexafluoroarsenate, bis(4-tert-butylphenyl)iodonium diphenyliodonium trifluoromethanesulfonate, bis(4-tert-butylphenyl)iodonium trifluoro acetate, bis(4-tert-butylphenyl)iodonium p-toluenesulfonate and bis(4-tert-butylphenyl) iodonium diphenyliodonium tetra(pentafluorophenyl)borate.

The TAS described above include triphenylsulfonium tetrafluoroborate, triphenylsulfonium hexafluorophosphonate, triphenylsulfonium hexafluoroarsenate, triphenylsulfonium trifluoromethanesulfonate, triphenylsulfonium trifluoroacetate, triphenylsulfonium p-toluenesulfonate, triphenylsulfonium tetra(pentafluorophenyl)borate, 4-methoxyphenyldiphenylsulfonium tetrafluoroborate, 4-methoxyphenyldiphenylsulfonium hexafluorophosphonate, 4-methoxyphenyldiphenylsulfonium hexafluoroarsenate, 4-methoxyphenyldiphenylsulfonium trifluoromethanesulfonate, 4-methoxyphenyldiphenylsulfonium trifluoro acetate, 4-methoxyphenyldiphenylsulfonium p-toluenesulfonate, 4-methoxyphenyldiphenylsulfonium triphenylsulfonium tetra(pentafluorophenyl)borate, 4-phenylthiophenyldiphenylsulfonium tetrafluoroborate, 4-phenylthiophenyldiphenylsulfonium hexafluorophosphonate, 4-phenylthiophenyldiphenylsulfonium hexafluoroarsenate, 4-phenylthiophenyldiphenylsulfonium trifluoromethanesulfonate, 4-phenylthiophenyldiphenylsulfonium p-toluenesulfonate and 4-phenylthiophenyldiphenylsulfonium tetra(pentafluorophenyl)borate.

Commercial products of such a cationic photopolymerization initiator includes Cyracure UVI-6990, Cyracure UVI-6974 and Cyracure UVI-6992 available from UCC; Adeka Optomer SP-150, SP-152, SP-170 and SP-172 available fromAdeka Co., Ltd.; Photoinitiator 2074 available from Rhodia Japan Ltd.; Irgacure 250 available from Ciba Japan K. K.; UV-9380C available from GE silicones Inc.; and CPI series available from San-Apro Ltd, and also includes TPS-series, TAZ-series, DPI-series, BPI-series, MDS-series, DTS-series, SI-series, PI-series, NDI-series, PAI-series, NAI-series, NI-series, DAM-series, MBZ-series, PYR-series, DNB-series and NB-series available from Midori Kagaku Co., Ltd.

A photo-radical polymerization initiator can be added together with the cationic photopolymerization initiator described above to the polymerizable liquid crystal composition of the invention. Examples of commercial products of the photo-radical polymerization initiator include Darocure 1173 (2-hydroxy-2-methyl-1-phenylpropan-1-one), Irgacure 184 (1-hydroxycyclohexylphenylketone), Irgacure 651 (2,2-dimethoxy-1,2-diphenylethan-1-one), Irgacure 500, Irgacure 2959, Irgacure 907, Irgacure 369, Irgacure 1300, Irgacure 819, Irgacure 1700, Irgacure 1800, Irgacure 1850, Darocure 4265 and Irgacure 784, all of which are available from Ciba Japan K. K.

A photo-radical polymerization initiator which are not described above includes p-methoxyphenyl-2,4-bis(trichloromethyl)triazine, 2-(p-butoxystyryl)-5-trichloromethyl-1,3,4-oxadiazole, 9-phenylacridine, 9,10-benzphenazine, a mixture of benzophenone and Michler's ketone, a mixture of hexaarylbiimidazole and mercaptobenzimidazole, 1-(4-isopropylphenyl)-2-hydroxy-2-methylpropan-1-one, benzyldimethylketal, 2-methyl-1-[4-(methylthio)phenyl]-2-morpholinopropan-1-one, a mixture of 2,4-diethylxanthone and methyl p-dimethylaminobenzoate and a mixture of benzophenone and methyltriethanolamine.

A thermal polymerization initiator can be used, when the polymerizable liquid crystal composition is polymerized thermally in the invention. One thermal polymerization initiator or a mixture of two or more of thermal polymerization initiators may be used. Commercial products of such a thermal polymerization initiator include San-Aid (a main agent) SI-60, SI-80, SI-100, SI-110, SI-145, SI-150, SI-160, SI-180 and San-Aid (an auxiliary agent) SI, all of which are available from Sanshin Chemical Industry Co., Ltd. These can be used together with a photo-radical polymerization initiator and/or a cationic photopolymerization initiator.

Photosensitizer

A photosensitizer may be included in the polymerizable liquid crystal composition of the invention. Examples of the photosensitizer are thioxanthone derivatives, anthraquinone derivatives and naphthoquinone derivatives. Desirable examples are the compounds (Z-1) to (Z-6) which are shown below. Especially desirable photosensitizers are the compounds (Z-1) and (Z-2). One photosensitizer or a mixture of two or more of photosensitizers may be used.

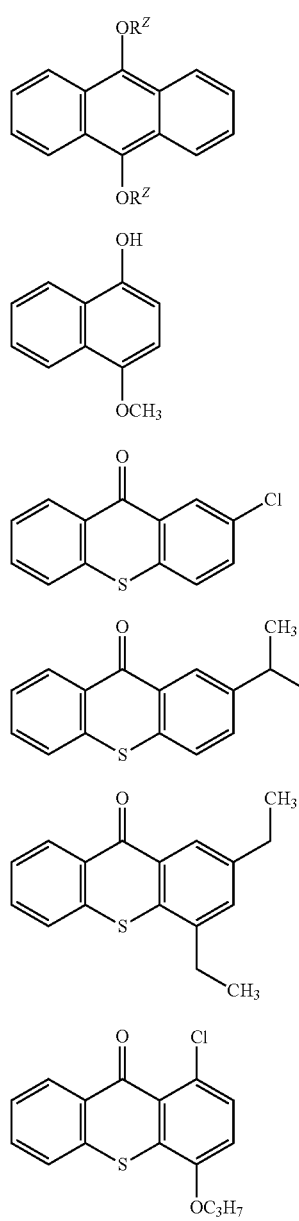

In formula (Z-1), $R^z$ is independently straight-chain alkyl having 1 to 10 carbons.

A commercial product of the compound (Z-1) where $R^z$ is n-butyl includes Anthracure UVS-1331 available from Kawasaki Kasei Chemicals Ltd. A commercial product of the compound (Z-2) includes Anthracure ET-2111 available from Kawasaki Kasei Chemicals Ltd. A commercial product of the compound (Z-3) includes Speedcure CTX available from Lambson Ltd. A commercial product of the compound (Z-4) includes Quantacure ITX available from Shell Chemical Co. A commercial product of the compound (Z-5) includes Kayacure DETX-S available from Nippon Kayaku Co., Ltd. A commercial product of the compound (Z-6) includes Speedcure CPTX available from Lambson Ltd.

The sensitivity of the polymerizable liquid crystal composition to light can be increased by the addition of a photosensitizer such as thioxanthone, phenothiazine, chlorothioxanthone, xanthone, anthracene, diphenylanthracene and rubrene, when DAS used as a cationic photopolymerization initiator. The ratio of the photosensitizer to DAS is preferably approximately 10 parts to approximately 200 parts by weight, and more preferably approximately 20 parts to approximately 100 parts by weight based on 100 parts by weight of DAS.

Ultraviolet Absorber, Light Stabilizer and Antioxidant

An ultraviolet absorber, a light stabilizer (a radical scavenger), an antioxidant and so forth may be added in order to improve the weather resistance of the polymerizable liquid crystal composition. Each one of the ultraviolet absorber, the light stabilizer and the antioxidant may be used or a mixture of two or more of them may be used.

Examples of commercial products of the ultraviolet absorber are Tinuvin PS, Tinuvin P, Tinuvin 99-2, Tinuvin 109, Tinuvin 213, Tinuvin 234, Tinuvin 326, Tinuvin 328, Tinuvin 329, Tinuvin 384-2, Tinuvin 571, Tinuvin 900, Tinuvin 928, Tinuvin 1130, Tinuvin 400, Tinuvin 405, Tinuvin 460, Tinuvin 479 and Tinuvin 5236, all of which are available from Ciba Japan K. K.; and Adeka Stab LA-32, Adeka Stab LA-34, Adeka Stab LA-36, Adeka Stab LA-31, Adeka Stab 1413 and Adeka Stab LA-51, all of which are available from Adeka Co., Ltd.

Examples of commercial products of the light stabilizer are Tinuvin 111FDL, Tinuvin 123, Tinuvin 144, Tinuvin 152, Tinuvin 292, Tinuvin 622, Tinuvin 770, Tinuvin 765, Tinuvin 780, Tinuvin 905, Tinuvin 5100, Tinuvin 5050, Tinuvin 5060, Tinuvin 5151, Chimassorb 119FL, Chimassorb 944FL and Chimassorb 944LD, all of which are available from Ciba Japan K. K.; Adeka Stab LA-52, Adeka Stab LA-57, Adeka Stab LA-62, Adeka Stab LA-67, Adeka Stab LA-63P, Adeka Stab LA-68LD, Adeka Stab LA-77, Adeka Stab LA-82 and Adeka Stab LA-87, all of which are available from Adeka Co., Ltd.; Cyasorb UV-3346 available from Cytec Industries Inc.; and Goodlight UV-3034 available from Goodrich Co., Ltd.

Examples of commercial products of the antioxidant are Adeka Stab AO-20, AO-30, AO-40, AO-50, AO-60 and AO-80 available from Adeka Co., Ltd.; and Sumilizer BHT, Sumilizer BBM-S and Sumilizer GA-80 available from Sumitomo Chemical Co., Ltd. and Irganox 1076, Irganox 1010, Irganox 3114 and Irganox 245 available from Ciba Japan K. K.

Solvent

The polymerizable liquid crystal composition of the invention may include a solvent. The polymerizable liquid crystal composition can be prepared by the dissolution of each component of the polymerizable liquid crystal composition described above in the solvent. The viscosity of the polymerizable liquid crystal composition may be adjusted by the dilution of the polymerizable liquid crystal composition with the solvent in order to facilitate the formation of the polymer. One solvent or a mixture of two or more of solvents may be used.

Examples of the solvent are ester-type solvents, amide-type solvents, alcohol-type solvents, ether-type solvents, glycol monoalkyl ether-type solvents, aromatic hydrocarbon-type solvents, halogenated aromatic hydrocarbon-type solvents, aliphatic hydrocarbon-type solvents, halogenated aliphatic hydrocarbon-type solvents, alicyclic hydrocarbon-type solvents, ketone-type solvents and acetate-type solvents.

Desirable examples of the ester-type solvents are alkyl acetates (for example, methyl acetate, ethyl acetate, propyl acetate, isopropyl acetate, butyl acetate, 3-methoxybutyl acetate, isobutyl acetate, pentyl acetate and isopentyl acetate), ethyl trifluoroacetate, alkyl propionate (for example, methyl propionate, methyl 3-methoxypropionate, ethyl propionate, propyl propionate and butyl propionate), alkyl butanoates (for example, methyl butanoate, ethyl butanoate, butyl butanoate, isobutyl butanoate and propyl butanoate), dialkylmalonates (for example, diethyl malonates), alkyl glycolates (for example, methyl glycolate and ethyl glycolate), alkyl lactates (for example, methyl lactate, ethyl lactate, isopropyl lactate, n-propyl lactate, butyl lactate and ethylhexyl lactate), monoacetin, γ-butyrolactone and γ-valerolactone.

Desirable examples of the amide-type solvents are N-methyl-2-pyroridone, N,N-dimethylacetamide, N-methylpropionamide, N,N-dimethylformamide, N,N-diethylformamide, N,N-diethylacetamide, N,N-dimethylacetamide dimethyl acetal, N-methylcaprolactam and dimethylimidazolidinone.

Desirable examples of the alcohol-type solvents are methanol, ethanol, 1-propanol, 2-propanol, 1-methoxy-2-propanol, t-butyl alcohol, sec-butyl alcohol, butanol, 2-ethylbutanol, n-hexanol, n-heptanol, n-octanol, 1-dodecanol, ethylhexanol, 3,5,5-trimethylhexanol, n-amyl alcohol, hexafluoro-2-propanol, glycerol, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxybutanol, cyclohexanol and methylcyclohexanol.

Desirable examples of the ether-type solvents are ethylene glycol dimethyl ether, diethylene glycol dimethyl ether, bis(2-propyl)ether, 1,4-dioxane and tetrahydrofuran (THF).

Desirable examples of the glycol monoalkyl ether-type solvents are ethylene glycol monoalkyl ethers (for example, ethylene glycol monomethyl ether and ethylene glycol monobutyl ether), diethylene glycol monoalkyl ethers (for example, diethylene glycol monoethyl ether), triethylene glycol monoalkyl ether, propylene glycol monoalkyl ethers (for example, propylene glycol monobutyl ether), dipropylene glycol monoalkyl ethers (for example, dipropylene glycol monomethyl ether), ethylene glycol monoalkyl ether acetates (for example, ethylene glycol monobutyl ether acetate), diethylene glycol monoalkyl ether acetates (for example, diethylene glycol monoethyl ether acetate), triethylene glycol monoalkyl ether acetate, propylene glycol monoalkyl ether acetate (for example, propylene glycol monomethyl ether acetate, propylene glycol monoethyl ether acetate and propylene glycol monobutyl ether acetate), dipropylene glycol monoalkyl ether acetates (for example, dipropylene glycol monomethyl ether acetate) and diethylene glycol methylethyl ether.

Desirable examples of the aromatic hydrocarbon-type solvents are benzene, toluene, xylene, mesitylene, ethylbenzene, diethylbenzene, i-propylbenzene, n-propylbenzene, t-butylbenzene, s-butylbenzene, n-butylbenzene and tetraline. A desirable example of the halogenated aromatic hydrocarbon-type solvents is chlorobenzene.

Desirable examples of the aliphatic hydrocarbon-type solvents are hexane and heptane. Desirable examples of the halogenated aliphatic hydrocarbon-type solvents are chloroform, dichloromethane, tetrachloromethane, dichloroethane, trichloroethylene and tetrachloroethylene.

Desirable examples of the alicyclic hydrocarbon-type solvents are cyclohexane and decaline. Desirable examples of the ketone-type solvents are acetone, methyl ethyl ketone, methyl isobutyl ketone, cyclohexanone, cyclopentanone and methyl propyl ketone.

Desirable examples of the acetate-type solvents are ethylene glycol monomethyl ether acetate, propylene glycol monomethyl ether acetate, propylene glycol monoethyl ether acetate, methyl acetoacetate and 1-methoxy-2-propyl acetate.

Use of the amide-type solvents, the aromatic hydrocarbon-type solvents and/or the ketone-type solvents is desirable in view of the solubility of the components in the polymerizable liquid crystal composition. Use of the ester-type solvents, the alcohol-type solvents, the ether-type solvents and/or the glycol monoalkyl ether-type solvents is desirable in consideration of the boiling points of the solvents. Although the selection of the solvent is not especially limited, it is necessary to decrease drying temperature in order to avoid deformation of a supporting substrate and to prevent the reaction (bulging, dissolving) with the supporting substrate during the formation of the polymer from the polymerizable liquid crystal composition, when a plastic substrate is used as the supporting substrate. Desirable examples of the solvent used in such cases include the aromatic hydrocarbon-type solvents, the ketone-type solvents, the ester-type solvents, the ether-type solvents, the alcohol-type solvents, the acetate-type solvents and the glycol monoalkyl ether-type solvents.

The ratio of the usage of the solvent in the polymerizable liquid crystal composition of the invention is approximately 0% to approximately 95% by weight based on the polymerizable liquid crystal composition (100% by weight). It is desirable that the ratio is approximately 30% to approximately 95% by weight in consideration of the solubility of each component in the polymerizable liquid crystal composition and the optimum viscosity of the polymerizable liquid crystal composition, and in consideration of cost of the solvent and the period of time and the amount of heat consumed during evaporation of the solvent. A more desirable range is approximately 45% to approximately 90% by weight, and further desirable range is approximately 50% to approximately 85% by weight.

The polymerizable liquid crystal composition of the invention can be used suitably for an optical device. It is used specifically for a polarizing plate, an optical compensator, an alignment film, a color filter, a holographic optical device, a liquid crystal display device, a cosmetic, an ornament, an anti-counterfeit detection system, a non-linear optical device and an optical storage device.

Polymer

The polymer of the invention can be obtained by polymerization of the polymerizable liquid crystal composition of the invention described above.

Methods of polymerization are not limited especially, and cationic polymerization is desirable since the compound (1) and the compound (2) have a cationically polymerizable group. A cationic photopolymerization method is especially desirable since the polymerization is easily and desirable carried out under oriented liquid crystalline conditions, when a polymer having optical anisotropy is produced.

The base-amplifying reaction under irradiation with light can be utilized for polymerization of the polymerizable liquid crystal composition of the invention in addition to the cationic polymerization. (See K. Arimitsu, M. Miyamoto, K. Ichimura, Angew. Chem. Int. Ed, 2000, 39, 3425.)

Desirable kinds of light used for the cationic photopolymerization include ultraviolet light, visible light and infrared light. Electron beams, or electromagnetic waves such as X-rays may be used. Ultraviolet light and visible light are usually desirable. Desirable wavelengths are in the range of approximately 150 nm to approximately 500 nm. More desirable wavelengths are in the range of approximately 250 nm to approximately 450 nm and most desirable wavelengths are in the range of approximately 300 nm to approximately 400 nm.

Examples of a light source include a low pressure mercury lamp (a germicidal lamp, a chemical fluorescent lamp and a black light), a high pressure discharge lamp (a high pressure mercury lamp and a metal halide lamp) and a short-arc lamp (an ultra high-pressure mercury lamp, a xenon lamp and a mercury-xenon lamp). A desirable light source is the ultra high-pressure mercury lamp.

The polymerizable liquid crystal composition may be irradiated with light directly from a light source, or light with a specific wavelength (or a specific wavelength range) selected by use of an optical filter.

Desirable irradiation energy density is in the range of approximately 2 mJ/cm$^2$ to approximately 5,000 mJ/cm$^2$. More desirable irradiation energy density is in the range of approximately 10 mJ/cm$^2$ to approximately 3,000 mJ/cm$^2$. Most desirable irradiation energy density is in the range of approximately 100 mJ/cm$^2$ to approximately 2,000 mJ/cm$^2$. Desirable illuminance is in the range of approximately 0.1 mW/cm$^2$ to approximately 5,000 mW/cm$^2$. More desirable illuminance is in the range of approximately 1 mW/cm$^2$ to approximately 2,000 mW/cm$^2$.

It is desirable to adjust a temperature so that the polymerizable liquid crystal composition has a liquid crystal phase during irradiation with light. It is desirable that the temperature of the polymerizable liquid crystal composition during irradiation with light is approximately 100° C. or lower, since an excellent orientation is attained by preventing polymerization caused by a high temperature.

The form of the polymer is not limited especially, and may be filmy, platy, granular, powdery and so forth. The polymer may be molded depending on the desired purpose.

A Film-Like Polymer Will be Explained in Detail Below.

The film-like polymer can be obtained, for example, by the application of the composition to a supporting substrate and then by polymerization of the paint film. Examples of a starting material for the supporting substrate include triacetyl cellulose (may be referred to as TAC), polyvinyl alcohol, polyimide, polyester, polyarylate, polyetherimide, polyethylene terephthalate and polyethylene naphthalate. A desirable starting material is triacetyl cellulose. Examples of these commercial products include "Arton" of JSR Co., Ltd., "Zeonex" and "Zeonor" of Zeon Co., Ltd. and "Apel" of Mitsui Chemicals, Inc. The supporting substrate is a uniaxially stretched film, a biaxially stretched film and so forth processed from a starting material described above, depending on the kinds of the starting material. A supporting substrate made of metal such as aluminum, iron and copper, and a supporting substrate made of glass such as alkali glass, borosilicate glass and flint glass can also used as a supporting substrate.

The supporting substrate may be used without pre-treatment when the polymer of the invention is produced. The supporting substrate may be processed by means of a surface treatment as required, such as alignment treatment, saponification treatment, corona treatment, UV-ozone treatment and plasma treatment.

An application method includes spin coating, roll coating, curtain coating, flow coating, printing, micro-gravure coating, gravure coating, wire-bar coating, dip coating, spray coating, meniscus coating and casting film-forming.

When a film-like polymer is formed, the thickness of the polymer may suitably be selected according to the desired usage, and a desirable thickness is in the range of approximately 0.05 µm to approximately 50 µm, a more desirable thickness is in the range of approximately 0.1 µm to approximately 20 µm and an especially desirable thickness is in the range of approximately 0.5 µm to approximately 10 µm. It is desirable that the haze value (cloudiness) of the polymer is approximately 1.5% or less. It is desirable that the transmittance of the polymer is approximately 80% or more in the visible light range. Such a polymer is suitable for a thin film with optical anisotropy used for a liquid crystal display device.

In the polymerizable liquid crystal composition of the invention, factors determining orientation of liquid crystal molecules include (1) the kinds of compounds included in the composition, (2) the kinds of a supporting substrate, and (3) the kinds of methods of alignment treatment. A desirable method of the alignment treatment includes treatment in which the supporting substrate is rubbed with a rayon cloth in one direction (rubbing treatment), oblique-deposition of silicon oxide to a supporting substrate and slit etching of a supporting substrate. An especially desirable method for alignment treatment includes the rubbing treatment. In the rubbing treatment, a supporting substrate itself may be rubbed. A supporting substrate that has previously been coated with a thin film of polyimide, polyvinyl alcohol or the like may be rubbed. A specific thin film on which an excellent orientation is possible without the rubbing treatment may also be used. A supporting substrate coated with a side-chain liquid crystal polymer is also effective.

The polymerizable liquid crystal composition that includes at least one compound selected from the group of optically active compounds represented by formulas (1) and (2) exhibits a helical structure. Thus, a polymer having optical anisotropy can be obtained by polymerization of the polymerizable liquid crystal composition. Characteristics of the polymer having optical anisotropy depend on a helical pitch. The helical pitch can be adjusted by the kinds of the optically active compound and its amount. One optically active compound may be added and a plurality of optically active compounds may be used for the purpose of compensating the temperature dependence of the helical pitch.

The polymer having optical anisotropy described above selectively reflects light with a wavelength depending on the desired color or purpose. The selective reflection of light is that circularly polarized light is reflected by the action of a helical structure to incident rays. Incidentally, the circularly polarized light means circularly polarized light and/or elliptically polarized light in this invention.

Characteristics of the selective reflection are expressed by the equation: $\lambda = n \cdot \text{Pitch}$, where $\lambda$ stands for the central wavelength of the selective reflection, n stands for an average refractive index and Pitch stands for a helical pitch. Hence, the central wavelength ($\lambda$) and the bandwidth of the selective reflection ($\Delta\lambda$) can be suitably adjusted by the value of n or Pitch. Thus, three kinds of polymers, that is, a polymer that exhibits circular dichroism in the light region at a part or all of wavelengths of approximately 350 nm to approximately 750 nm, a polymer that exhibits circular dichroism in the ultraviolet region at wavelengths of approximately 100 nm to approximately 350 nm, and a polymer that exhibits circular dichroism in the near-infrared region at wavelengths of approximately 750 nm to approximately 2500 nm, can be produced according to the desired purpose.

When a helical pitch is 1/n (n stands for an average refractive index of the resulting thin film having optical anisotropy)

of a wavelength of light, right- or left-circularly polarized light with that wavelength, depending on the direction of the helix, can be reflected according to Bragg's law. Therefore, the polymer of the invention can be used as, for example, a circularly polarized light separation device.

The direction of the helix depends on configuration of an optically active compound. A desired direction of the helix can be adjusted by a suitable selection of the configuration of the optically active compound. For example, a formed body having optical anisotropy can be obtained in which a helical pitch changes consecutively in the thickness-direction of the formed body, according to the method disclosed in JP H06-281814 A (1994), and then it can reflect light with a wide wavelength range that depends on the helical pitch. The bandwidth ($\Delta\lambda$) should be decreased for an improvement of color purity, and the bandwidth should be increased for reflection in a broad range. Furthermore, the selective reflection is greatly affected by cell thickness. The cell thickness should not be made too small for maintaining color purity. The cell thickness should not be made too large for maintaining orientational uniformity. Thus, a suitable adjustment of the cell thickness is necessary, and a desirable cell thickness is in the range of approximately 0.5 µm to approximately 25 µm, and a more desirable cell thickness is in the range of approximately 0.5 µm to approximately 5 µm.

A negative C-plate can be prepared by making the helical pitch shorter than the wavelengths of visible light. (See W. H. de Jeu, Physical Properties of Liquid Crystalline Materials, Gordon and Breach, New York (1980).) A shorter helical pitch can be achieved by use of an optically active compound having a large helical twisting power (HTP) and by an increase of the amount of the compound. The negative C-plate can be formed specifically when wavelength ($\lambda$) is preferably approximately 350 nm or less, and more preferably approximately 200 nm or less. This negative C-plate serves as an optical compensation film suitable for a display device of a VAN-type, a VAC-type, an OCB-type or the like, in liquid crystal display devices.

The polymerizable liquid crystal composition, including a compound selected from the group of optically active compounds represented by formulas (1) and (2), and a nematic liquid crystal compound having a polymerizable group, has a cholesteric phase. A fixed cholesteric phase can be obtained by the application of the composition to a substrate and then by polymerization of the composition on irradiation with light.

The polymer of the invention can be used for a polarizing plate, an optical compensator, an alignment film, a color filter, a holographic optical device, a liquid crystal display device, a cosmetic, an ornament, an anti-counterfeit detection system, a non-linear optical device, an optical storage device and so forth.

Furthermore, the polymer of the invention can also be used for the following usage. Thermoplastic resins is used for adhesives, synthetic polymers having mechanical anisotropy, cosmetics, ornaments, non-linear optical materials, information storage materials and so forth. The thermoplastic resin is a linear polymer having no side chains. Similarly, a polymer formed by polymerization of the polymerizable liquid crystal composition of the invention including the compound (2) described above can be used for adhesives, synthetic polymers having mechanical anisotropy, cosmetics, ornaments, non-linear optical materials, information storage materials and so forth. The weight average molecular weight of the polymer is approximately 500 to approximately 1,000,000, preferably approximately 1,000 to approximately 500,000, and more preferably approximately 5,000 to approximately 100,000.

Thermosetting resins are used for an optical retardation plate, a polarizer, a liquid crystal alignment film, an antireflection film, a selective reflection film, a viewing angle-compensation film and so forth, each of which is element of the a liquid crystal display device. The thermosetting resin is a polymer having a three-dimensional network structure. Similarly, a polymer formed by polymerization of the polymerizable liquid crystal composition of the invention including the compound (1) described above can be used for an optical retardation plate, a polarizer, a liquid crystal alignment film, an antireflection film, a selective reflection film, a viewing angle-compensation film and so forth. The polymer has a high degree of polymerization, and the solubility in a solvent decreases and the hardness increases according to the progress of polymerization. It is desirable that the molecular weight of the polymer is close to infinity, although the molecular weight of the polymer is hardly measured and not easily determined.

Optical Device

The optical device of the invention is not especially limited if it includes the polymerizable liquid crystal composition or the polymer of the invention described above. A desirable optical device includes the polymerizable liquid crystal composition or the polymer described above, exhibiting circular dichroism in the ultraviolet and the visible light range of wavelengths approximately 100 nm to approximately 750 nm and having a helical pitch in the range of approximately 1 nm to less than approximately 200 nm.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention is explained by way of the following Examples, but not limited to Examples. The structures of compounds were characterized by means of their nuclear magnetic resonance spectra, infrared absorption spectra, mass spectra and so forth. Methods for measurement of characteristics will be shown below. Incidentally, displayed numbers on a digital analytical balance were expressed in grams (g; unit of mass) in Examples. Percentage by weight or parts by weight is expressed by use of these numbers as data.

Structural Determination of Compounds

The structures of synthesized compounds were determined by means of a 500 MHz-proton NMR spectroscopy Bruker Model DRX-500. A numerical values is ppm and the symbols s, d, t and m stand for a singlet, a doublet, a triplet and a multiplet, respectively.

Phase Transition Temperature

A sample was placed on a hot plate of a melting point apparatus (Mettler FD 800; Mettler Toledo International Inc.) equipped with a polarizing microscope and heated at a rate of 3° C./minute. Temperature was measured when a liquid crystal phase was transformed to another liquid crystal phase. The symbols C, N, Ch and I stand for crystals, a nematic phase, a cholesteric phase and an isotropic liquid, respectively. A "Ch I'' point means the maximum temperature which can maintain a cholesteric phase and the transition temperature from a cholesteric phase to an isotropic liquid. For example, "C 50 Ch 63 I" shows that crystals were transformed to a cholesteric phase at 50° C., and the cholesteric phase was transformed to an isotropic liquid at 63° C.

Measurement of Helical Pitch and HTP

Method for measurement of helical pitch will be explained. The composition (LC-1) described below was mixed with the polymerizable optically active compound (1) or (2). The mixture was heated and dissolved to complete an isotropic liquid, and then was allowed to stand to cool. A part of the mixture cooled was poured into a wedge shaped cell and the helical pitch was measured at 25° C. according to a Cano wedge method. (See Oyo Buturi, 1974, 43, 125 ("Oyo Buturi" is a monthly publication of The Japan Society of Applied Physics).) HTP was calculated form the helical pitch measured according to the equation: $HTP=p^{-1} \times c^{-}$, where c is percentage by weight of the compound (1) or (2) and p is helical pitch (μm). Incidentally, the composition (LC-1) described below is a mixture of four compounds represented by structural formulas in the ratios described in the right side of each formula.

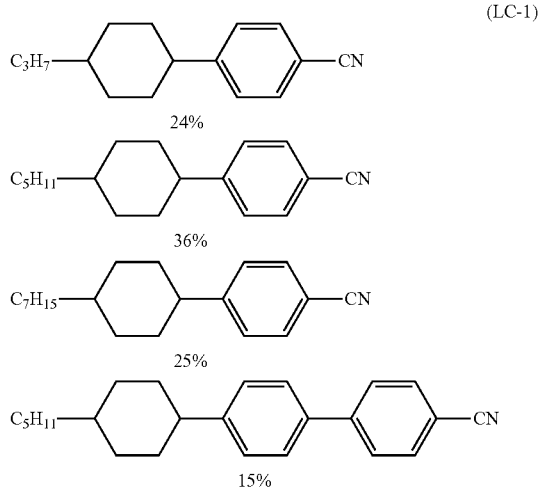

(LC-1)

Alignment of the Polymer

Retardation (Δn×d) was measured by use of a polarimeter Model OPTIPRO made by Shintech, Inc. on irradiation of a polymer film formed in the following examples with light at a 550 nm wavelength, while the incident angle of the light to the film surface was decreased from an angle of 90 degrees.

Example 1

Synthesis of the Compound (1-5-1)

First Step:

Sodium hydroxide (11.1 g) was added to a mixture of toluene (30 ml) and water (30 ml) and the mixture was stirred at room temperature under an atmosphere of nitrogen. To the solution, cyclohexanemethanol (6.2 g), 1,4-dibromobutane (18.0 g) and tetrabutylammonium bromide (1.8 g) were added and the mixture was heated to reflux with stirring for 3 hours. After the stirring, the organic phase was separated from the reaction mixture, and washed successively with a saturated aqueous solution of sodium hydrogencarbonate and 10% salt water, and then dried over anhydrous magnesium sulfate. The solvent was distilled off under reduced pressure, and the resulting residue was purified by column chromatography (silica gel; eluent: toluene), and the solvent was distilled off under reduced pressure to give a colorless oil [H1] (5.9 g).

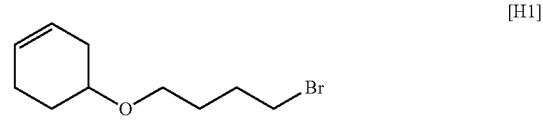 [SMILES: BrCCCCOC1CC=CCC1]

[H1]

NMR analysis data of the compound [H1] were as follows: $^1$H-NMR (CDCl$_3$; δ ppm): 5.67 (s, 2H), 3.47-3.42 (m, 4H), 3.33-3.25 (m, 2H), 2.15-2.02 (m, 3H), 2.00-1.68 (m, 7H) and 1.32-1.22 (m, 1H).

Second Step:

A mixture of the compound [H1] (5.9 g), methyl 4-hydroxybenzoate (4.0 g), potassium hydroxide (1.5 g) and DMF (N,N-dimethylformamide) (60 ml) was heated with stirring under an atmosphere of nitrogen at 80° C. for 6 hours. Deposited salts were filtered off by suction. Toluene (100 ml) and water (100 ml) was added to the filtrate and an organic phase was separated. The organic phase was washed successively with a saturated aqueous solution of sodium hydrogencarbonate and water, and then the solvent was distilled off under reduced pressure. Methanol (20 ml), water (20 ml) and potassium hydroxide (1.5 g) were added to the residue and the mixture was heated to reflux with stirring for 3 hours. After the stirring, the solvent was distilled off under reduced pressure, and 3N-hydrochloric acid (100 ml) and ethyl acetate (200 ml) were added to the residue and an organic phase was separated. The organic phase was washed with water, and then the solvent was distilled off under reduced pressure. The residue was purified by recrystallization (ethanol) to give colorless crystals of the compound [H2] (2.6 g).

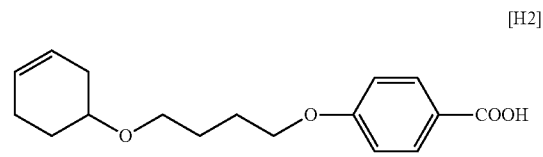 [SMILES: O=C(O)c1ccc(OCCCCOC2CC=CCC2)cc1]

[H2]

NMR analysis data of the compound [H2] were as follows: $^1$H-NMR (CDCl$_3$; δ ppm): 8.05 (d, 2H), 6.93 (d, 2H), 5.67 (s, 2H), 4.07 (t, 2H), 3.50 (t, 2H), 3.35-3.27 (m, 2H), 2.15-2.03 (m, 3H), 1.95-1.68 (m, 7H) and 1.33-1.23 (m, 1H).

Third Step:

DCC (1,3-dicyclohexylcarbodiimide) (3.55 g) was added to a mixture of the compound [H2] (5.0 g), bis(4'-hydroxybenzoyl)-1,4:3,6-dianhydrosorbitol (2.9 g), DMAP (4-dimethylaminopyridine) (0.4 g) and dichloromethane (50 ml) with cooling under an atmosphere of nitrogen, and the stirring was continued at room temperature for another 16 hours. Deposited insoluble matters were filtered off by suction, and water was added to the filtrate to separate an organic phase. The resulting organic phase was washed successively with 2N-hydrochloric acid and water, and then dried over anhydrous magnesium sulfate. The solvent was distilled off under reduced pressure, and the resulting residue was purified by column chromatography (silica gel; eluent: a mixture of toluene and ethyl acetate, toluene/ethyl acetate=8/1 by volume) and recrystallization (a mixture of toluene and methanol, toluene/methanol=1/10 by volume) to give colorless crystals of the compound [H3] (5.5 g).

[H3]

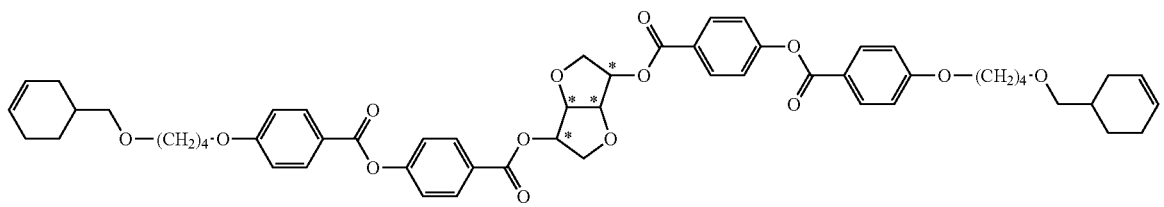

NMR analysis data of the compound [H3] were as follows:
$^1$H-NMR (CDCl$_3$; δ ppm): 8.17 (d, 4H), 8.14 (d, 4H), 7.32 (d, 4H), 6.97 (d, 4H), 5.67 (s, 4H), 5.39-5.33 (m, 2H), 4.93-4.88 (m, 2H), 4.19-4.14 (m, 2H), 4.09 (t, 4H), 4.06-4.01 (m, 2H), 3.50 (t, 4H), 3.36-3.28 (m, 4H), 2.16-2.02 (m, 6H), 1.97-1.69 (m, 14H) and 1.33-1.24 (m, 2H).

Fourth Step:

m-Chloroperbenzoic acid (3.3 g) was added to a mixture of the compound [H3] (5.5 g) and dichloromethane (55 ml) with cooling under an atmosphere of nitrogen, and the stirring was continued at room temperature for another 16 hours. Deposited insoluble matters were filtered off by suction, and the filtrate was washed successively with a 10% solution of sodium hydrogen sulfite, a 3% aqueous solution of sodium hydroxide and water, and then dried over anhydrous magnesium sulfate. The solvent was distilled off under reduced pressure, and the resulting residue was purified by column chromatography (silica gel; eluent: a mixture of toluene and ethyl acetate, toluene/ethyl acetate=4/1 by volume) and recrystallization (a mixture of toluene and methanol, toluene/methanol=1/10 by volume) to give colorless crystals of the compound (1-5-1) (0.7 g).

hydrogencarbonate and 10% salt water, and then dried over anhydrous magnesium sulfate. The solvent was distilled off under reduced pressure, and the resulting residue was purified by column chromatography (silica gel; eluent: toluene), and then the solvent was distilled off under reduced pressure to give a colorless oil [H4] (14.1 g).

[H4]

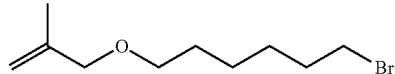

The analysis data of the compound [H4] were as follows:
$^1$H-NMR (CDCl$_3$; δ ppm): 4.92 (d, 2H), 3.87 (s, 2H), 3.54 (t, 2H), 3.40 (t, 2H), 1.82-1.75 (m, 2H), 1.73 (s, 3H), 1.64-1.57 (m, 2H) and 1.50-1.37 (m, 4H).

Second Step:

A mixture of the compound [H4] (14.1 g), methyl 4-hydroxybenzoate (10.0 g), potassium hydroxide (2.4 g) and DMF (N,N-dimethylformamide) (140 ml) was heated with stirring at 80° C. for 6 hours under an atmosphere of nitrogen. Deposited salts were filtered off by suction. Toluene (150 ml) and water (150 ml) were added to the filtrate and the organic (1-5-1)

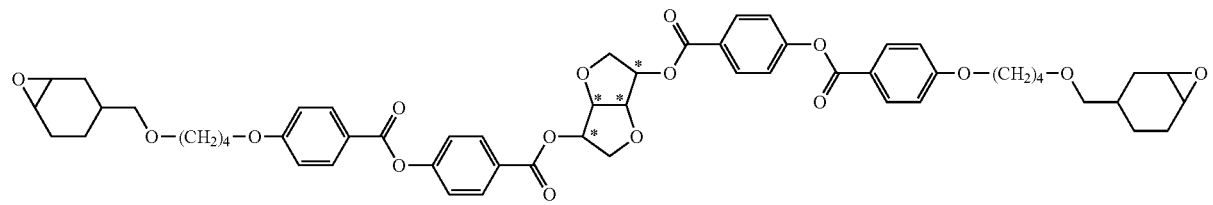

The phase transition temperature, HTP and NMR analysis data of the compound (1-5-1) were as follows: "C 69 I"; HTP=17.2 μm$^-$; $^1$H-NMR (CDCl$_3$; δ ppm): 8.18 (d, 4H), 815 (d, 4H), 7.32 (d, 4H), 6.97 (d, 4H), 5.39-5.33 (m, 2H), 4.93-4.89 (m, 2H), 4.19-4.14 (m, 2H), 4.08 (t, 4H), 4.06-4.01 (m, 2H), 3.47 (t, 4H), 3.29-3.14 (m, 8H), 2.20-1.70 (m, 16H), 1.62-1.40 (m, 4H), 1.20-1.10 (m, 1H) and 1.06-0.96 (m, 1H).

Example 2

Synthesis of the Compound (1-7-4)

First Step:

Sodium hydroxide (11.1 g) was added to a mixture of toluene (30 ml) and water (30 ml) with stirring at room temperature under an atmosphere of nitrogen. β-Methallyl alcohol (10.0 g), 1,6-dibromohexane (67.7 g) and tetrabutylammonium bromide (4.5 g) were added to the solution and the mixture was heated to reflux with stirring for 8 hours. After the stirring, the organic phase was separated from the reaction mixture. The resulting organic phase was washed successively with a saturated aqueous solution of sodium phase was separated. The resulting organic phase was washed successively with a saturated aqueous solution of sodium hydrogencarbonate and water, and then the solvent was distilled off under reduced pressure. Then, methanol (100 ml), water (100 ml) and potassium hydroxide (2.4 g) were added to the residue and the mixture was heated to reflux with stirring for 3 hours. After the stirring, the solvent was distilled off under reduced pressure. 3N-hydrochloric acid (100 ml) and ethyl acetate (100 ml) were added to the residue and the organic phase was separated. The resulting organic phase was washed with water and then the solvent was distilled off under reduced pressure. The residue was purified by recrystallization (heptane) to give colorless crystals of the compound [H5] (10.5 g).

[H5]

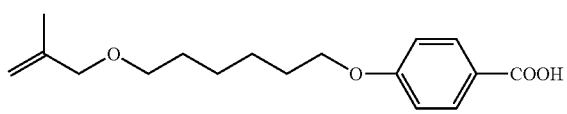

NMR analysis data of the compound [H5] were as follows:
$^1$H-NMR (CDCl$_3$; δ ppm): 8.05 (d, 2H), 6.96 (d, 2H), 4.93 (d, 2H), 4.03 (t, 2H), 3.88 (s, 2H), 3.42 (t, 2H), 1.88-1.79 (m, 2H), 1.73 (s, 3H), 1.68-1.60 (m, 2H) and 1.56-1.42 (m, 4H).

Third Step:

DCC (1,3-dicyclohexylcarbodiimide) (3.7 g) was added to a mixture of the compound [H5] (5.0 g), 1,1'-binaphthyl-7,7'-diylbis(6-hydroxy-2-naphthoate) (5.4 g), DMAP (4-dimethylaminopyridine) (0.4 g) and dichloromethane (50 ml) with cooling under an atmosphere of nitrogen, and the stirring was continued at room temperature for another 16 hours. Deposited insoluble matters were filtered off by suction, and water was added to the filtrate to separate an organic phase. The resulting organic phase was washed successively with 2N-hydrochloric acid and water, and then dried over anhydrous magnesium sulfate. After the drying, the solvent was distilled off under reduced pressure, and the resulting residue was purified by column chromatography (silica gel; eluent: a mixture of toluene and ethyl acetate, toluene/ethyl acetate=8/1 by volume) and recrystallization (a mixture of toluene and methanol, toluene/methanol=1/10 by volume) to give a crude oil of the compound [H6] (10.0 g).

Fourth Step: m-Chloroperbenzoic acid (3.0 g) was added to a mixture of the compound [H6] (10.0 g) and dichloromethane (100 ml) with cooling under an atmosphere of nitrogen, and then the stirring was continued at room temperature for another 16 hours. Deposited insoluble matters were filtered off by suction, and the filtrate was washed successively with a 10% solution of sodium hydrogen sulfite, a 3% aqueous solution of sodium hydroxide and water, and then dried over anhydrous magnesium sulfate. After the drying, the solvent was distilled off under reduced pressure, and the resulting residue was purified by column chromatography (silica gel; eluent: a mixture of toluene and ethyl acetate, toluene/ethyl acetate=4/1 by volume) and recrystallization (a mixture of toluene and methanol, toluene/methanol=1/10 by volume) to give colorless crystals of the compound (1-7-4) (4.9 g).

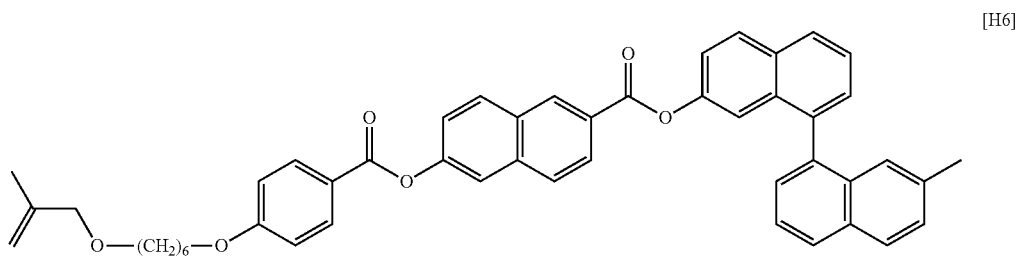

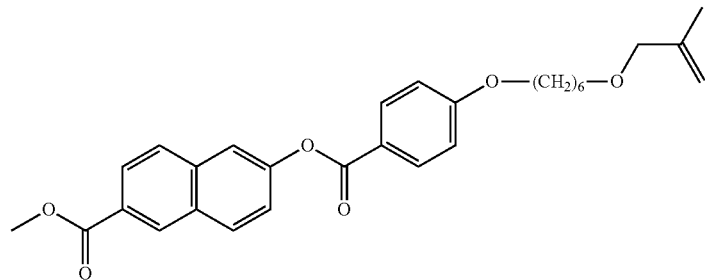

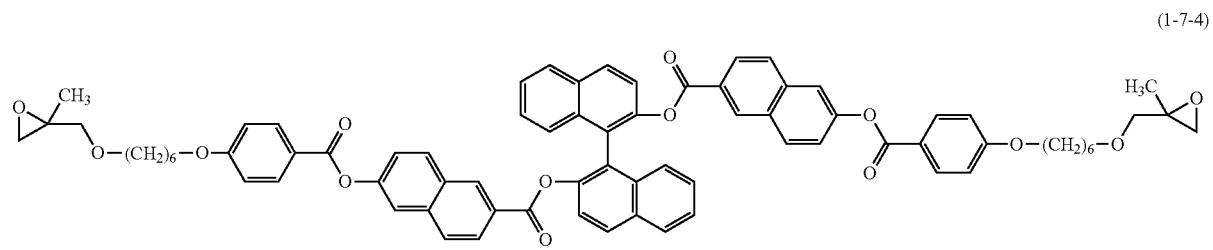

HTP and NMR analysis data of the compound (1-7-4) were as follows: HTP=44.8 μm[1]; $^1$H-NMR (CDCl$_3$; δ ppm): 8.16 (d, 4H), 8.06 (s, 2H), 8.01 (d, 2H), 7.92 (d, 2H), 7.77-7.61 (m, 10H), 7.53-7.46 (m, 4H), 7.42-7.33 (m, 4H), 6.98 (d, 4H), 4.06 (t, 4H), 3.56-3.45 (m, 6H), 3.39 (d, 2H), 2.73 (d, 2H), 2.62 (d, 2H), 1.87-1.80 (m, 4H), 1.66-1.60 (m, 4H), 1.57-1.41 (m, 8H) and 1.38 (s, 6H).

Example 3

Synthesis of the Compound (2-2-5)

First Step:

DCC (1,3-dicyclohexylcarbodiimide) (24.1 g) was added to a mixture of 4-acetoxybenzoic acid (20.0 g), L-menthol (17.4 g), DMAP (4-dimethylaminopyridine) (1.4 g) and dichloromethane (200 ml) with cooling under an atmosphere of nitrogen, and then the stirring was continued at room temperature for another 16 hours. Deposited insoluble matters were filtered off by suction, and water was added to the filtrate to separate an organic phase. The resulting organic phase was washed successively with 2N-hydrochloric acid and water, and then dried over anhydrous magnesium sulfate. After the drying, the solvent was distilled off under reduced pressure. Methanol (150 ml) was added to the residue, and a 28% aqueous solution of ammonia (20 ml) was added dropwise at room temperature. After the stirring at room temperature for another 2 hours, the solvent was distilled off under reduced pressure. 3N-hydrochloric acid was added to the residue to neutralize, and ethyl acetate was added to separate an organic phase, which was dried over anhydrous magnesium sulfate. After the drying, the solvent was distilled off under reduced pressure to leave a crude oil of the compound [H7] (23.3 g).

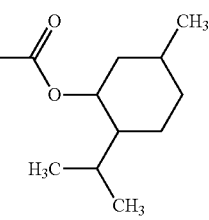

[H7]

Second Step:

A mixture of 3-chloro-2-methyl-1-propene (10.0 g), methyl 4-hydroxybenzoate (18.5 g), potassium hydroxide (4.8 g) and DMF (N,N-dimethylformamide) (100 ml) was heated with stirring at 80° C. for 12 hours under an atmosphere of nitrogen. Deposited salts were filtered off by suction. Toluene (150 ml) and water (150 ml) were added to the filtrate to separate an organic phase. The resulting organic phase was washed successively with a saturated aqueous solution of sodium hydrogencarbonate and water, and then the solvent was distilled off under reduced pressure. Methanol (80 ml), water (80 ml) and potassium hydroxide (4.8 g) were added to the residue and the mixture was heated to reflux with stirring for 3 hours. After the stirring, the solvent was distilled off under reduced pressure and 3N-hydrochloric acid (100 ml) and ethyl acetate (200 ml) were added to separate an organic phase. The resulting organic phase was washed with water, and then the solvent was distilled off under reduced pressure. The residue was purified by recrystallization (ethanol) to give colorless crystals of the compound [H8] (13.9 g).

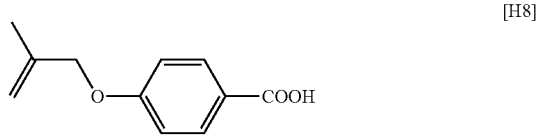

[H8]

NMR analysis data of the compound [H8] were as follows: $^1$H-NMR (CDCl$_3$; δ ppm): 8.06 (d, 2H), 6.96 (d, 2H), 5.06 (d, 2H), 4.51 (s, 2H) and 1.84 (s, 3H).

Third Step:

DCC (1,3-dicyclohexylcarbodiimide) (6.8 g) was added to a mixture of the compound [H7] (10.0 g), the compound [H8] (6.0 g), DMAP (4-dimethylaminopyridine) (0.8 g) and dichloromethane (100 ml) with cooling under an atmosphere of nitrogen, and then the stirring was continued at room temperature for another 16 hours. Deposited insoluble matters were filtered off by suction, and water was added to the filtrate to separate an organic phase. The resulting organic phase was washed successively with 2N-hydrochloric acid and water, and then dried over anhydrous magnesium sulfate. After the drying, the solvent was distilled off under reduced pressure, and the resulting residue was purified by column chromatography (silica gel; eluent: a mixture of toluene and ethyl acetate, toluene/ethyl acetate=8/1 by volume) and recrystallization (a mixture of toluene and methanol, toluene/methanol=1/10 by volume) to give colorless crystals of the compound [H9] (9.8 g).

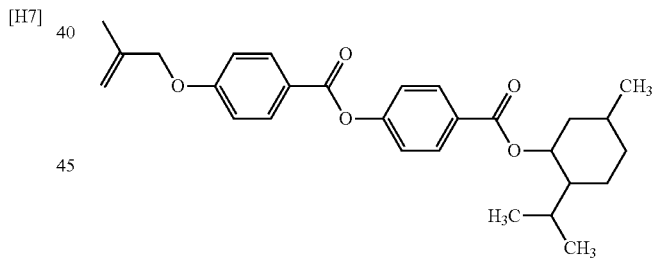

[H9]

NMR analysis data of the compound [H9] were as follows: $^1$H-NMR (CDCl$_3$; δ ppm): 8.17 (d, 2H), 8.13 (d, 2H), 7.28 (d, 2H), 7.01 (d, 2H), 5.08 (d, 2H), 4.98-4.90 (m, 1H), 4.54 (s, 2H), 2.17-2.10 (m, 1H), 2.00-1.93 (m, 1H), 1.86 (s, 3H), 1.74 (d, 2H), 1.61-1.52 (m, 2H), 1.19-1.07 (m, 2H), 0.94 (t, 7H) and 0.81 (d, 3H).

Fourth Step:

m-Chloroperbenzoic acid (12.7 g) was added to a mixture of the compound [H9] (9.8 g) and dichloromethane (100 ml) with cooling under an atmosphere of nitrogen, and then the stirring was continued at room temperature for another 16 hours. Deposited insoluble matters were filtered off by suction, and the filtrate was washed successively with a 10% solution of sodium hydrogen sulfite, a 3% aqueous solution of sodium hydroxide and water, and then dried over anhydrous magnesium sulfate. After the drying, the solvent was distilled off under reduced pressure, and the resulting residue was purified by column chromatography (silica gel; eluent: a mixture of toluene and ethyl acetate, toluene/ethyl acetate=8/1 by volume) and recrystallization (a mixture of toluene and methanol, toluene/methanol=1/10 by volume) to give colorless crystals of the compound (2-2-5) (7.1 g).

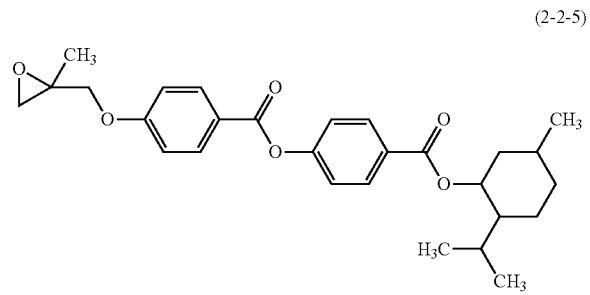 [SMILES: CC1CCC(C(C)C)C(OC(=O)c2ccc(OC(=O)c3ccc(OCC4(C)CO4)cc3)cc2)C1]

(2-2-5)

The phase transition temperature, HTP and NMR analysis data of the compound (2-2-5) were as follows: "C 136 I"; HTP=51 µm$^{-1}$.

$^1$H-NMR (CDCl$_3$; δ ppm): 8.15 (d, 2H), 8.12 (d, 2H), 7.28 (d, 2H), 7.02 (d, 2H), 4.97-4.90 (m, 1H), 4.16 (d, 1H), 4.02 (d, 1H), 2.91 (d, 1H), 2.78 (d, 1H), 2.17-2.10 (m, 1H), 2.00-1.93 (m, 1H), 1.74 (d, 2H), 1.62-1.50 (m, 5H), 1.20-1.07 (m, 2H), 0.93 (t, 7H) and 0.80 (d, 3H).

Example 4

Synthesis of the Compound (1-4-11)

The compound [H10] was synthesized by the method described in JP 2005-023019 A.

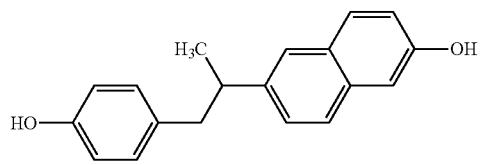

[H10]

First Step:

DCC (1,3-dicyclohexylcarbodiimide) (3.1 g) was added to the mixture of the compound [H2] (4.4 g), the compound [H10] (2.0 g), DMAP (4-dimethylaminopyridine) (0.4 g) and dichloromethane (50 ml) with cooling under an atmosphere of nitrogen, and then the stirring was continued at room temperature for another 16 hours. Deposited insoluble matters were filtered off by suction, and water was added to the filtrate to separate an organic phase. The resulting organic phase was washed successively with 2N-hydrochloric acid and water, and then dried over anhydrous magnesium sulfate. After the drying, the solvent was distilled off under reduced pressure, and the resulting residue was purified by column chromatography (silica gel; eluent: a mixture of toluene and ethyl acetate, toluene/ethyl acetate=4/1 by volume) and recrystallization (a mixture of toluene and methanol, toluene/methanol=1/10 by volume) to give colorless crystals of the compound [H11] (4.9 g).

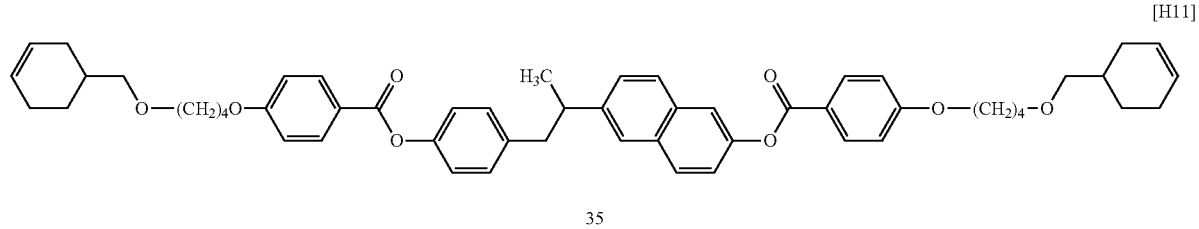

[H11]

NMR analysis data of the compound [H11] were as follows: $^1$H-NMR (CDCl$_3$; δ ppm): 8.18 (d, 2H), 8.12 (d, 2H), 7.83 (d, 1H), 7.78 (d, 1H), 7.61 (d, 2H), 7.39 (d, 1H), 7.32 (d, 1H), 7.13 (d, 2H), 7.06 (d, 2H), 6.99 (d, 2H), 6.97 (d, 2H), 5.67 (s, 4H), 4.12-4.06 (m, 4H), 3.54-3.47 (m, 4H), 3.36-3.28 (m, 4H), 3.22-3.14 (m, 1H), 3.07-3.02 (m, 1H), 2.93-2.86 (m, 1H), 2.16-2.03 (m, 6H), 1.97-1.85 (m, 6H), 1.85-1.70 (m, 8H), 1.36 (d, 3H) and 1.34-1.24 (m, 2H).

Second Step:

m-Chloroperbenzoic acid (3.3 g) was added to a mixture of the compound [H11] (4.9 g) and dichloromethane (100 ml) with cooling under an atmosphere of nitrogen, and then the stirring was continued at room temperature for another 16 hours. Deposited insoluble matters were filtered off by suction, and the filtrate was washed successively with a 10% solution of sodium hydrogen sulfite, a 3% aqueous solution of sodium hydroxide and water, and then dried over anhydrous magnesium sulfate. After the drying, the solvent was distilled off under reduced pressure, and the resulting residue was purified by column chromatography (silica gel; eluent: a mixture of toluene and ethyl acetate, toluene/ethyl acetate=4/1 by volume) and recrystallization (a mixture of toluene and methanol, toluene/methanol=1/10 by volume) to give colorless crystals of the compound (1-4-11) (3.5 g).

(1-4-11)

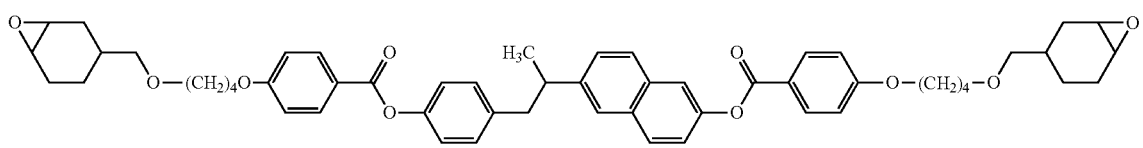

The phase transition temperature, HTP and NMR analysis data of the compound (1-4-11) were as follows: "C 78 Ch 155 I"; HTP=6 μm$^{-1}$;

$^{1}$H-NMR (CDCl$_{3}$; δ ppm): 8.19 (d, 2H), 8.12 (d, 2H), 7.82 (d, 1H), 7.77 (d, 1H), 7.62 (d, 2H), 7.38 (d, 1H), 7.31 (d, 1H), 7.12 (d, 2H), 7.06 (d, 2H), 6.99 (d, 2H), 6.96 (d, 2H), 4.12-4.05 (m, 4H), 3.54-3.44 (m, 4H), 3.29-3.13 (m, 9H), 3.08-3.03 (m, 1H), 2.93-2.87 (m, 1H), 2.19-2.13 (m, 2H), 2.12-1.97 (m, 2H), 1.95-1.70 (m, 12H), 1.55-1.40 (m, 4H), 1.36 (d, 3H), 1.20-1.11 (m, 1H) and 1.06-0.96 (m, 1H).

The compounds (M1-1-1) to (M2-2-1), which have been used in Examples 5 to 9, are shown below. These compounds can be synthesized by means of a combination of techniques in synthetic organic chemistry. Methods for an introduction of objective terminal groups, rings and bonding groups to starting materials are described in books such as Houben-Weyl, Methods of Organic Chemistry, Georg Thieme Verlag, Stuttgart; Organic syntheses, John Wily & Sons, Inc.; Organic Reactions, John Wily & Sons Inc.; Comprehensive Organic Synthesis, Pergamon Press; and New Experimental Chemistry Course (Shin Jikken Kagaku Kouza, in Japanese), Maruzen Co., Ltd.

(M1-1-1)

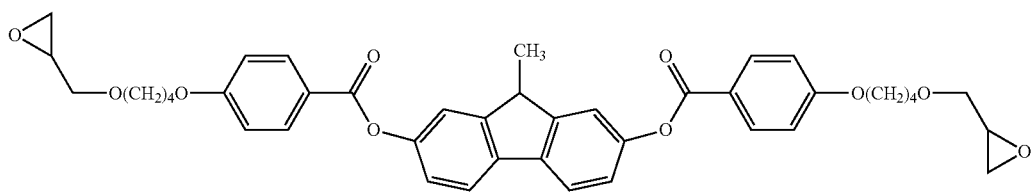

(M1-1-2)

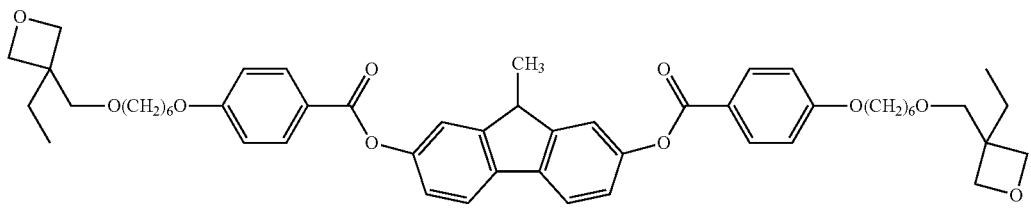

(M1-7-1)

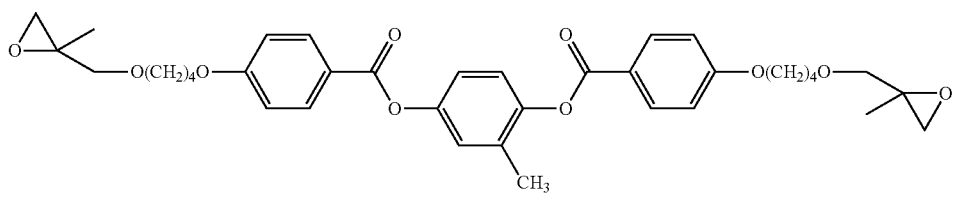

(M1-7-2)

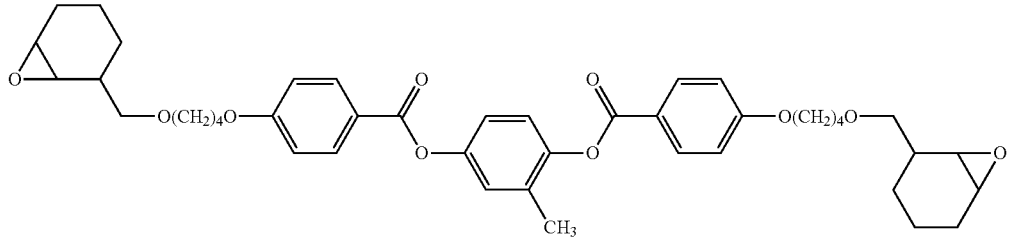

(M1-7-3)

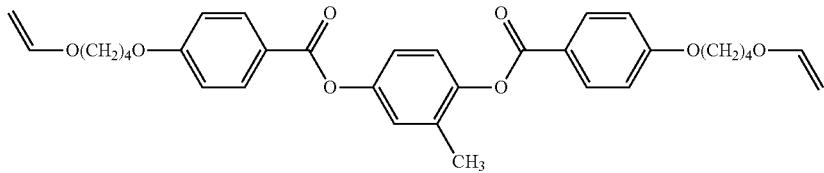

(M1-19-1)

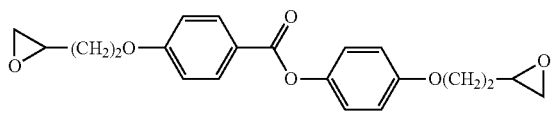

(M2-2-1)

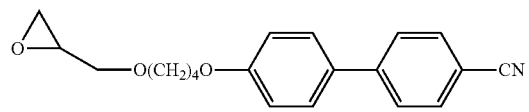

Specific synthetic methods of the compounds described above will be explained here.

The compound (M1-1-1) and the compound (M1-1-2) were synthesized by the method described in JP 2005-060373 A. The compound (M1-7-3) was synthesized by the method described in Polymer, 34 (8), 1736-1740 (1993).

The compound (M1-19-1) was synthesized by the method described in Macromolecules, 26, 1244-1247 (1993). The compound (M2-2-1) was synthesized by the method described in JP 2005-206579 A.

The compound (M1-7-1) was synthesized by the following method.

Second Step:

The compound (ex1-1) (633 mmol), ethyl 4-hydroxybenzoate (763 mmol) and sodium hydroxide (636 mmol) were added to N,N-dimethylformamide (DMF) (1,000 mL), and the mixture was heated with stirring at 80° C. for 8 hours under an atmosphere of nitrogen. Toluene was added to extract an organic phase. The resulting organic phase was washed with water, and then dried over anhydrous magnesium sulfate. The solvent was distilled off under reduced pressure. Sodium hydroxide (636 mmol) was added to the resulting residue, and the mixture was added to a mixture of methanol (500 mL) and water (500 mL) and then heated to

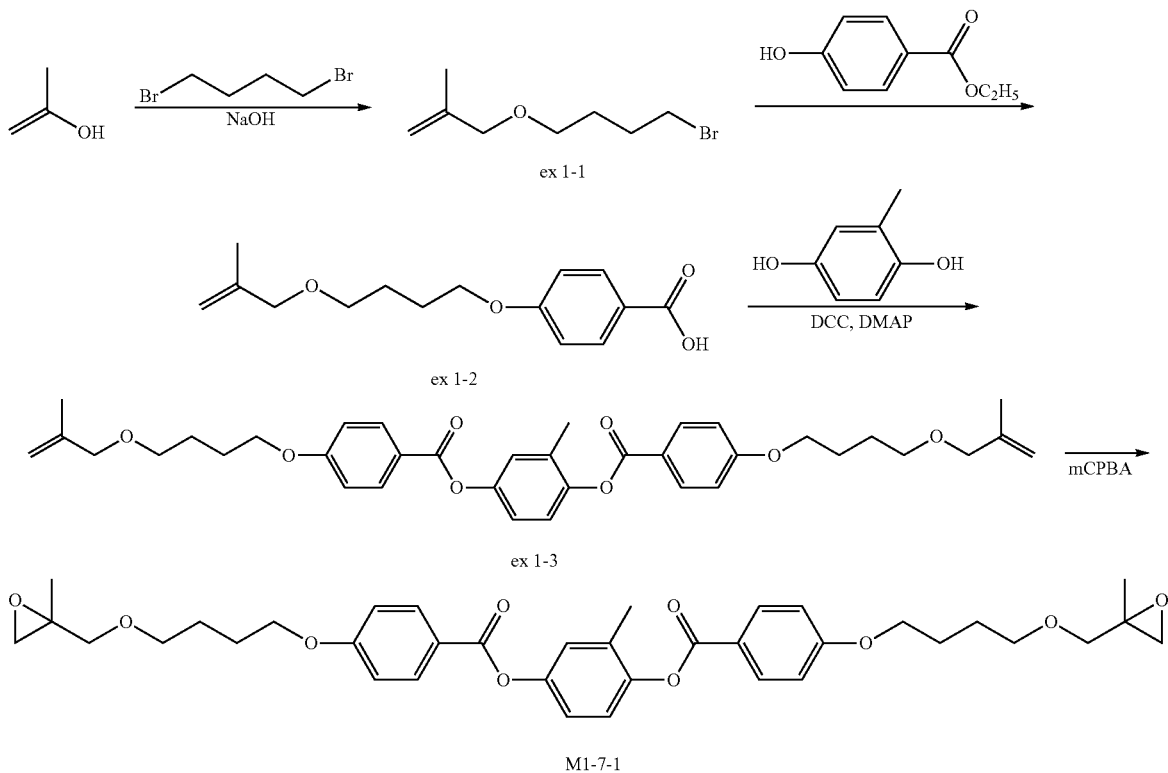

First Step:

β-Methallyl alcohol (1.61 mol), 1,4H-dibromobutane (2.32 mol), sodium hydroxide (5.81 mol) and n-tetrabutylammonium bromide (116 mmol) were added to a mixture of toluene (500 mL) and water (500 mL), and the mixture was heated with stirring at 100° C. for 8 hours under an atmosphere of nitrogen. The organic phase was separated and washed with water, and then dried over anhydrous magnesium sulfate. The solvent was distilled off under reduced pressure and the residue was distilled under reduced pressure to give an oil of the compound (ex1-1) (633 mmol).

reflux with stirring for 3 hours under an atmosphere of nitrogen. The solvent was distilled off under reduced pressure, and toluene was added to the residue, and then the organic phase was separated. The resulting organic phase was washed with water, and then dried over anhydrous magnesium sulfate. The solvent was distilled off under reduced pressure. Recrystallization from heptane gave colorless crystals of the compound (ex1-2) (121 mmol).

Third Step:

The compound (ex1-2) (108 mmol), methylhydroquinone (53 mmol) and 4-dimethylaminopyridine (DMAP) (22 mmol) were added to dichloromethane (300 mL) and the mixture was stirred under an atmosphere of nitrogen. 80 mL of a dichloromethane solution of 1,3-Dicyclohexylcarbodiimide (DCC) (113 mmol) was added to the mixture dropwise. After the addition, the mixture was stirred at room temperature for 8 hours. Deposited precipitates were filtered off, and the organic phase was washed with water, and then dried over anhydrous magnesium sulfate. The solvent was distilled off under reduced pressure, and the residue was purified by column chromatography to give colorless crystals of the compound (ex1-3) (37 mmol). Then, the resulting compound (ex1-3) (37 mmol) was added to dichloromethane (220 mL) and was stirred under an atmosphere of nitrogen. m-Chloroperbenzoic acid (mCPBA) (75 mmol) was added and the stirring was continued at room temperature for another 8 hours. Deposited precipitates were filtered off and the organic phase was washed sufficiently with an aqueous 10% solution of sodium hydrogen sulfite and successively with a 3% aqueous solution of sodium hydroxide and water, and then dried over anhydrous magnesium sulfate. The solvent was distilled off under reduced pressure, and the residue was purified by column chromatography to give colorless crystals of the compound (M1-7-1) (21 mmol).

The compound (M1-7-2) was synthesized according to the synthetic method for the compound (M1-7-1) described above, using cyclohexanemethanol instead of β-methallyl alcohol.

Example 5

The compound (1-5-1)/the compound (M1-19-1)/the compound (M1-1-1)/the compound (M1-1-2) were mixed in the weight ratio of 10/70/15/5, and the mixture was dissolved in cyclopentanone so that the concentration of these compounds became 30% by weight. To the solution, the weight ratio 0.002 of a fluorine-based nonionic surfactant FTX-218 (Neos Co., Ltd.) and the weight ratio 0.02 of a polymerization initiator CPI-110P (San-Apro Ltd.) were added to give a composition. It was found that the resulting composition had no phase separation or the like, and was mixed homogeneously.

The composition was applied using a spin coater to a glass substrate having a polyimide alignment film subjected to rubbing. The glass substrate was placed on a hot plate heated at 70° C. for 120 seconds, evaporating the solvent and forming a paint film.

Then, the paint film was photopolymerized in air at room temperature for 30 seconds, with irradiance of 30 mW/cm$^2$ (a central wavelength at 365 nm) using a 250 W-ultra high-pressure mercury lamp. The resulting thin film was fixed in a homogeneous orientation and exhibited optical properties of a negative C-plate.

Example 6

The compound (1-5-1)/the compound (M1-7-1)/the compound (M1-1-1)/the compound (M2-2-1) were mixed in the weight ratio of 3/60/20/17, and the mixture was dissolved in methyl ethyl ketone so that the concentration of these compounds became 20% by weight. To the solution, the weight ratio 0.001 of a silicone-based nonionic surfactant BYK-333 (BYKJapan K.K.) and the weight ratio 0.02 of a polymerization initiator CPI-110P (San-Apro Ltd.) were added to give a composition. It was found that the resulting composition had no phase separation or the like, and was mixed homogeneously.

A thin film was prepared according to the method described in Example 5 from the composition, showing the selective reflection of visible light.

Example 7

The compound (1-7-4)/the compound (M1-19-1)/the compound (M1-7-1)/the compound (M1-1-2) were mixed in the weight ratio of 10/60/20/10, and the mixture was dissolved in n-butyl acetate so that the concentration of these compounds became 20% by weight. To the solution, the weight ratio 0.002 of a fluorine-based nonionic surfactant FTX-218 (Neos Co., Ltd.) and the weight ratio 0.02 of a polymerization initiator CPI-110P (San-Apro Ltd.) were added to give a composition. It was found that the resulting composition had no phase separation or the like, and was mixed homogeneously.

A thin film was prepared according to the method described in Example 5 from the composition, exhibiting optical properties of a negative C-plate.

Example 8

The compound (2-2-5)/the compound (M1-7-1)/the compound (M1-7-2)/the compound (M1-1-2) were mixed in the weight ratio of 10/40/40/10, and the mixture was dissolved in a mixed solvent of propylene glycol monomethyl ether acetate (PGMEA)/methyl 3-methoxypropionate (MMP)=9/1 so that the concentration of these compounds became 20% by weight. To the solution, the weight ratio 0.002 of a fluorine-based nonionic surfactant FTX-218 (Neos Co., Ltd.) and the weight ratio 0.02 of a polymerization initiator CPI-110P (San-Apro Ltd.) were added to give a composition. It was found that the resulting composition had no phase separation or the like, and was mixed homogeneously.

A thin film was prepared according to the method described in Example 5 from the composition, showing the selective reflection of visible light.

Example 9

The compound (2-2-5)/the compound (M1-19-1)/the compound (M1-7-2)/the compound (M1-7-3) were mixed in the weight ratio of 5/60/30/5, and the mixture was dissolved in a mixed solvent of PGMEA/cyclopentanone=3/7 so that the concentration of these compounds became 20% by weight. To the solution, the weight ratio 0.002 of a hydrocarbon-based nonionic surfactant Polyflow No. 75 (Kyoeisha Chemical Co., Ltd.) and the weight ratio 0.02 of a polymerization initiator CPI-110P (San-Apro Ltd.) were added to give a composition. It was found that the resulting composition had no phase separation or the like, and was mixed homogeneously.

A thin film was prepared according to the method described in Example 5 from the composition, showing the selective reflection of visible light.

INDUSTRIAL APPLICABILITY

The optically active compound having a polymerizable group of the invention can be used as a component of a polymerizable liquid crystal composition. The polymerizable liquid crystal composition of the invention and the polymer formed by polymerization of the composition can be utilized, for example, for the elements of a liquid crystal display device such as an optical retardation plate, a polarizer, a selective reflection film, a brightness enhancement film and a viewing angle-compensation film.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. An optically active compound having a polymerizable group represented by formula (1) or (2):

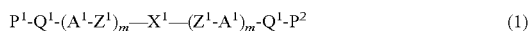

in formulas (1) and (2),

- the ring $A^1$ is independently 1,4-cyclohexylene, 1,4-phenylene, pyridine-2,5-diyl, pyrimidine-2,5-diyl, naphthalene-2,6-diyl, tetrahydronaphthalene-2,6-diyl or fluorene-2,7-diyl, and in these rings, one or nonadjacent two —$CH_2$— may be replaced by —O—, and in the 1,4-phenylene and fluorene-2,7-diyl, arbitrary hydrogen may be replaced by fluorine, chlorine, cyano, methyl, ethyl, methoxy, hydroxy, formyl, acetoxy, acetyl, trifluoroacetyl, difluoromethyl or trifluoromethyl;
- $Z^1$ is independently a single bond, —O—, —COO—, —OCO—, —CH=CH—COO—, —OCO—CH=CH—, —OCO—$(CH_2)_2$—, —$(CH_2)_2$—COO—, —O$(CH_2)_2$O—, —C≡C—COO—, —OCO—C≡C—, —$CH_2$O—, —O$CH_2$—, —$CF_2$O—, —O$CF_2$—, —$(CH_2)_4$—, —$(CH_2)_2$—, —$(CF_2)_2$—, —CH=CH—, —CF=CF— or —C≡C—;
- m is independently an integer from 1 to 5, and when m is 2 or more, each of a plurality of $Z^1$ may be different groups or at least two of a plurality of $Z^1$ may be the same group, and each of a plurality of the ring $A^1$ may be different rings or at least two of a plurality of the ring $A^1$ may be the same ring;
- $Q^1$ is independently alkylene having 1 to 20 carbons, and in the alkylene, arbitrary hydrogen may be replaced by fluorine or chlorine and arbitrary —$CH_2$— may be replaced by —O—, —COO—, —OCO—, —CH=CH— or —C≡C—;
- $X^1$ is a divalent group having chirality represented by any one of formulas (3-1) to (3-7), and when $X^1$ is formula (3-5) and m is 2 to 4, $Z^1$ is not —COO—$(CH_2)_2$—, —$(CH_2)_2$—COO— or —O$(CH_2)_2$O— and when $X^1$ is formula (3-5) and m is 1, $Q^1$ is alkylene having 1 to 20 carbons where the group next to the ring $A^1$ in the alkylene is not —$(CH_2)_2$—COO—, —COO—$(CH_2)_2$—, —O$(CH_2)_2$O—, —O$(CH_2)_3$— or —$(CH_2)_3$O—;
- $X^2$ is a monovalent group having chirality represented by any one of formulas (3-8) to (3-10);
- $P^1$ is independently a polymerizable group represented by formula (4-1) or (4-2);
- $P^2$ is a polymerizable group represented by any one of formulas (4-1) to (4-5):

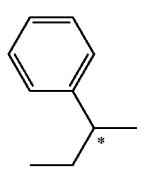

(3-1)

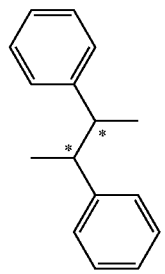

(3-2)

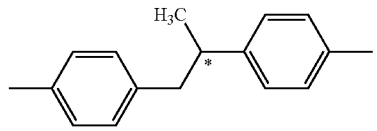

(3-3)

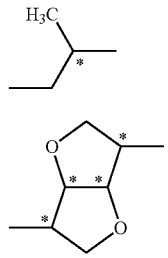

(3-4)

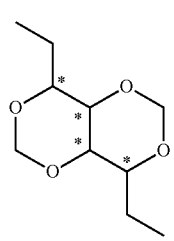

(3-5)

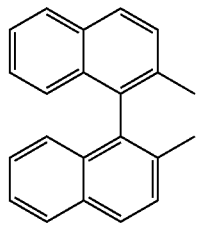

(3-6)

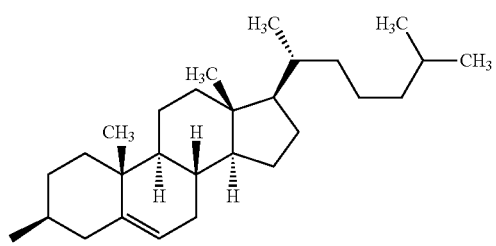

(3-7)

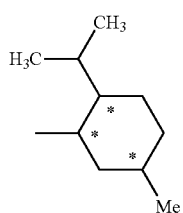

(3-8)

(3-9)

-continued

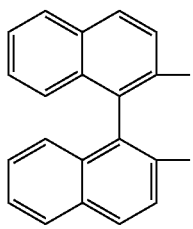
(3-10)

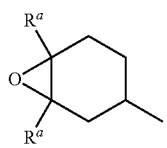
(4-1)

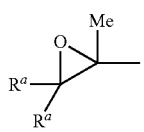
(4-2)

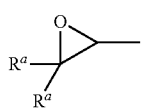
(4-3)

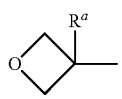
(4-4)

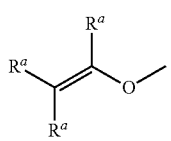
(4-5)

in formulas (4-1) to (4-5), $R^a$ is independently hydrogen, halogen or alkyl having 1 to 5 carbons.

2. The optically active compound having a polymerizable group according to claim 1, wherein in formula (1), $X^1$ is a divalent group having chirality represented by any one of formulas (3-1) to (3-4).

3. The optically active compound having a polymerizable group according to claim 1, wherein in formula (1), $X^1$ is a divalent group having chirality represented by formula (3-5) or (3-6).

4. The optically active compound having a polymerizable group according to claim 1, wherein in formula (1), $X^1$ is a divalent group having chirality represented by formula (3-7).

5. The optically active compound having a polymerizable group according to claim 1, wherein in formulas (1) and (2), the ring $A^1$ is independently 1,4-cyclohexylene, 1,4-phenylene or naphthalene-2,6-diyl, and in the 1,4-phenylene, arbitrary one or two hydrogens may be replaced by fluorine, methyl, methoxy or trifluoromethyl; $Z^1$ is independently a single bond, —COO—, —OCO—, —CH=CH—COO—, —(CH$_2$)$_2$—COO—, —OCO—CH=CH—, —OCO—(CH$_2$)$_2$—, —(CH$_2$)$_2$— or —C≡C—; and m is independently an integer from 1 to 3.

6. The optically active compound having a polymerizable group according to claim 1, wherein in formulas (1) and (2), $Z^1$ is independently a single bond, —COO— or —OCO—; $Q^1$ is independently alkylene having 1 to 12 carbons, and in the alkylene, arbitrary —CH$_2$— may be replaced by —O—, —COO— or —OCO—; $R^a$ in formulas (4-1) to (4-5) is independently hydrogen, methyl or ethyl.

7. The optically active compound having a polymerizable group according to claim 1, wherein in formula (1),
the ring $A^1$ is independently 1,4-cyclohexylene or 1,4-phenylene, and in the 1,4-phenylene, arbitrary one or two hydrogens may be replaced by fluorine or methyl;
$Z^1$ is independently a single bond, —COO— or —OCO—;
m is an integer from 1 to 3;
$Q^1$ is independently alkylene having 1 to 12 carbons, and in the alkylene, arbitrary —CH$_2$— may be replaced by —O—, —COO— or —OCO—;
$P^1$ and $P^2$ are a polymerizable group represented by formula (4-1); and
$R^a$ in formula (4-1) is hydrogen.

8. The optically active compound having a polymerizable group according to claim 1, wherein in formula (1),
the ring $A^1$ is independently 1,4-cyclohexylene or 1,4-phenylene, and in the 1,4-phenylene, arbitrary one or two hydrogens may be replaced by fluorine or methyl;
$Z^1$ is independently a single bond, —COO— or —OCO—;
m is an integer from 1 to 3;
$Q^1$ is independently alkylene having 1 to 12 carbons, and in the alkylene, arbitrary —CH$_2$— may be replaced by —O—, —COO— or —OCO—;
$P^1$ and $P^2$ are a polymerizable group represented by formula (4-2); and
$R^a$ in formula (4-2) is hydrogen.

9. A polymerizable liquid crystal composition, comprising at least one of the optically active compound having a polymerizable group according to claim 1 and a polymerizable liquid crystal compound.

10. The polymerizable liquid crystal composition according to claim 9, the polymerizable liquid crystal compound is at least one compound selected from compounds represented by formulas (M1) and (M2):

$$P^3\text{-}Q^2\text{-}A^2\text{-}(Z^2\text{-}A^2)_n\text{-}Q^2\text{-}P^4 \quad (M1)$$

$$P^3\text{-}Q^2\text{-}A^2\text{-}(Z^1\text{-}A^2)_n\text{-}R \quad (M2)$$

in formulas (M1) and (M2),
the ring $A^2$ is independently 1,4-cyclohexylene, 1,4-phenylene, naphthalene-2,6-diyl, fluorene-2,7-diyl or 1,3-dioxane-2,5-diyl, and in the 1,4-phenylene and fluorene-2,7-diyl, arbitrary hydrogen may be replaced by fluorine, chlorine, cyano, methyl, ethyl, methoxy, hydroxy, formyl, acetoxy, acetyl, trifluoroacetyl, difluoromethyl or trifluoromethyl;
$Z^2$ is independently a single bond, —O—, —COO—, —OCO—, —CH=CH—COO—, —OCO—CH=CH—, —OCO—(CH$_2$)$_2$—, —(CH$_2$)$_2$—COO—, —C≡C—COO—, —OCO—C≡C—, —CH$_2$O—, —OCH$_2$—, —CF$_2$O—, —OCF$_2$—, —CONH—, —NHCO—, —(CH$_2$)$_4$—, —(CH$_2$)$_2$—, —(CF$_2$)$_2$—, —CH=CH—, —CF=CF— or —C≡C—;
n is independently an integer from 1 to 5, and when n is 2 or more, each of a plurality of $Z^2$ may be different groups or at least two of a plurality of $Z^2$ may be the same group, and each of a plurality of the ring $A^2$ may be different rings or at least two of a plurality of the ring $A^2$ may be the same ring;
$Q^2$ is independently alkylene having 1 to 20 carbons, and in the alkylene, arbitrary hydrogen may be replaced by fluorine and arbitrary —CH$_2$— may be replaced by —O—, —COO—, —OCO—, —CH=CH— or —C≡C—;
R is fluorine, cyano, trifluoromethyl, trifluoromethoxy, alkyl having 1 to 20 carbons or alkoxy having 1 to 20 carbons; and $P^3$ and $P^4$ are each independently a polymerizable group represented by any one of formulas (4-1) to (4-5):

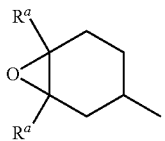 (4-1)

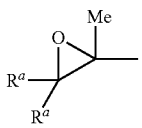 (4-2)

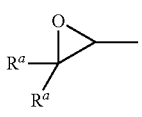 (4-3)

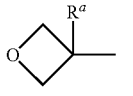 (4-4)

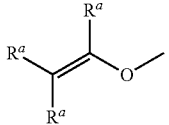 (4-5)

in formulas (4-1) to (4-5), $R^a$ is independently hydrogen, halogen or alkyl having 1 to 5 carbons.

11. The polymerizable liquid crystal composition according to claim 10, wherein
in formula (1) and formula (2),
the ring $A^1$ is independently 1,4-cyclohexylene, 1,4-phenylene or naphthalene-2,6-diyl, and in the 1,4-phenylene, arbitrary hydrogen may be replaced by fluorine, methyl, methoxy or trifluoromethyl;
$Z^1$ is independently a single bond, —COO—, —OCO—, —CH=CH—COO—, —(CH$_2$)$_2$—COO—, —OCO—CH=CH—, —OCO—(CH$_2$)$_2$—, —(CH$_2$)$_2$— or —C≡C—;
m is independently an integer from 1 to 3;
$Q^1$ is independently alkylene having 1 to 12 carbons, and in the alkylene, arbitrary —CH$_2$— may be replaced by —O—, —COO— or —OCO—; and
$R^a$ in formulas (4-1) to (4-5) is independently hydrogen, methyl or ethyl; and
in formulas (M1) and (M2),
the ring $A^2$ is independently 1,4-cyclohexylene or 1,4-phenylene, and in the 1,4-phenylene, arbitrary one or two hydrogens may be replaced by fluorine, methyl or trifluoromethyl;
$Z^2$ is independently a single bond, —O—, —COO— or —OCO—;
n is independently an integer from 1 to 3;
$Q^2$ is independently alkylene having 1 to 14 carbons, and in the alkylene, arbitrary hydrogen may be replaced by fluorine and arbitrary —CH$_2$— may be replaced by —O—, —COO— or —OCO—; and
$R^a$ in formulas (4-1) to (4-5) is independently hydrogen, methyl or ethyl.

12. The polymerizable liquid crystal composition according to claim 10, wherein
in formula (1) and formula (2),
the ring $A^1$ is independently 1,4-cyclohexylene or 1,4-phenylene, and in the 1,4-phenylene, arbitrary one or two hydrogens may be replaced by fluorine or methyl;
$Z^1$ is independently a single bond, —COO— or —OCO—;
m is independently an integer from 1 to 3;
$Q^1$ is independently alkylene having 1 to 12 carbons, and in the alkylene, arbitrary —CH$_2$— may be replaced by —O—, —COO— or —OCO—;
$P^1$ is independently a polymerizable group represented by formula (4-1) or (4-2);
$P^2$ is a polymerizable group represented by formula (4-1) when $P^1$ is a polymerizable group represented by formula (4-1), and $P^2$ is a polymerizable group represented by formula (4-2) when $P^1$ is a polymerizable group represented by formula (4-2); and
$R^a$ in formula (4-1) or formula (4-2) is hydrogen; and
in formula (M1),
the ring $A^2$ is independently 1,4-cyclohexylene or 1,4-phenylene, and in the 1,4-phenylene, one or two hydrogens may be replaced by fluorine, methyl or trifluoromethyl;
$Z^2$ is independently a single bond, —O—, —COO— or —OCO—;
n is 1 or 2;
$Q^2$ is independently alkylene having 1 to 14 carbons, and in the alkylene, arbitrary hydrogen may be replaced by fluorine and arbitrary —CH$_2$— may be replaced by —O—, —COO— or —OCO—; and
$P^3$ and $P^4$ are the same polymerizable group.

13. The polymerizable liquid crystal composition according to claim 9, further comprising a liquid crystal compound other than the compound represented by formulas (M1) and (M2).

14. The polymerizable liquid crystal composition according to claim 9, further comprising an optically active compound other than the compound represented by formulas (1) and (2).

15. The polymerizable liquid crystal composition according to claim 9, further comprising a non-optically active and non-liquid crystalline polymerizable compound.

16. A polymer formed by polymerization of the polymerizable liquid crystal composition according to claim 9.

17. The polymer according to claim 16, wherein the polymer has the optical anisotropy.

18. The polymer according to claim 17, wherein the polymer has optical characteristics of a negative C-plate.

19. The polymer according to claim 17, wherein the polymer exhibits circular dichroism in the light region at a part or all of wavelengths of 350 nm to 750 nm.

20. The polymer according to claim 17, wherein the polymer exhibits circular dichroism in the ultraviolet region at wavelengths of 100 nm to 350 nm.

21. The polymer according to claim 17, wherein the polymer exhibits circular dichroism in the near-infrared region at wavelengths of 750 nm to 2,500 nm.

22. An optical device containing the polymerizable liquid crystal composition according to claim 9, wherein the helical pitch is 1 nm or more and 200 nm or less.

23. An optical device containing the polymer according to claim 17, wherein the helical pitch is 1 nm or more and 200 nm or less.

24. An article selected from the group of a polarizing plate, an optical compensator, an alignment film, a color filter, a holographic optical device, a liquid crystal display device, a cosmetic, an ornament, an anti-counterfeit detection system, a non-linear optical device and an optical storage device, each of which contains the polymerizable liquid crystal composition according to claim 9.

25. An article selected from the group of a polarizing plate, an optical compensator, an alignment film, a color filter, a holographic optical device, a liquid crystal display device, a cosmetic, an ornament, an anti-counterfeit detection system, a non-linear optical device and an optical storage device, each of which contains the polymer according to claim 16.

* * * * *